(12) United States Patent
Anderson et al.

(10) Patent No.: US 6,803,408 B2
(45) Date of Patent: Oct. 12, 2004

(54) COATING COMPOSITIONS HAVING IMPROVED SCRATCH RESISTANCE, COATED SUBSTRATES AND METHODS RELATED THERETO

(75) Inventors: Lawrence G. Anderson, Pittsburgh, PA (US); Karen A. Barkac, Murrysville, PA (US); Shawn A. DeSaw, McMurray, PA (US); Marvis E. Hartman, Pittsburgh, PA (US); Deborah E. Hayes, Verona, PA (US); Thomas R. Hockswender, Gibsonia, PA (US); Kymarie L. Kuster, Pittsburgh, PA (US); Masayuki Nakajima, Wexford, PA (US); Kurt G. Olson, Gibsonia, PA (US); Richard J. Sadvary, Pittsburgh, PA (US); Dennis A. Simpson, Wexford, PA (US); Shiryn Tyebjee, Allison Park, PA (US); Truman F. Wilt, Clinton, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 0 days.

(21) Appl. No.: 10/456,854

(22) Filed: Jun. 9, 2003

(65) Prior Publication Data

US 2003/0207985 A1 Nov. 6, 2003

Related U.S. Application Data

(60) Division of application No. 09/629,444, filed on Jul. 31, 2000, now Pat. No. 6,657,001, which is a continuation-in-part of application No. 09/489,042, filed on Jan. 21, 2000, now abandoned, which is a continuation-in-part of application No. 09/365,069, filed on Jul. 30, 1999, now abandoned.
(60) Provisional application No. 60/171,899, filed on Dec. 23, 1999.

(51) Int. Cl.$^7$ .......................... C08L 83/04; C08L 83/06; C08L 83/08
(52) U.S. Cl. ...................... 524/588; 525/100; 525/102; 525/474; 525/476; 528/26; 528/28; 528/29
(58) Field of Search .................. 524/588; 525/100, 525/102, 474, 476; 528/26, 28, 29

(56) References Cited

U.S. PATENT DOCUMENTS

| | | | |
|---|---|---|---|
| 1,873,945 A | 8/1932 | Kraenzlein et al. |
| 2,584,340 A | 2/1952 | Goodwin et al. |
| 2,587,295 A | 2/1952 | Doyle et al. |
| 2,860,074 A | 11/1958 | Hedlund et al. |
| 2,901,449 A | 8/1959 | Schwartz et al. |
| 2,978,437 A | 4/1961 | Christenson |
| 3,203,919 A | 8/1965 | Brachman |
| 3,317,460 A | 5/1967 | Clark |
| 3,398,174 A | 8/1968 | Barnes Jr. |
| 3,450,791 A | 6/1969 | Sekmakas et al. |
| 3,479,328 A | 11/1969 | Nordstrom |
| 3,539,658 A | 11/1970 | Sekmakas et al. |
| 3,577,263 A | 5/1971 | Nordstrom |
| 3,577,265 A | 5/1971 | Nordstrom |
| 3,627,836 A | 12/1971 | Getson |
| 3,642,936 A | 2/1972 | Hodge et al. |
| 3,644,566 A | 2/1972 | Kincheloe et al. |
| 3,655,602 A | 4/1972 | Sekmakas |
| 3,668,183 A | 6/1972 | Hoy et al. |
| 3,799,854 A | 3/1974 | Jerabek et al. |
| 3,857,817 A | 12/1974 | Henshaw et al. |
| 3,919,315 A | 11/1975 | Wollweber et al. |
| 3,986,997 A | 10/1976 | Clark |
| 4,001,156 A | 1/1977 | Bosso et al. |
| 4,025,407 A | 5/1977 | Chang et al. |
| 4,025,456 A | 5/1977 | Litteral et al. |
| 4,027,073 A | 5/1977 | Clark |

(List continued on next page.)

FOREIGN PATENT DOCUMENTS

| | | |
|---|---|---|
| DE | 1193504 | 5/1965 |
| DE | 1545040 | 7/1970 |
| DE | 2205570 | 12/1988 |
| DE | 44 32 260 | 6/1995 |
| DE | 197 09 467 | 3/1997 |
| EP | 0010555 | 5/1980 |
| EP | 0088193 | 9/1983 |

(List continued on next page.)

OTHER PUBLICATIONS

Iler, Ralph K., "The Chemistry of Silica", Colloidal Silica–Concentrated Sols, 1979, pp. 412–414.

Verboom et al., "N, N'–Bis[trismethylsilyl]–urea: A Useful Silylating Agent for Alcohols and Carboxylic Acids", Laboratory of Organic Chemistry, Twente University of Technology, Enschede, The Netherlands, Communications, pp. 807–809, Oct. 1981.

"Surface Coatings—vol. 1: Raw Materials and Their Usage," 2$^{nd}$ Ed., Tafe Educational Books, New South Wales University Press Limited, New South Wales, Australia 1983.

(List continued on next page.)

Primary Examiner—Caixia Lu
(74) Attorney, Agent, or Firm—Deborah M. Altman

(57) ABSTRACT

Compositions are provided which contain (a) one or more polysiloxanes comprising at least one reactive functional group; a plurality of particles; and, optionally, one or more curing agents comprising at least one functional group that is reactive with any reactive functional group of polysiloxane (a). Additionally, a process for applying the multi-component composite coatings described above to a substrate and coated substrates are provided. A process for preparing the coating compositions also is provided. The multi-component composite coating compositions of the invention provide highly scratch resistant color-plus-clearcoatings capable of retaining scratch resistance after weathering.

65 Claims, 9 Drawing Sheets

U.S. PATENT DOCUMENTS

| | | |
|---|---|---|
| 4,046,729 A | 9/1977 | Scriven et al. |
| 4,089,763 A | 5/1978 | Dart et al. |
| 4,093,673 A | 6/1978 | Chang et al. |
| 4,104,240 A | 8/1978 | Buter |
| 4,147,679 A | 4/1979 | Scriven et al. |
| 4,177,315 A | 12/1979 | Ubersax |
| 4,211,823 A | 7/1980 | Suzuki et al. |
| 4,212,901 A | 7/1980 | van Neerbos et al. |
| 4,220,679 A | 9/1980 | Blackhouse |
| 4,221,697 A | 9/1980 | Osborn et al. |
| 4,239,798 A | 12/1980 | Schroeter et al. |
| 4,254,185 A | 3/1981 | Buter |
| 4,271,062 A | 6/1981 | Boomgaard et al. |
| 4,278,574 A | 7/1981 | Dworak et al. |
| 4,279,800 A | 7/1981 | Boomgaard et al. |
| 4,308,060 A | 12/1981 | Talbot |
| 4,310,600 A | 1/1982 | Cross |
| 4,311,622 A | 1/1982 | Buter |
| 4,345,057 A | 8/1982 | Yamabe et al. |
| 4,348,462 A | 9/1982 | Chung |
| 4,368,294 A | 1/1983 | Deubzer et al. |
| 4,369,300 A | 1/1983 | Carter et al. |
| 4,395,461 A | 7/1983 | Ching |
| 4,403,003 A | 9/1983 | Blackhouse |
| 4,403,093 A | 9/1983 | Hartman et al. |
| 4,408,018 A | 10/1983 | Bartman et al. |
| 4,410,594 A | 10/1983 | Olson |
| 4,413,086 A | 11/1983 | Chang et al. |
| 4,418,182 A | 11/1983 | Chattha |
| 4,427,820 A | 1/1984 | Blackhouse et al. |
| 4,431,789 A | 2/1984 | Okazaki et al. |
| 4,456,647 A | 6/1984 | Schoenfelder et al. |
| 4,465,815 A | 8/1984 | Chattha |
| 4,477,536 A | 10/1984 | Wright et al. |
| 4,478,876 A | 10/1984 | Chung |
| 4,481,126 A | 11/1984 | Trinh et al. |
| 4,491,508 A | 1/1985 | Olson et al. |
| 4,499,150 A | 2/1985 | Dowbenko et al. |
| 4,499,151 A | 2/1985 | Dowbenko et al. |
| 4,512,677 A | 4/1985 | Trinh |
| 4,518,522 A | 5/1985 | Markusch et al. |
| 4,520,144 A | 5/1985 | Noren et al. |
| 4,522,958 A | 6/1985 | Das et al. |
| 4,526,910 A | 7/1985 | Das et al. |
| 4,563,372 A | 1/1986 | Kurauchi et al. |
| 4,569,966 A | 2/1986 | Piccirilli et al. |
| 4,592,816 A | 6/1986 | Emmons et al. |
| 4,598,111 A | 7/1986 | Wright et al. |
| 4,618,657 A | 10/1986 | Katchko et al. |
| 4,640,940 A | 2/1987 | Jacobine et al. |
| 4,652,470 A | 3/1987 | Das et al. |
| 4,663,377 A | 5/1987 | Hombach et al. |
| 4,665,116 A | 5/1987 | Kornhaber et al. |
| 4,673,718 A | 6/1987 | Ryntz et al. |
| 4,677,004 A | 6/1987 | Das et al. |
| 4,680,204 A | 7/1987 | Das et al. |
| 4,681,811 A | 7/1987 | Simpson et al. |
| 4,689,383 A | 8/1987 | Riffle et al. |
| 4,713,410 A | 12/1987 | Katchko et al. |
| 4,728,543 A | 3/1988 | Kurauchi et al. |
| 4,728,545 A | 3/1988 | Kurauchi et al. |
| 4,728,690 A | 3/1988 | Lammerting et al. |
| 4,732,790 A | 3/1988 | Blackburn et al. |
| 4,754,014 A | 6/1988 | Ryntz et al. |
| 4,764,569 A | 8/1988 | Umemoto et al. |
| 4,766,185 A | 8/1988 | Ryntz et al. |
| 4,798,746 A | 1/1989 | Claar et al. |
| 4,804,732 A | 2/1989 | Ryntz et al. |
| 4,808,649 A | 2/1989 | Gay et al. |
| 4,816,333 A | 3/1989 | Lange et al. |
| 4,822,828 A | 4/1989 | Swofford |
| 4,835,023 A | 5/1989 | Taniguchi et al. |
| 4,851,294 A | 7/1989 | Buter et al. |
| 4,870,140 A | 9/1989 | Ryntz et al. |
| 4,873,298 A | 10/1989 | Ryntz et al. |
| 4,892,906 A | 1/1990 | Pham et al. |
| 4,910,097 A | 3/1990 | Nomura et al. |
| 4,925,659 A | 5/1990 | Grollier et al. |
| 4,927,868 A | 5/1990 | Schimmel et al. |
| 5,025,054 A | 6/1991 | Yoshida et al. |
| 5,035,748 A | 7/1991 | Burow et al. |
| 5,059,707 A | 10/1991 | Motegi et al. |
| 5,066,698 A | 11/1991 | Hazan et al. |
| 5,066,720 A | 11/1991 | Ohsugi et al. |
| 5,071,904 A | 12/1991 | Martin et al. |
| 5,075,165 A | 12/1991 | Kishi et al. |
| 5,075,370 A | 12/1991 | Kubitza et al. |
| 5,084,541 A | 1/1992 | Jacobs, III et al. |
| 5,085,694 A | 2/1992 | Cifuentes |
| 5,086,087 A | 2/1992 | Misev |
| 5,098,947 A | 3/1992 | Metzger et al. |
| 5,098,983 A | 3/1992 | Mosbach et al. |
| 5,102,746 A | 4/1992 | Shindou et al. |
| 5,104,922 A | 4/1992 | Chang |
| 5,104,929 A | 4/1992 | Bilkadi |
| 5,110,891 A | 5/1992 | Cifuentes et al. |
| 5,112,403 A | 5/1992 | Okura et al. |
| 5,114,756 A | 5/1992 | Mirabeau et al. |
| 5,116,418 A | 5/1992 | Kaliski et al. |
| 5,141,555 A | 8/1992 | Elepano |
| 5,147,730 A | 9/1992 | Ogishi et al. |
| 5,154,759 A | 10/1992 | Cifuentes et al. |
| 5,162,420 A | 11/1992 | Chang et al. |
| 5,174,813 A | 12/1992 | Cifuentes et al. |
| 5,194,487 A | 3/1993 | Jacobs |
| 5,196,485 A | 3/1993 | McMonigal et al. |
| 5,212,216 A | 5/1993 | Hattori et al. |
| 5,212,273 A | 5/1993 | Das et al. |
| 5,213,846 A | 5/1993 | Tsuneta et al. |
| 5,235,018 A | 8/1993 | Potter et al. |
| 5,248,789 A | 9/1993 | Wolff |
| 5,256,452 A | 10/1993 | McMonigal et al. |
| 5,258,063 A | 11/1993 | Cifuentes et al. |
| 5,258,225 A | 11/1993 | Katsamberis |
| 5,258,424 A | 11/1993 | Yagi et al. |
| 5,260,350 A | 11/1993 | Wright |
| 5,260,469 A | 11/1993 | Swiatek |
| 5,268,256 A | 12/1993 | Goetz et al. |
| 5,286,835 A | 2/1994 | Green et al. |
| 5,304,400 A | 4/1994 | Dhein et al. |
| 5,308,494 A | 5/1994 | Brandon et al. |
| 5,314,947 A | 5/1994 | Sawaragi |
| 5,322,873 A | 6/1994 | Pohl et al. |
| 5,322,890 A | 6/1994 | Ando et al. |
| 5,328,975 A | 7/1994 | Hanson et al. |
| 5,346,958 A | 9/1994 | Yukawa et al. |
| 5,356,669 A | 10/1994 | Rehfuss et al. |
| 5,367,019 A | 11/1994 | Sawaragi |
| 5,378,735 A | 1/1995 | Hosokawa et al. |
| 5,387,642 A | 2/1995 | Blum et al. |
| 5,389,705 A | 2/1995 | Huemke et al. |
| 5,389,718 A | 2/1995 | Potter et al. |
| 5,393,823 A | 2/1995 | Konno et al. |
| 5,395,955 A | 3/1995 | Okawa et al. |
| 5,397,638 A | 3/1995 | Miki et al. |
| 5,426,131 A | 6/1995 | Katsamberis |
| 5,430,083 A | 7/1995 | Klier et al. |
| 5,432,233 A | 7/1995 | Miyazoe et al. |
| 5,438,083 A | 8/1995 | Takimoto et al. |
| 5,439,957 A | 8/1995 | Takimoto et al. |
| 5,444,104 A | 8/1995 | Waknine |

| | | |
|---|---|---|
| 5,445,871 A | 8/1995 | Murase et al. |
| 5,461,102 A | 10/1995 | Masuda et al. |
| 5,468,461 A | 11/1995 | Hosoda et al. |
| 5,468,802 A | 11/1995 | Wilt et al. |
| 5,470,504 A | 11/1995 | Kiehn et al. |
| 5,571,297 A | 11/1996 | Swei et al. |
| 5,587,428 A | 12/1996 | Jones et al. |
| 5,589,129 A | 12/1996 | Kato et al. |
| 5,593,733 A | 1/1997 | Mayo |
| 5,602,204 A | 2/1997 | Harimoto et al. |
| 5,614,640 A | 3/1997 | Okawa |
| 5,641,854 A | 6/1997 | Jones et al. |
| 5,663,240 A | 9/1997 | Simeone et al. |
| 5,663,244 A | 9/1997 | Barancyk et al. |
| 5,686,012 A | 11/1997 | Hayashi et al. |
| 5,693,723 A | 12/1997 | Green |
| 5,693,724 A | 12/1997 | Green |
| 5,709,950 A | 1/1998 | Burgman et al. |
| 5,719,234 A | 2/1998 | Yabuta et al. |
| 5,756,221 A | 5/1998 | Horibe et al. |
| 5,780,530 A | 7/1998 | Mizutani et al. |
| 5,798,409 A | 8/1998 | Ho |
| 5,800,910 A | 9/1998 | Harke et al. |
| 5,814,410 A | 9/1998 | Singer et al. |
| 5,840,806 A | 11/1998 | Komazaki et al. |
| 5,853,809 A | 12/1998 | Campbell et al. |
| 5,876,806 A | 3/1999 | Ogawa |
| 5,886,082 A | 3/1999 | Numa et al. |
| 5,914,162 A | 6/1999 | Bilkadi |
| 5,922,475 A | 7/1999 | Barancyk et al. |
| 5,939,491 A | 8/1999 | Wilt et al. |
| 5,942,556 A | 8/1999 | Friedlander et al. |
| 5,976,701 A | 11/1999 | Barancyk et al. |
| 5,998,504 A | 12/1999 | Groth et al. |
| 5,998,543 A | 12/1999 | Collins et al. |
| 6,005,045 A | 12/1999 | Klanica |
| 6,013,724 A | 1/2000 | Mizutani et al. |
| 6,013,733 A | 1/2000 | Singer et al. |
| 6,022,919 A | 2/2000 | Komoto et al. |
| 6,045,870 A | 4/2000 | Noura et al. |
| 6,048,934 A | 4/2000 | Wilt et al. |
| 6,063,438 A | 5/2000 | Ogawa |
| 6,080,816 A | 6/2000 | Gregorovich et al. |
| 6,087,438 A | 7/2000 | Herber et al. |
| 6,204,331 B1 | 3/2001 | Sullivan et al. |
| 6,387,519 B1 | 5/2002 | Anderson et al. |

FOREIGN PATENT DOCUMENTS

| | | |
|---|---|---|
| EP | 0139187 | 5/1985 |
| EP | 0277816 | 8/1988 |
| EP | 0356963 | 3/1990 |
| EP | 0372124 | 6/1990 |
| EP | 0571187 | 11/1993 |
| EP | 0586048 | 3/1994 |
| EP | 0607710 | 7/1994 |
| EP | 0665252 | 8/1995 |
| EP | 0735118 | 10/1996 |
| EP | 0767232 | 4/1997 |
| EP | 0 774 499 | 5/1997 |
| EP | 0819719 | 1/1998 |
| EP | 0832947 | 4/1998 |
| EP | 0897962 | 2/1999 |
| EP | 0928800 | 7/1999 |
| EP | 0940422 | 9/1999 |
| EP | 0995778 | 4/2000 |
| GB | 1080549 | 8/1967 |
| GB | 1293331 | 10/1972 |
| GB | 1409741 | 10/1975 |
| GB | 2140018 | 11/1984 |
| GB | 2174400 | 11/1986 |
| JP | 54-1335 | 1/1979 |
| JP | 55-17073 | 5/1980 |
| JP | 56-157461 | 12/1981 |
| JP | 58-58123 | 12/1983 |
| JP | 58-217515 | 12/1983 |
| JP | 59-092948 | 5/1984 |
| JP | 60-168770 | 9/1985 |
| JP | 60-250069 | 12/1985 |
| JP | 61-141684 | 6/1986 |
| JP | 62-252480 | 11/1987 |
| JP | 64-004663 | 1/1989 |
| JP | 1-141952 | 6/1989 |
| JP | 3258866 | 11/1991 |
| JP | 03296567 | 12/1991 |
| JP | 5043696 | 2/1993 |
| JP | 5-51533 | 3/1993 |
| JP | 5065416 | 3/1993 |
| JP | 06100799 | 4/1994 |
| JP | 7070509 | 3/1995 |
| JP | 7-62214 | 7/1995 |
| JP | 9-165450 | 6/1997 |
| JP | 09227688 | 9/1997 |
| JP | 10017670 | 1/1998 |
| WO | WO 95/28452 | 10/1995 |
| WO | WO 96/01864 | 1/1996 |
| WO | WO 97/13741 | 4/1997 |
| WO | WO 97/26304 | 7/1997 |
| WO | WO 97/29854 | 8/1997 |
| WO | WO 97/44402 | 11/1997 |
| WO | WO 98/38251 | 9/1998 |
| WO | WO 98/40170 | 9/1998 |
| WO | WO-99/06487 | 2/1999 |
| WO | WO 99/58589 | 11/1999 |
| WO | WO 00/39183 | 7/2000 |
| WO | WO 00/58024 | 10/2000 |

OTHER PUBLICATIONS

Chattha et al., "High Solids Coatings from New Oligomers", Journal of Coatings Technology, vol. 55, No. 700, pp. 39–46, May 1983.

Degussa, No. 6, Technical Bulletin Pigments, Hydrophobic Aerosil® Manufacture, Properties, and Applications, $4^{th}$ Edition, Aug. 1986.

Williams et al., "Polyester Oligomers of Narrowed Molecular Weight Distribution", Water–Borne & Higher–Solids Coatings Symposium, pp. 478–512, Feb. 3–5, 1988, New Orleans, LA, USA.

"Siloxanes With Aliphatic Isocyanate Groups, A Tetrafunctional Cross–Linking Agent", Guangbin Zhou and Richard Fragnito, Johannes Smid, Polymer Bulletin 22, pp. 85–88 (1989), Springer–Verlag.

Odian, G., "Principles of Polymerization, 3rd Edition", John Wiley & Sons; Inc. ISBN: 0471610208, pp. 19–24, Published Oct. 18, 1991.

Greene, T. W. et al., "Protective Groups in Organic Synthesis", Second Edition, John Wiley & Sons, Inc., pp. 68–86; & 261–263.

"Regioselective Rhodium–Containing Catalysts for Ring–Opening Polymerizations and Hydrosilylations", J.V. Crivello and M. Fan, Journal of Polymer Science: Part A: Polymer Chemistry, vol. 30, pp. 1–11 (1992), John Wiley & Sons, Inc.

"Synthesis of Novel Organic Oligomers Containing Si–H Bonds", T. Iwahara, M. Jusakabe, M. Chiba and K. Yonezawa, Journal of Polymer Science: Part A: Polymer Chemistry, vol. 31, pp. 2617–2631 (1993), John Wiley & Sons, Inc.

Schmidt, C., et al., "Inorganic–organic Hybrid Coatings For Metal And Glass Surfaces", PMSE, Spring 1994, pp. 347–348.

Etranian, A. et al., "Les Silices Greffees Ameliorent Les Revetements", Peintures & Encres, Informations Chimie, n 371—Sep. 1995, pp. 85–88.

Espiard et al, "Poly(ethyl acrylate) latexes Encapsulating Nanoparticles of Silica: 3. Morphology and Mechanical Properties of Reinforced Films", Polymer, vol. 36, No. 23, pp. 4397–4403, Elsevier Science Ltd., 1995.

Jones, F., "Toward Solventless Liquid Coatings", Journal of Coatings Technology, vol. 68, No. 852, pp. 25–36, Jan. 1996.

"Highlink® OG Silica Organosols," Clariant, Societe Francais Hoechst, BL Chimie Fine, AE/MS.22/96.

Varerkar M.P., "Formulating High Solids Coatings: The Solution to VOC Problem", Paintinda, Sep. 1996, pp. 19–30.

Misra, M., et al., "Hybrid Inorganic–Organic UV–Curable Abrasion–Resistant Coatings", Surface Coatings International, (12) 1998, pp. 594–595.

Chandra et al., "Telechelic Oligomers for High Solids Coatings", Paintindia, Feb. 1997, pp. 35–44.

Jones, F., "New Technology Holds Key", Paint & Coatings Industry, May 1997, pp. 62–64.

Chemical Abstracts 128:62925a, Noboru et al., "Coating Process Using Siloxy–Containing Vinyl Polymer Clear Coatings", Jpn. Kokai Tokkyo Joho JP 09, 314,040, Sep. 12, 1997 (abstract).

Azuma et al, "Acrylic Oligomer for High Solid Automotive Top Coating System Having Excellent Acid Resistance", Progress In Organic Coatings, vol. 32, Sep.–Dec. 1997, pp. 1–7.

Gettwert, G., et al., "One–Component Silicate Binder Systems for Coatings", Surface Coatings International, (12) 1998, pp. 596–603.

Wu, Shobing, et al, "Effect of Siloxane Functionalized Caprolactone Polyols on Photocurable Epoxy Coatings", Journal of Coatings Technology, vol. 70, No. 887, Dec. 1998, pp. 53–62.

Perry, R. J., "Applications for Cross–linked Siloxane Particles", Chemtech, Feb. 1999, pp. 39–44.

Frings, S., et al., "Morphology of Hybrid Coatings Based on Polyester, Melamine Resin, and Silica and the Relation with Hardness and Scratch Resistance", Journal of Coatings Technology, vol. 72, No. 901, Feb. 2000, pp. 83–89.

Straehle, Dr. Wolfgang, Head of the Corporate Division, Research and Purchasing, and the Operating Division, Industrial Coating, BASF Coatings AG, Münster, Germany, "Scratchproof Clearcoat: High Gloss for the Long Term", www.pcimag.com, posted Jul. 25, 2000.

Wicks, Zeno W., et al., "Organic Coatings: Science And Technology," second edition, Chapter 23, pp. 433–439 (Wiley–Interscience, c1999).

Frings, S., et al., "Preparation and Characterization of Organic–Inorganic Hybrid Coatings Based on Crosslinked Polyester Systems and Silica, Formed Via the Sol–Gel Process", Presented at the International Waterborne, High–Solids, and Powder Coatings Symposium, Feb. 10–12, 1999, New Orleans, L.A. USA, pp. 35–43.

09/629,420, Anderson et al., "Flexible Coating Compositions Having Improved Scratch Resistance, Coated Substrates and Methods Related Thereto," filed Jul. 31, 2000.

09/629,421, Barancyk et al., "Coating Compositions Comprising Silyl Blocked Components, Coatings, Coated Substrates and Methods Related Thereto," filed Jul. 31, 2000.

09/629,422, Anderson et al., "Scratch Resistant Dual Care Coatings, Coated Substrates and Methods Related Thereto," filed Jul. 31, 2000.

09/629,443, Anderson et al., "Coating Compositions Having Improved Scratch Resistance, Coated Substrates and Methods Related Thereto," filed Jul. 31, 2000.

COATING COMPOSITIONS HAVING IMPROVED SCRATCH RESISTANCE, COATED SUBSTRATES AND METHODS RELATED THERETO

CROSS-REFERENCE TO RELATED APPLICATIONS

This application is a divisional of U.S. patent application No. 09/629,444 filed Jul. 31, 2000, now U.S. Pat. No. 6,657,001, which is a Continuation-in-Part application of U.S. patent application Ser. No. 09/489,042 filed Jan. 21, 2000 now Abandoned, which is a Continuation-in-Part application of U.S. patent application Ser. No. 09/365,069 filed Jul. 30, 1999 now Abandoned. U.S. patent application Ser. No. 09/489,042 claims the benefit of priority from Provisional Patent Application Serial No. 60/171,899 filed Dec. 23, 1999.

FIELD OF THE INVENTION

Certain embodiments of the present invention are directed to compositions comprising at least one polysiloxane comprising at least one reactive functional group, and a plurality of particles. Embodiments of the present invention also are directed to compositions comprising at least one polysiloxane comprising at least one reactive functional group, at least one reactant comprising at least one functional group that is reactive with at least one functional group selected from the at least one functional group of the at least one polysiloxane and at least one functional group of the at least one reactant, and a plurality of particles. Other embodiments of the present invention are directed to substrates coated with the aforementioned compositions. Further embodiments of the present invention are directed to methods for improving scratch resistance of a substrate. It will be apparent to one of ordinary skill in the art that specific embodiments of the present invention may be directed to some or all of these aspects of the present invention as well as other desirable aspects.

BACKGROUND OF THE INVENTION

Color-plus-clearcoating systems involving the application of a colored or pigmented basecoat to a substrate followed by application of a transparent or clearcoat over at least a portion of the basecoat have become increasingly popular as original finishes for a number of consumer products including, for example, automotive vehicles. The color-plus-clearcoating systems have outstanding appearance properties such as gloss and distinctness of image, due in large part to the clearcoat. Such color-plus-clearcoating systems have become popular for use with automotive vehicles, aerospace applications, floor coverings such as ceramic tiles and wood flooring, packaging coatings and the like.

Topcoat film-forming compositions, particularly those used to form the transparent clearcoat in color-plus-clearcoating systems for automotive applications, are subject to defects that occur during the assembly process as well as damage from numerous environmental elements. Such defects during the assembly process include paint defects in the application or curing of the basecoat or the clearcoat. Damaging environmental elements include acidic precipitation, exposure to ultraviolet radiation from sunlight, high relative humidity and high temperatures, defects due to contact with objects causing scratching of the coated surface, and defects due to impact with small, hard objects resulting in chipping of the coating surface.

Typically, a harder more highly crosslinked film may exhibit improved scratch resistance, but it is less flexible and much more susceptible to chipping or thermal cracking due to embrittlement of the film resulting from a high crosslink density. A softer, less crosslinked film, while not prone to chipping or thermal cracking, is susceptible to scratching, waterspotting, and acid etch due to a low crosslink density of the cured film.

Further, elastomeric automotive parts and accessories, for example, elastomeric bumpers and hoods, are typically coated "off site" and shipped to automobile assembly plants. The coating compositions applied to such elastomeric substrates are typically formulated to be very flexible so the coating can bend or flex with the substrate without cracking. To achieve the requisite flexibility, coating compositions for use on elastomeric substrates often are formulated to produce coatings with lower crosslink densities or to include flexibilizing adjuvants which act to lower the overall film glass transition temperature (Tg). While acceptable flexibility properties can be achieved with these formulating techniques, they also can result in softer films that are susceptible to scratching. Consequently, great expense and care must be taken to package the coated parts to prevent scratching of the coated surfaces during shipping to automobile assembly plants.

A number of patents teach the use of a coating comprising a dispersion of colloidal silica in an alcohol-water solution of a partial condensate of a silanol of the formula $RSi(OH)_3$ wherein at least 70 weight percent of the partial condensate is the partial condensate of $CH_3Si(OH)_3$. Representative, nonlimiting examples are U.S. Pat. Nos. 3,986,997, 4,027,073, 4,239,738, 4,310,600 and 4,410,594.

U.S. Pat. No. 4,822,828 teaches the use of a vinyl functional silane in an aqueous, radiation curable, coating composition which comprises: (a) from 50 to 85 percent, based on the total weight of the dispersion, of a vinyl functional silane, (b) from 15 to 50 percent, based on the total weight of the dispersion of a multifunctional acrylate, and (c) optionally, from 1 to 3 weight percent of a photoinitiator. The vinyl-functional silane is the partial condensate of silica and a silane, such that at least sixty percent of the silane is a vinyl-functional silane conforming to the formula $(R)_aSi(R')_b(R'')_c$ wherein R is allyl or vinyl functional alkyl; R' is hydrolyzable alkoxy or methoxy; R" is non-hydrolyzable, saturated alkyl, phenyl, or siloxy, such that $a+b+c=4$; and $a \geq 1$; $b \geq 1$; $c \geq 0$. The patent discloses that these coating compositions may be applied to plastic materials and cured by exposure to ultraviolet or electron beam irradiation to form a substantially clear, abrasion resistant layer.

U.S. Pat. No. 5,154,759 teaches a polish formulation comprising a reactive amine functional silicone polymer and at least one other ingredient normally used in polish formulations. One such ingredient disclosed in the patent is an abrasive, which is taught to be aluminum silicate, diatomaceous earth, pumice, fuller's earth, bentonite, silica, tripoli, hydrated calcium silicate, chalk, colloidal clay, magnesium oxide, red iron oxide, or tin oxide.

U.S. Pat. No. 5,686,012 describes modified particles comprising inorganic colored or magnetic particles as core particles, and at least one polysiloxane modified with at least one organic group which is coated on the surfaces of the core particles. The patent also discloses a water based paint comprising a paint base material and the modified particles as the pigment as well as a process for producing the modified particles.

U.S. Pat. No. 5,853,809 discloses clearcoats in color-plus-clear systems which have improved scratch resistance due to the inclusion in the coating composition of inorganic particles such as colloidal silicas which have been surface modified with a reactive coupling agent via covalent bonding.

Despite recent improvements in color-plus-clearcoating systems, there remains a need in the automotive coatings art for topcoats having good initial scratch resistance as well as enhanced retained scratch resistance without embrittlement of the film due to high crosslink density. Moreover, it would be advantageous to provide topcoats for elastomeric substrates utilized in the automotive industry which are both flexible and resistant to scratching.

SUMMARY OF THE INVENTION

In one embodiment, the present invention is directed to compositions formed from components comprising:

(a) at least one polysiloxane comprising at least one reactive functional group, the at least one polysiloxane comprising at least one of the following structural units (I):

$$R^1{}_n R^2{}_m SiO_{(4-n-m)/2} \qquad (I)$$

wherein each $R^1$, which may be identical or different, represents H, OH, a monovalent hydrocarbon group or a monovalent siloxane group; each $R^2$, which may be identical or different, represents a group comprising at least one reactive functional group; wherein m and n fulfill the requirements of $0<n<4$, $0<m<4$ and $2\leq(m+n)<4$;

(b) at least one reactant comprising at least one functional group that is reactive with at least one functional group selected from the at least one functional group of the at least one polysiloxane and at least one functional group of the at least one reactant; and (c) a plurality of particles selected from inorganic particles, composite particles, and mixtures thereof, wherein each component is different.

In another embodiment, the present invention is directed to compositions formed from components comprising:

(a) at least one polysiloxane comprising at least one reactive functional group, the at least one polysiloxane comprising at least one of the following structural units (I):

$$R^1{}_n R^2{}_m SiO_{(4-n-m)/2} \qquad (I)$$

wherein each $R^1$, which may be identical or different, represents H, OH, a monovalent hydrocarbon group or a monovalent siloxane group; each $R^2$, which may be identical or different, represents a group comprising at least one reactive functional group; wherein m and n fulfill the requirements of $0<n<4$, $0<m<4$ and $2\leq(m+n)<4$;

(b) at least one reactant comprising at least one functional group that is reactive with at least one functional group selected from the at least one functional group of the at least one polysiloxane and at least one functional group of the at least one reactant; and (c) a plurality of particles, wherein each component is different, and wherein a retained scratch resistance of the composition when cured is greater than a retained scratch resistance of a composition when cured that does not contain the plurality of particles and wherein each component is different.

In still another embodiment, the present invention is directed to compositions formed from components comprising:

(a) at least one polysiloxane comprising at least one reactive functional group, the at least one polysiloxane comprising at least one of the following structural units (I):

$$R^1{}_n R^2{}_m SiO_{(4-n-m)/2} \qquad (I)$$

wherein each $R^1$, which may be identical or different, represents H, OH, a monovalent hydrocarbon group or a monovalent siloxane group; each $R^2$, which may be identical or different, represents a group comprising at least one reactive functional group; wherein m and n fulfill the requirements of $0<n<4$, $0<m<4$ and $2\leq(m+n)\leq 4$;

and provided that when the at least one polysiloxane is a partial condensate of a silanol, then less than 70% by weight of the partial condensate is the partial condensate of $CH_3Si(OH)_3$; and (b) a plurality of particles having an average particle size of less than 100 nanometers prior to incorporation into the composition, wherein each component is different.

In a further embodiment, the present invention is directed to a powder composition formed from components comprising:

(a) at least one surface active agent comprising:

(i) at least one polysiloxane comprising at least one reactive functional group, the at least one polysiloxane comprising at least one of the following structural units (I):

$$R^1{}_n R^2{}_m SiO_{(4-n-m)/2} \qquad (I)$$

wherein each $R^1$, which may be identical or different, represents H, OH, a monovalent hydrocarbon group or a monovalent siloxane group; each $R^2$, which may be identical or different, represents a group comprising at least one reactive functional group, wherein m and n fulfill the requirements of $0<n<4$, $0<m<4$ and $2\leq(m+n)\leq 4$; and (ii) at least one polyacrylate surface active agent having at least one functional group selected from amino and hydroxyl functionality, acid functionality and acid and hydroxyl functionality; and (b) a plurality of particles, wherein each component is different.

Additionally, a coated substrate is disclosed to be within the scope of the present invention which comprises a substrate and a composition coated over at least a portion of the substrate, the composition being any of the foregoing compositions according to the present invention. The present invention also provides a method of coating a substrate which comprises applying over at least a portion of the substrate a composition, the composition being any of the foregoing compositions according to the present invention. A coated substrate also is provided which comprises a substrate and a composition coated over at least a portion of the substrate, the composition being any of the foregoing compositions according to the present invention. Coated automotive substrates also are disclosed to be within the present invention which comprise an automotive substrate which is coated, at least in part, by any of the foregoing compositions according to the present invention. The present invention also provides methods of making coated automotive substrates comprising obtaining an automotive substrate and applying over at least a portion of the automotive substrate any of the foregoing compositions according to the present invention.

Also provided are multi-component composite coating compositions which comprise a basecoat deposited from a pigmented coating composition, and any one of the foregoing topcoating compositions according to the present invention applied over at least a portion of the basecoat. The present invention also provides methods for making multi-component composite coating compositions comprising: (a) applying a pigmented composition to a substrate to form a basecoat; and (b) applying a topcoating composition over at least a portion of the basecoat to form a topcoat thereon, the topcoating composition being any of the foregoing compositions according to the present invention. The topcoating composition can be cured. In one embodiment, the coating composition is thermally cured after application to the substrate. In another embodiment, the coating composition is cured by exposure to ionizing radiation after application to the substrate. In yet another embodiment, the coating composition is cured by exposure to actinic radiation after application to the substrate, while in another embodiment the coating composition is cured by exposure to (1) ionizing radiation or actinic radiation and (2) thermal energy after application to the substrate.

Methods of improving the scratch resistance of a polymeric substrate or polymeric coating which comprise applying to the polymeric substrate or polymeric coating any of the foregoing compositions according to the present invention also are provided in another embodiment of the present invention. The present invention also provides methods for retaining the gloss of a polymeric substrate or polymeric coating over time which comprises applying to at least a portion of the polymeric substrate or polymeric coating any of the foregoing compositions according to the present invention. Also provided are methods for revitalizing the gloss of a polymeric substrate or polymeric coating comprising applying to at least a portion of the polymeric substrate or polymeric coating any of the foregoing compositions according to the present invention.

Other than in the operating examples, or where otherwise indicated, all numbers expressing quantities of ingredients, reaction conditions, and so forth used in the specification and claims are to be understood as being modified in all instances by the term "about." Accordingly, unless indicated to the contrary, the numerical parameters set forth in the following specification and attached claims are approximations that may vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contain certain errors necessarily resulting from the standard deviation found in their respective testing measurements.

DETAILED DESCRIPTION OF THE DRAWINGS

DETAILED DESCRIPTION OF THE PREFERRED EMBODIMENTS

Figure 1:
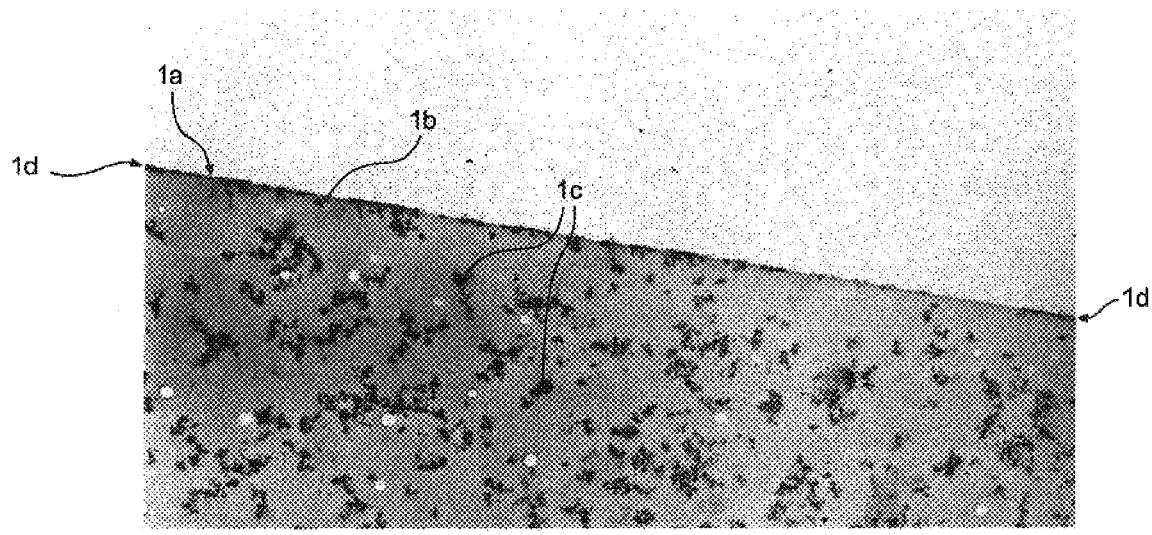
FIG. 1 is a transmission electron micrograph (30,000× magnification) of a cross-section of a cured transparent topcoating composition of the present invention which contains both colloidal silica and polysiloxane.

In one embodiment, the present invention is directed to a composition formed from components comprising: (a) at least one polysiloxane comprising at least one reactive functional group, the at least one polysiloxane comprising at least one of the following structural units (I)

$$R^1{}_n R^2{}_m SiO_{(4-n-m)/2} \qquad (I)$$

wherein $R^1$, $R^2$, m, and n are as described above for that structure; (b) at least one reactant comprising at least one functional group that is reactive with at least one functional group selected from the at least one functional group of the at least one polysiloxane and at least one functional group of the at least one reactant; and (c) a plurality of particles selected from inorganic particles, composite particles, and mixtures thereof, wherein each component is different.

It should be understood that the "at least one polysiloxane comprising at least one structural unit (I)" above is a polymer that contains at least two Si atoms per molecule. As used herein, the term "polymer" in meant to encompass oligomer, and includes without limitation both homopolymers and copolymers. It should also be understood that the at least one polysiloxane can include linear, branched, dendritic or cyclic polysiloxanes.

Moreover, as used herein, "formed from" denotes open, e.g., "comprising," claim language. As such, it is intended that a composition "formed from" a list of recited components be a composition comprising at least these recited components, and can further comprise other, nonrecited components, during the composition's formation.

Also, as used herein, the term "reactive" refers to a functional group that forms a covalent bond with another functional group under conditions sufficient to cure the composition.

Each of m and n depicted in the at least one structural unit (I) above fulfill the requirements of $0<n<4$, $0<m<4$ and $2\leq(m+n)\leq 4$. When (m+n) is 3, the value represented by n can be 2 and the value represented by m is 1. Likewise, when (m+n) is 2, the value represented by each of n and m is 1.

In a further embodiment, the present invention is directed to cured compositions as previously described wherein at least one reactant is present during the formation of the coating composition. As used herein, the "at least one reactant" refers to any material comprising a functional group that is reactive with at least one functional group selected from at least one functional group of the at least one polysiloxane and at least one functional group of the material. In one embodiment, the at least one reactant can be selected from at least one curing agent.

In another embodiment, the present invention is directed to a composition formed from components comprising (a) at least one polysiloxane comprising at least one reactive functional group, the at least one polysiloxane comprising at least one of the following structural units (I):

$$R^1_n R^2_m SiO_{(4-n-m)/2} \quad (I)$$

wherein $R^1$, $R^2$, m, and n are as described above for that structure; (b) at least one reactant comprising at least one functional group that is reactive with with at least one functional group selected from the at least one functional group of the at least one polysiloxane and at least one functional group of the at least one reactant; and (c) a plurality of particles, wherein each component is different and wherein a retained scratch resistance of the composition when cured is improved when compared to the retained scratch resistance of a composition when cured that does not contain the plurality of particles.

The term "retained scratch resistance" referred to throughout the specification and the appended claims will be described in detail below.

As used herein, the phrase "each component is different" refers to components which do not have the same chemical structure as other components in the composition.

As used herein, the term "cure" as used in connection with a composition, e.g., "a cured composition," shall mean that any crosslinkable components of the composition are at least partially crosslinked. In certain embodiments of the present invention, the crosslink density of the crosslinkable components, i.e., the degree of crosslinking, ranges from 5% to 100% of complete crosslinking. In other embodiments, the crosslink density ranges from 35% to 85% of full crosslinking. In other embodiments, the crosslink density ranges from 50% to 85% of full crosslinking.

One skilled in the art will understand that the presence and degree of crosslinking, i.e., the crosslink density, can be determined by a variety of methods, such as dynamic mechanical thermal analysis (DMTA) using a TA Instruments DMA 2980 DMTA analyzer conducted under nitrogen. This method determines the glass transition temperature and crosslink density of free films of coatings or polymers. These physical properties of a cured material are related to the structure of the crosslinked network.

According to this method, the length, width, and thickness of a sample to be analyzed are first measured, the sample is tightly mounted to the Polymer Laboratories MK III apparatus, and the dimensional measurements are entered into the apparatus. A thermal scan is run at a heating rate of 3° C./min, a frequency of 1 Hz, a strain of 120%, and a static force of 0.01 N, and sample measurements occur every two seconds. The mode of deformation, glass transition temperature, and crosslink density of the sample can be determined according to this method. Higher crosslink density values indicate a higher degree of crosslinking in the coating.

In another embodiment, the present invention is directed to a composition as described above, wherein $R^2$, which may be identical or different, represents a group comprising at least one reactive functional group selected from a hydroxyl group, a carboxyl group, an isocyanate group, a blocked polyisocyanate group, a primary amine group, a secondary amine group, an amide group, a carbamate group, a urea group, a urethane group, a vinyl group, an unsaturated ester group such as an acrylate group and a methacrylate group, a maleimide group, a fumarate group, an onium salt group such as a sulfonium group and an ammonium group, an anhydride group, a hydroxy alkylamide group, and an epoxy group. Non-limiting examples of blocked polyisocyanate groups include those derived from hexamethylene diisocyante (HDI), isopherone diisocyante (IPDI), and triazine derived isocyanates such as trisaminocarbonyl triisocanyurate TACT.

In another embodiment, the present invention is directed to a composition formed from components comprising:
(a) at least one polysiloxane comprising at least one reactive functional group, the at least one polysiloxane comprising at least one of the following structural units (I):

$$R^1_n R^2_m SiO_{(4-n-m)/2}$$

wherein each substituent group $R^1$, which may be identical or different, represents a group selected from H, OH, a monovalent hydrocarbon group, and a monovalent siloxane group; each substituent group $R^2$, which may be identical or different, represents a group comprising at least one reactive functional group selected from a hydroxyl group, a carboxyl group, an isocyanate group, a blocked polyisocyanate group, a primary amine group, a secondary amine group, an amide group, a carbamate group, a urea group, a urethane group, a vinyl group, an unsaturated ester group such as an acrylate group and a methacrylate group, a maleimide group, a fumarate group, an onium salt group such as a sulfonium group and an ammonium group, an anhydride group, a hydroxy alkylamide group, and an epoxy group; wherein m and n fulfill the requirements of $0<n<4$, $0<m<4$ and $2\leq(m+n)\leq 4$; and provided that when the at least one polysiloxane is a partial condensate of a silanol, then less than 70% by weight of the partial condensate is the partial condensate of $CH_3Si(OH)_3$; and (b) a plurality of having an average particle size of less than 100 nanometers prior to incorporation into the composition, wherein each component is different.

As used herein, a "monovalent hydrocarbon group" means a monovalent group having a backbone repeat unit based exclusively on carbon. As used herein, "monovalent" refers to a substituent group that, as a substituent group, forms only one single, covalent bond. For example, a monovalent group on the at least one polysiloxane will form one single covalent bond to a silicon atom in the backbone of the at least one polysiloxane polymer. As used herein, "hydrocarbon groups" are intended to encompass both branched and unbranched hydrocarbon groups.

Thus, when referring to a "monovalent hydrocarbon group," the hydrocarbon group can be branched or unbranched, acyclic or cyclic, saturated or unsaturated, or aromatic, and can contain from 1 to 24 (or in the case of an aromatic group from 3 to 24) carbon atoms. Nonlimiting examples of such hydrocarbon groups include alkyl, alkoxy, aryl, alkaryl, and alkoxyaryl groups. Nonlimiting examples of lower alkyl groups include, for example, methyl, ethyl, propyl, and butyl groups. As used herein, "lower alkyl" refers to alkyl groups having from 1 to 6 carbon atoms. One or more of the hydrogen atoms of the hydrocarbon can be substituted with heteroatoms. As used herein, "heteroatoms" means elements other than carbon, for example, oxygen, nitrogen, and halogen atoms.

As used herein, "siloxane" means a group comprising a backbone comprising two or more —SiO— groups. For example, the siloxane groups represented by $R^1$, which is discussed above, and R, which is discussed below, can be branched or unbranched, and linear or cyclic. The siloxane groups can be substituted with pendant organic substituent groups, for example, alkyl, aryl, and alkaryl groups. The organic substituent groups can be substituted with heteroatoms, for example oxygen, nitrogen, and halogen atoms, reactive functional groups, for example those reactive functional groups discussed above with reference to $R^2$, and mixtures of any of the foregoing.

In another embodiment, the present invention is directed to a composition as previously described, wherein the at least one reactant is selected from at least one curing agent.

In one embodiment, the present invention is directed to a composition as previously described, wherein the at least one polysiloxane comprises at least two reactive functional groups. The at least one polysiloxane can have a reactive group equivalent weight ranging from 50 to 1000 mg per gram of the at least one polysiloxane. In one embodiment, the at least one polysiloxane has a hydroxyl group equivalent weight ranging from 50 to 1000 mg KOH per gram of the at least one polysiloxane. In another embodiment, the at least one polysiloxane has a hydroxyl group equivalent weight ranging from 100 to 300 mg KOH per gram of the at least one polysiloxane, while in another embodiment, the hydroxyl group equivalent weight ranges from 100 to 500 mg KOH per gram. The hydroxyl equivalent weight may range between any combination of these values inclusive of the recited values.

In another embodiment, the present invention is directed to a composition as previously described, wherein at least one $R^2$ group represents a group comprising at least one reactive functional group selected from a hydroxyl group and a carbamate group. In yet another embodiment, the present invention is directed to a composition as previously described, wherein at least one $R^2$ group represents a group comprising at least two reactive functional groups selected from a hydroxyl group and a carbamate group. In another embodiment, the present invention is directed to a composition as previously described, wherein at least one $R^2$ group represents a group comprising an oxyalkylene group and at least two hydroxyl groups.

In one embodiment, the present invention is directed to a cured composition as previously described in which the at least one polysiloxane comprises reactive functional groups which are thermally curable functional groups. In an alternative embodiment, at least one of the reactive functional groups of the polysiloxane can be curable by ionizing radiation or actinic radiation. In another alternative embodiment, the polysiloxane can comprise at least one functional group which is curable by thermal energy and at least one functional group which is curable by ionizing or actinic radiation.

As used herein, "ionizing radiation" means high energy radiation and/or the secondary energies resulting from conversion of this electron or other particle energy to neutron or gamma radiation, said energies being at least 30,000 electron volts and can range from 50,000 to 300,000 electron volts. While various types of ionizing irradiation are suitable for this purpose, such as X-ray, gamma and beta rays, the radiation produced by accelerated high energy electrons or electron beam devices is preferred. The amount of ionizing radiation in rads for curing compositions according to the present invention can vary based upon such a factors as the components of the coating formulation, the thickness of the coating upon the substrate, the temperature of the coating composition and the like. Generally, a 1 mil (25 micrometer) thick wet film of a coating composition according to the present invention can be cured in the presence of oxygen through its thickness to a tack-free state upon exposure to from 0.5 to 5 megarads of ionizing radiation.

"Actinic radiation" is light with wavelengths of electromagnetic radiation ranging from the ultraviolet ("UV") light range, through the visible light range, and into the infrared range. Actinic radiation which can be used to cure coating compositions of the present invention generally has wavelengths of electromagnetic radiation ranging from 150 to 2,000 nanometers (nm), can range from 180 to 1,000 nm, and also can range from 200 to 500 nm. Examples of suitable ultraviolet light sources include mercury arcs, carbon arcs, low, medium or high pressure mercury lamps, swirl-flow plasma arcs and ultraviolet light emitting diodes. Preferred ultraviolet light-emitting lamps are medium pressure mercury vapor lamps having outputs ranging from 200 to 600 watts per inch (79 to 237 watts per centimeter) across the length of the lamp tube. Generally, a 1 mil (25 micrometer) thick wet film of a coating composition according to the present invention can be cured through its thickness to a tack-free state upon exposure to actinic radiation by passing the film at a rate of 20 to 1000 feet per minute (6 to 300 meters per minute) under four medium pressure mercury vapor lamps of exposure at 200 to 1000 millijoules per square centimeter of the wet film.

Useful radiation-curable groups which can be present as reactive functional groups on the polysiloxane include unsaturated groups such as vinyl groups, acrylate groups, methacrylate groups, ethacrylate groups, epoxy groups such as cycloaliphatic epoxy groups. In one embodiment, the UV curable groups can include acrylate groups, maleimides, fumarates, and vinyl ethers.

In one embodiment, the present invention is directed to a composition as previously described wherein the at least one polysiloxane (a) has the following structure (II) or (III):

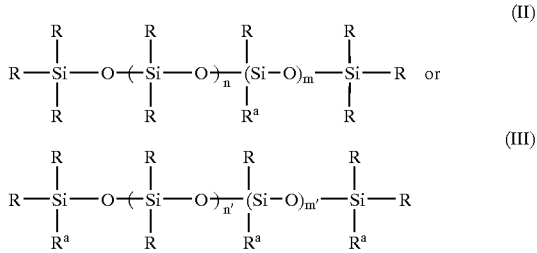

wherein: m has a value of at least 1; m' ranges from 0 to 75; n ranges from 0 to 75; n' ranges from 0 to 75; each R, which may be identical or different, is selected from H, OH, a monovalent hydrocarbon group, a monovalent siloxane group, and mixtures of any of the foregoing; and —$R^a$ comprises the following structure (IV):

wherein —$R^3$ is selected from an alkylene group, an oxyalkylene group, an alkylene aryl group, an alkenylene group, an oxyalkenylene group, and an alkenylene aryl group; and X represents a group which comprises at least one reactive functional group selected from a hydroxyl group, a carboxyl group, an isocyanate group, a blocked polyisocyanate group, a primary amine group, a secondary amine group, an amide group, a carbamate group, a urea group, a urethane group, a vinyl group, an unsaturated ester group such as an acrylate group and a methacrylate group, a maleimide group, a fumarate group, an onium salt group such as a sulfonium group and an ammonium group, an anhydride group, a hydroxy alkylamide group, and an epoxy group.

As used herein, "alkylene" refers to an acyclic or cyclic, saturated hydrocarbon group having a carbon chain length of from $C_2$ to $C_{25}$. Nonlimiting examples of suitable alkylene groups include, but are not limited to, those derived from propenyl, 1-butenyl, 1-pentenyl, 1-decenyl, and 1-heneicosenyl, such as, for example $(CH_2)_3$, $(CH_2)_4$, $(CH_2)_5$, $(CH_2)_{10}$, and $(CH_2)_{23}$, respectively, as well as isoprene and myrcene.

As used herein, "oxyalkylene" refers to an alkylene group containing at least one oxygen atom bonded to, and interposed between, two carbon atoms and having an alkylene carbon chain length of from $C_2$ to $C_{25}$. Nonlimiting examples of suitable oxyalkylene groups include those derived from trimethylolpropane monoallyl ether, trimethylolpropane diallyl ether, pentaerythritol monoallyl ether, polyethoxylated allyl alcohol, and polypropoxylated allyl alcohol, such as —$(CH_2)_3OCH_2C(CH_2OH)_2(CH_2CH_2$—).

As used herein, "alkylene aryl" refers to an acyclic alkylene group substituted with at least one aryl group, for example, phenyl, and having an alkylene carbon chain length of $C_2$ to $C_{25}$. The aryl group can be further substituted, if desired. Nonlimiting examples of suitable substituent groups for the aryl group include, but are not limited to, hydroxyl groups, benzyl groups, carboxylic acid groups, and aliphatic hydrocarbon groups. Nonlimiting examples of suitable alkylene aryl groups include, but are not limited to, those derived from styrene and 3-isopropenyl-$\alpha,\alpha$-dimethylbenzyl isocyanate, such as —$(CH_2)_2C_6H_4$— and —$CH_2CH(CH_3)C_6H_3(C(CH_3)_2(NCO)$. As used herein, "alkenylene" refers to an acyclic or cyclic hydrocarbon group having one or more double bonds and having an alkenylene carbon chain length of $C_2$ to $C_{25}$. Nonlimiting examples of suitable alkenylene groups include those derived from propargyl alcohol and acetylenic diols, for example, 2,4,7,9-tetramethyl-5-decyne-4,7-diol which is commercially available from Air Products and Chemicals, Inc. of Allentown, Pa. as SURFYNOL 104.

Formulae (II) and (III) are diagrammatic, and are not intended to imply that the parenthetical portions are necessarily blocks, although blocks may be used where desired. In some cases the polysiloxane may comprise a variety of siloxane units. This is increasingly true as the number of siloxane units employed increases, and especially true when mixtures of a number of different siloxane units are used. In those instances where a plurality of siloxane units are used and it is desired to form blocks, oligomers can be formed which can be joined to form the block compound. By judicious choice of reactants, compounds having an alternating structure or blocks of alternating structure may be used.

In yet another embodiment, the present invention is directed to any composition as previously described, wherein the particles are different from the at least one polysiloxane. In yet another embodiment, the present invention is directed to any composition as previously described, wherein the particles have an average particle size less than 100 nanometers prior to incorporation into the composition. Methods known to one of ordinary skill in the art for measuring the average particle size are discussed in detail below.

In one embodiment, the present invention is directed to a composition as previously described wherein the substituent group $R^3$ represents an oxyalkylene group. In another embodiment, $R^3$ represents an oxyalkylene group, and X represents a group which comprises at least two reactive functional groups.

In another embodiment, the present invention is directed to any composition as previously described comprising at least one polysiloxane having the structure (II) or (III) described above, wherein (n+m) ranges from 2 to 9. In yet another embodiment, in compositions comprising at least one polysiloxane having the structure (II) or (III) described above, (n+m) ranges from 2 to 3. In another embodiment, in compositions comprising at least one polysiloxane having the structure (II) or (III) described above, (n'+m') ranges from 2 to 9. In another embodiment, in compositions comprising at least one polysiloxane having the structure (II) or (III) described above, (n'+m') ranges from 2 to 3.

In one embodiment, the present invention is directed to any composition as previously described wherein X represents a group comprising at least one reactive functional group selected from a hydroxyl group and a carbamate group. In another embodiment, the present invention is directed to composition as previously described wherein X represents a group which comprises at least two hydroxyl groups. In yet another embodiment, the present invention is directed to any composition as previously described wherein X represents a group which comprises at least one group selected from H, a monohydroxy-substituted organic group, and a group having the following structure (V):

wherein the substituent group $R^4$ represents

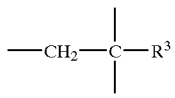

when p is 2 and the substituent group $R^3$ represents a $C_1$ to $C_4$ alkylene group, or
the substituent group $R^4$ represents

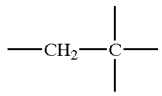

when p is 3.

wherein at least a portion of X represents a group having the structure (V). In another embodiment, the present invention is directed to any composition as previously described wherein m is 2 and p is 2.

In one embodiment, the present invention is directed to any composition as previously described comprising at least one polysiloxane having the structure (II) or (III), wherein, if no curing agent is present, and if the at least one polysiloxane is a partial condensate of a silanol, then less than 70% by weight of the partial condensate is the partial condensate of $CH_3Si(OH)_3$. These components used in these various embodiments can be selected from the coating components discussed above.

In one embodiment, the present invention is directed to compositions as previously described wherein the at least one polysiloxane (a), when added to the other component(s) of the composition, is present in the composition in an amount ranging from 0.01 to 90 weight percent based on total weight of the resin solids of the components which form the composition. In another embodiment, the present invention is directed to compositions as previously described wherein the at least one polysiloxane (a), when added to the other component(s) of the composition, is present in the composition in an amount from at least 2 weight percent based on total weight of the resin solids of the components which form the composition. In another embodiment, the present invention is directed to compositions as previously described wherein the at least one polysiloxane (a), when added to the other component(s) of the composition, is present in the composition in an amount from at least 5 weight percent based on total weight of components which form the composition. In yet another embodiment, the present invention is directed to compositions as previously described wherein the at least one polysiloxane (a), when added to the other component(s) of the composition, is present in the composition in an amount from at least 10 weight percent based on total weight of the resin solids of the components which form the composition.

In one embodiment, the present invention is directed to compositions as previously described wherein the at least one polysiloxane (a), when added to the other component(s) of the composition, is present in the composition in an amount less than 90 weight percent based on total weight of the resin solids of the components which form the composition. In another embodiment, the present invention is directed to compositions as previously described wherein the at least one polysiloxane (a), when added to the other component(s) of the composition, is present in the composition in an amount less than 80 weight percent based on total weight of the resin solids of the components which form the composition. In another embodiment, the present invention is directed to compositions as previously described wherein the at least one polysiloxane (a), when added to the other component(s) of the composition, is present in the composition in an amount less than 65 weight percent based on total weight of the resin solids of the components which form the composition. In yet another embodiment, the present invention is directed to compositions as previously described wherein the at least one polysiloxane (a), when added to the other component(s) of the composition, is present in the composition in an amount less than 30 weight percent based on total weight of the resin solids of the components which form the composition. The amount of at least one polysiloxane (a) may range between any combination of these values inclusive of the recited values.

As used herein "based on total weight of the resin solids" of the components which form the composition means that the amount of the component added during the formation of the composition is based upon the total weight of the solids (non-volatiles) of the polysiloxane, any film-forming component and any curing agent present during formation of the coating composition, but not including the particles, any solvent, or any additive solids such as hindered amine stabilizers, catalysts, photoinitiators, pigments including extender pigments and fillers, flow additives, and UV light absorbers.

In another embodiment, the present invention is directed to any composition as previously described, wherein the at least one polysiloxane (a) is the reaction product of at least the following reactants: (i) at least one polysiloxane of the formula (VI):

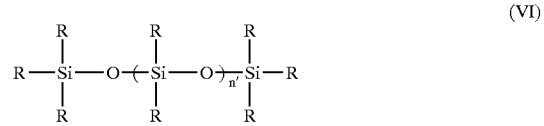

(VI)

wherein each substituent group R, which may be identical or different, represents a group selected from H, OH, a monovalent hydrocarbon group, a monovalent siloxane group, and mixtures of any of the foregoing; at least one of the groups represented by R is H, and n' ranges from 0 to 100, also can range from 0 to 10, and can further range from 0 to 5, such that the percent of SiH content of the polysiloxane ranges from 2 to 50 percent, and can range from 5 to 25 percent; and (ii) at least one molecule which comprises at least one functional group selected a hydroxyl group, a carboxyl group, an isocyanate group, a blocked polyisocyanate group, a primary amine group, a secondary amine group, an amide group, a carbamate group, a urea group, a urethane group, a vinyl group, an unsaturated ester group such as an acrylate group and a methacrylate group, a maleimide group, a fumarate group, an onium salt group such as a sulfonium group and an ammonium group, an anhydride group, a hydroxy alkylamide group, and an epoxy group, and at least one unsaturated bond capable of undergoing a hydrosilylation reaction. In another embodiment, the at least one molecule comprises at least one functional group chosen from hydroxyl groups.

It should be appreciated that the various R groups can be the same or different, and, in certain embodiments, the R groups will be entirely monovalent hydrocarbon groups or will be a mixture of different groups such as monovalent hydrocarbon groups and hydroxyl groups.

In another embodiment, this reaction product is ungelled. As used herein, "ungelled" refers to a reaction product that is substantially free of crosslinking and has an intrinsic viscosity when dissolved in a suitable solvent, as determined, for example, in accordance with ASTM-D1795 or ASTM-D4243. The intrinsic viscosity of the reaction product is an indication of its molecular weight. A gelled reaction product, on the other hand, since it is of an extremely high molecular weight, will have an intrinsic viscosity too high to measure. As used herein, a reaction product that is "substantially free of crosslinking" refers to a reaction product that has a weight average molecular weight (Mw), as determined by gel permeation chromatography, of less than 1,000,000.

It also should be noted that the level of unsaturation contained in reactant (ii) above, can be selected to obtain an ungelled reaction product. In other words, when a polysiloxane containing silicon hydride (i) having a higher average value of Si—H functionality is used, reactant (ii) can have a lower level of unsaturation. For example, the polysiloxane containing silicon hydride (i) can be a low molecular weight material where n' ranges from 0 to 5 and the average value of Si—H functionality is two or less. In this case, reactant (ii) can contain two or more unsaturated bonds capable of undergoing hydrosilylation reaction without the occurrence of gelation.

Nonlimiting examples of polysiloxanes containing silicon hydride (i) include 1,1,3,3-tetramethyl disiloxane where n' is 0 and the average Si—H functionality is two; and polymethyl polysiloxane containing silicon hydride, where n' ranges from 4 to 5 and the average Si—H functionality is approximately two, such as is commercially available from BASF Corporation as MASILWAX BASE@.

Materials for use as reactant (ii) above can include hydroxyl functional group-containing allyl ethers such as those selected from trimethylolpropane monoallyl ether, pentaerythritol monoallyl ether, trimethylolpropane diallyl ether, polyoxyalkylene alcohols such as polyethoxylated alcohol, polypropoxylated alcohol, and polybutoxylated alcohol, undecylenic acid-epoxy adducts, allyl glycidyl ether-carboxylic acid adducts, and mixtures of any of the foregoing. Mixtures of hydroxyl functional polyallyl ethers with hydroxyl functional monoallyl ethers or allyl alcohols are suitable as well. In certain instances, reactant (ii) can contain at least one unsaturated bond in a terminal position. Reaction conditions and the ratio of reactants (i) and (ii) are selected so as to form the desired functional group.

The hydroxyl functional group-containing polysiloxane (a) can be prepared by reacting a polysiloxane containing hydroxyl functional groups with an anhydride to form the half-ester acid group under reaction conditions that favor only the reaction of the anhydride and the hydroxyl functional groups, and avoid further esterification from occuring. Nonlimiting examples of suitable anhydrides include hexahydrophthalic anhydride, methyl hexahydrophthalic anhydride, phthalic anhydride, trimellitic anhydride, succinic anhydride, chlorendic anhydride, alkenyl succinic anhydride, and substituted alkenyl anhydrides such as octenyl succinic anhydride, and mixtures of any of the foregoing.

The half-ester group-containing reaction product thus prepared can be further reacted with a monoepoxide to form a polysiloxane containing secondary hydroxyl group(s). Nonlimiting examples of suitable monoepoxides are phenyl glycidyl ether, n-butyl glycidyl ether, cresyl glycidyl ether, isopropyl glycidyl ether, glycidyl versatate, for example, CARDURA E available from Shell Chemical Co., and mixtures of any of the foregoing.

In another embodiment, the present invention is directed to compositions as previously described wherein the at least one polysiloxane (a) is a carbamate functional group-containing polysiloxane which comprises the reaction product of at least the following reactants:
 (i) at least one polysiloxane containing silicon hydride of structure (VI) above where R and n' are as described above for that structure;
 (ii) at least one hydroxyl functional group-containing material having one or more unsaturated bonds capable of undergoing hydrosilylation reaction as described above; and
 (iii) at least one low molecular weight carbamate functional material, comprising the reaction product of an alcohol or glycol ether and a urea.

Examples of such "low molecular weight carbamate functional material" include, but are not limited to, alkyl carbamates such as methyl carbamate and hexyl carbamates, and glycol ether carbamates such as those described in U.S. Pat. Nos. 5,922,475 and 5,976,701, which are incorporated herein by reference.

The carbamate functional groups can be incorporated into the polysiloxane by reacting the hydroxyl functional group-containing polysiloxane with the low molecular weight carbamate functional material via a "transcarbamoylation" process. The low molecular weight carbamate functional material, which can be derived from an alcohol or glycol ether, can react with free hydroxyl groups of a polysiloxane polyol, that is, material having an average of two or more hydroxyl groups per molecule, yielding a carbamate functional polysiloxane (a) and the original alcohol or glycol ether. Reaction conditions and the ratio of reactants (i), (ii) and (iii) are selected so as to form the desired groups.

The low molecular weight carbamate functional material can be prepared by reacting the alcohol or glycol ether with urea in the presence of a catalyst such as butyl stannoic acid. Nonlimiting examples of suitable alcohols include lower molecular weight aliphatic, cycloaliphatic and aromatic alcohols, for example, methanol, ethanol, propanol, butanol, cyclohexanol, 2-ethylhexanol, and 3-methylbutanol. Nonlimiting examples of suitable glycol ethers include ethylene glycol methyl ether, and propylene glycol methyl ether. The incorporation of carbamate functional groups into the polysiloxane also can be achieved by reacting isocyanic acid with free hydroxyl groups of the polysiloxane.

As aforementioned, in addition to or in lieu of hydroxyl or carbamate functional groups, the at least one polysiloxane (a) can contain one or more other reactive functional groups such as carboxyl groups, isocyanate groups, blocked polyisocyanate groups, carboxylate groups, primary or secondary amine groups, amide groups, urea groups, urethane groups, anhydride groups, hydroxy alkylamide groups, epoxy groups, and mixtures of any of the foregoing.

When at least one polysiloxane (a) contains carboxyl functional groups, the at least one polysiloxane (a) can be prepared by reacting at least one polysiloxane containing hydroxyl functional groups as described above with a polycarboxylic acid or anhydride. Nonlimiting examples of polycarboxylic acids suitable for use include adipic acid, succinic acid, and dodecanedioic acid. Nonlimiting examples of suitable anhydrides include those described above. Reaction conditions and the ratio of reactants are selected so as to form the desired functional groups.

In the case where at least one polysiloxane (a) contains one or more isocyanate functional groups, the at least one polysiloxane (a) can be prepared by reacting at least one polysiloxane containing hydroxyl functional groups as described above with a polyisocyanate, such as a diisocyanate. Nonlimiting examples of suitable polyisocyanates include aliphatic polyisocyanates, such as aliphatic diisocyanates, for example, 1,4-tetramethylene diisocyanate and 1,6-hexamethylene diisocyanate; cycloaliphatic polyisocyanates, for example, 1,4-cyclohexyl diisocyanate, isophorone diisocyanate, and $\alpha,\alpha$-xylylene diisocyanate; and aromatic polyisocyanates, for example, 4,4'-diphenylmethane diisocyanate, 1,3-phenylene diisocyanate, and tolylene diisocyanate. These and other suitable polyisocyanates are described in more detail in U.S. Pat. No. 4,046,729, at column 5, line 26 to column 6, line 28, incorporated herein by reference. Reaction conditions and the ratio of reactants are selected so as to form the desired functional groups.

The substituent group X in structure (IV) can comprise a polymeric urethane or urea-containing material which is terminated with isocyanate, hydroxyl, primary or secondary amine functional groups, or mixtures of any of the foregoing. When the substituent group X comprises such functional groups, the at least one polysiloxane (a) can be the reaction product of at least a polysiloxane polyol as described above, one or more polyisocyanates and, optionally, one or more compounds having at least two active hydrogen atoms per molecule selected from hydroxyl groups, primary amine groups, and secondary amine groups.

Nonlimiting examples of suitable polyisocyanates are those described above. Nonlimiting examples of compounds having at least two active hydrogen atoms per molecule include polyols and polyamines containing primary or secondary amine groups.

Nonlimiting examples of suitable polyols include polyalkylene ether polyols, including thio ethers; polyester polyols, including polyhydroxy polyesteramides; and hydroxyl-containing polycaprolactones and hydroxy-containing acrylic interpolymers. Also useful are polyether polyols formed from the oxyalkylation of various polyols, for example, glycols such as ethylene glycol, 1,6-hexanediol, Bisphenol A, and the like, or higher polyols such as trimethylolpropane, pentaerythritol and the like. Polyester polyols also can be used. These and other suitable polyols are described in U.S. Pat. No. 4,046,729 at column 7, line 52 to column 8, line 9; column 8, line 29 to column 9, line 66; and U.S. Pat. No. 3,919,315 at column 2, line 64 to column 3, line 33, both incorporated herein by reference.

Nonlimiting examples of suitable polyamines include primary or secondary diamines or polyamines in which the groups attached to the nitrogen atoms can be saturated or unsaturated, aliphatic, alicyclic, aromatic, aromatic-substituted-aliphatic, aliphatic-substituted-aromatic and heterocyclic. Exemplary suitable aliphatic and alicyclic diamines include 1,2-ethylene diamine, 1,2-porphylene diamine, 1,8-octane diamine, isophorone diamine, propane-2,2-cyclohexyl amine, and the like. Suitable aromatic diamines include phenylene diamines and the toluene diamines, for example, o-phenylene diamine and p-tolylene diamine. These and other suitable polyamines are described in detail in U.S. Pat. No. 4,046,729 at column 6, line 61 to column 7, line 26, incorporated herein by reference.

In one embodiment, the substituent group X of the structure (IV) can comprise a polymeric ester-containing group which is terminated with hydroxyl or carboxylic acid functional groups. When X is such a group, at least one polysiloxane (a) can be the reaction product of one or more polysiloxane polyols as described above, one or more materials having at least one carboxylic acid functional group, and one or more organic polyols. Nonlimiting suitable examples of materials having at least one carboxylic acid functional group include carboxylic acid group-containing polymers well-known in the art, for example, carboxylic acid group-containing acrylic polymers, polyester polymers, and polyurethane polymers, such as those described in U.S. Pat. No. 4,681,811. Nonlimiting examples of suitable organic polyols include those described above.

To form the at least one polysiloxane (a) containing epoxy groups, at least one polysiloxane containing hydroxyl functional groups as described above can be further reacted with a polyepoxide. The polyepoxide can be an aliphatic or cycloaliphatic polyepoxide or mixtures of any of the foregoing. Nonlimiting examples of polyepoxides suitable for use include epoxy functional acrylic copolymers prepared from at least one ethylenically unsaturated monomer having at least one epoxy group, for example glycidyl (meth)acrylate and allyl glycidyl ether, and one or more ethylenically unsaturated monomers which have no epoxy functionality. The preparation of such epoxy functional acrylic copolymers is described in detail in U.S. Pat. No. 4,681,811 at column 4, line 52 to column 5, line 50, incorporated herein by reference. Reaction conditions and the ratio of reactants are selected so as to form the desired functional groups.

In one embodiment, the present invention is directed to compositions as previously described wherein the composition comprises a plurality of particles. In another embodiment, the present invention is directed to compositions as previously described wherein the particles have an average particle size less than 50 microns prior to incorporation into the composition. In another embodiment, the present invention is directed to compositions as previously described wherein the particles have an average particle size ranging from 1 to less than 1000 nanometers prior to incorporation into the composition. In another embodiment, the present invention is directed to compositions as previously described wherein the particles have an average particle size ranging from 1 to 100 nanometers prior to incorporation into the composition.

In another embodiment, the present invention is directed to compositions as previously described wherein the particles have an average particle size ranging from 5 to 50 nanometers prior to incorporation into the composition. In another embodiment, the present invention is directed to compositions as previously described wherein the particles have an average particle size ranging from 5 to 25 nanometers prior to incorporation into the composition. The particle size may range between any combination of these values inclusive of the recited values.

In an embodiment where the average particle size of the particles is greater than one micron, the average particle size can be measured according to known laser scattering techniques. For example, the average particle size of such particles is measured using a Horiba Model LA 900 laser diffraction particle size instrument, which uses a helium-neon laser with a wave length of 633 nm to measure the size of the particles and assumes the particle has a spherical shape, i.e., the "particle size" refers to the smallest sphere that will completely enclose the particle.

In an embodiment of the present invention wherein the size of the particles is less than or equal to one micron, the average particle size can be determined by visually examining an electron micrograph of a transmission electron microscopy ("TEM") image, measuring the diameter of the particles in the image, and calculating the average particle size based on the magnification of the TEM image. One of ordinary skill in the art will understand how to prepare such a TEM image, and a description of one such method is disclosed in the examples set forth below. In one nonlimiting embodiment of the present invention, a TEM image with 105,000× magnification is produced, and a conversion factor is obtained by dividing the magnification by 1000. Upon visual inspection, the diameter of the particles is measured in millimeters, and the measurement is converted to nanometers using the conversion factor. The diameter of the particle refers to the smallest diameter sphere that will completely enclose the particle.

The shape (or morphology) of the particles can vary depending upon the specific embodiment of the present invention and its intended application. For example generally spherical morphologies (such as solid beads, microbeads, or hollow spheres), can be used, as well as particles that are cubic, platy, or acicular (elongated or fibrous). Additionally, the particles can have an internal structure that is hollow, porous or void free, or a combination of any of the foregoing, e.g., a hollow center with porous or solid walls. For more information on suitable particle characteristics see H. Katz et al. (Ed.), *Handbook of Fillers and Plastics* (1987) at pages 9–10, which are specifically incorporated by reference herein.

It will be recognized by one skilled in the art that mixtures of one or more particles having different average particle sizes can be incorporated into the compositions in accordance with the present invention to impart the desired properties and characteristics to the compositions. For example, particles of varying particle sizes can be used in the compositions according to the present invention.

The particles can be formed from materials selected from polymeric and nonpolymeric inorganic materials, polymeric and nonpolymeric organic materials, composite materials, and mixtures of any of the foregoing. As used herein, the term "polymeric inorganic material" means a polymeric material having a backbone repeat unit based on an element or elements other than carbon. For more information see James Mark et al., *Inorganic Polymers*, Prentice Hall Polymer Science and Engineering Series, (1992) at page 5, which is specifically incorporated by reference herein. As used herein, the term "polymeric organic materials" means synthetic polymeric materials, semisynthetic polymeric materials and natural polymeric materials, all of which have a backbone repeat unit based on carbon.

An "organic material," as used herein, means carbon containing compounds wherein the carbon is typically bonded to itself and to hydrogen, and often to other elements as well, and excludes binary compounds such as the carbon oxides, the carbides, carbon disulfide, etc.; such ternary compounds as the metallic cyanides, metallic carbonyls, etc.; and carbon-containing ionic compounds such as metallic carbonates, for example, calcium carbonate and sodium carbonate. See R. Lewis, Sr., *Hawley's Condensed Chemical Dictionary*, (12th Ed. 1993) at pages 761–762, and M. Silberberg, Chemistry *The Molecular Nature of Matter and Change* (1996) at page 586, which are specifically incorporated by reference herein.

As used herein, the term "inorganic material" means any material that is not an organic material.

As used herein, the term "composite material" means a combination of two or more differing materials. The particles formed from composite materials generally have a hardness at their surface that is different from the hardness of the internal portions of the particle beneath its surface. More specifically, the surface of the particle can be modified in any manner well known in the art, including, but not limited to, chemically or physically changing its surface characteristics using techniques known in the art.

For example, a particle can be formed from a primary material that is coated, clad or encapsulated with one or more secondary materials to form a composite particle that has a softer surface. In yet another alternative embodiment, particles formed from composite materials can be formed from a primary material that is coated, clad or encapsulated with a different form of the primary material. For more information on particles useful in the present invention, see G. Wypych, *Handbook of Fillers*, 2nd Ed. (1999) at pages 15–202, which are specifically incorporated by reference herein.

The particles suitable for use in the compositions of the invention can comprise inorganic elements or compounds known in the art. Suitable particles can be formed from ceramic materials, metallic materials, and mixtures of any of the foregoing. Suitable ceramic materials comprise metal oxides, metal nitrides, metal carbides, metal sulfides, metal silicates, metal borides, metal carbonates, and mixtures of any of the foregoing. Specific, nonlimiting examples of metal nitrides are, for example, boron nitride; specific, nonlimiting examples of metal oxides are, for example, zinc oxide; nonlimiting examples of suitable metal sulfides are, for example, molybdenum disulfide, tantalum disulfide, tungsten disulfide, and zinc sulfide; nonlimiting suitable examples of metal silicates are, for example, aluminum silicates and magnesium silicates such as vermiculite.

The particles can comprise, for example, a core of essentially a single inorganic oxide such as silica in colloidal, fumed, or amorphous form, alumina or colloidal alumina, titanium dioxide, cesium oxide, yttrium oxide, colloidal yttria, zirconia, e.g., colloidal or amorphous zirconia, and mixtures of any of the foregoing; or an inorganic oxide of one type upon which is deposited an organic oxide of another type. It should be understood that when the composition of the invention is employed as a transparent topcoat, for example, as a clearcoat in a multi-component composite coating composition, particles should not seriously interfere with the optical properties of the composition. As used herein, "transparent" means that the cured coating has a BYK Haze index of less than 50 as measured using a BYK/Haze Gloss instrument.

Nonpolymeric, inorganic materials useful in forming the particles of the present invention comprise inorganic materials selected from graphite, metals, oxides, carbides, nitrides, borides, sulfides, silicates, carbonates, sulfates, and hydroxides. A nonlimiting example of a useful inorganic oxide is zinc oxide. Nonlimiting examples of suitable inorganic sulfides include molybdenum disulfide, tantalum disulfide, tungsten disulfide, and zinc sulfide. Nonlimiting examples of useful inorganic silicates include aluminum silicates and magnesium silicates, such as vermiculite. Nonlimiting examples of suitable metals include molybdenum, platinum, palladium, nickel, aluminum, copper, gold, iron, silver, alloys, and mixtures of any of the foregoing.

In one embodiment, the present invention is directed to compositions as previously described wherein the particles are selected from fumed silica, amorphous silica, colloidal silica, alumina, colloidal alumina, titanium dioxide, cesium oxide, yttrium oxide, colloidal yttria, zirconia, colloidal zirconia, and mixtures of any of the foregoing. In another embodiment, the present invention is directed to compositions as previously described wherein the particles include colloidal silica. As disclosed above, these materials can be surface treated or untreated.

The composition can comprise precursors suitable for forming silica particles in situ by a sol-gel process. The composition according to the present invention can comprise alkoxy silanes which can be hydrolyzed to form silica particles in situ. For example, tetraethylortho silicate can be hydrolyzed with an acid such as hydrochloric acid and condensed to form silica particles. Other useful particles include surface-modified silicas such as are described in U.S. Pat. No. 5,853,809 at column 6, line 51 to column 8, line 43, which is incorporated herein by reference.

In one embodiment of the present invention, the particles have a hardness value greater than the hardness value of materials that can abrade a polymeric coating or a polymeric substrate. Examples of materials that can abrade the polymeric coating or polymeric substrate include, but are not limited to, dirt, sand, rocks, glass, carwash brushes, and the like. The hardness values of the particles and the materials that can abrade the polymeric coating or polymeric substrate can be determined by any conventional hardness measurement method, such as Vickers or Brinell hardness, but is preferably determined according to the original Mohs' hardness scale which indicates the relative scratch resistance of the surface of a material on a scale of one to ten. The Mohs' hardness values of several nonlimiting examples of particles formed from inorganic materials suitable for use in the present invention are given in Table A below.

TABLE A

| Particle material | Mohs' hardness (original scale) |
| --- | --- |
| Boron nitride | $2^1$ |
| Graphite | $0.5-1^2$ |
| Molybdenum disulfide | $1^3$ |
| Talc | $1-1.5^4$ |
| Mica | $2.8-3.2^5$ |
| Kaolinite | 2.0-2.56 |
| Gypsum | $1.6-2^7$ |
| Calcite (calcium carbonate) | $3^8$ |
| Calcium fluoride | $4^9$ |
| zinc oxide | $4.5^{10}$ |
| Aluminum | $2.5^{11}$ |
| Copper | $2.5-3^{12}$ |
| Iron | $4-5^{13}$ |
| Gold | $2.5-3^{14}$ |
| Nickel | $5^{15}$ |
| Palladium | $4.8^{16}$ |
| Platinum | $4.3^{17}$ |
| Silver | $2.5-4^{18}$ |
| Zinc sulfide | $3.5-4^{19}$ |

[1] K. Ludema, Friction, Wear, Lubrication, (1996) at page 27, which is hereby incorporated by reference.
[2] R. Weast (Ed.), Handbook of Chemistry and Physics, CRC Press (1975) at page F-22.
[3] R. Lewis, Sr., Hawley's Condensed Chemical Dictionary, (12th Ed. 1993) at page 793, which is hereby incorporated by reference.
[4] Hawley's Condensed Chemical Dictionary, (12th Ed. 1993) at page 1113, which is hereby incorporated by reference.
[5] Hawley's Condensed Chemical Dictionary, (12th Ed. 1993) at page 784, which is hereby incorporated by reference.
[6] Handbook of Chemistry and Physics at page F-22.
[7] Handbook of Chemistry and Physics at page F-22.
[8] Friction, Wear, Lubrication at page 27.
[9] Friction, Wear, Lubrication at page 27.
[10] Friction, Wear, Lubrication at page 27.
[11] Friction, Wear, Lubrication at page 27.
[12] Handbook of Chemistry and Physics at page F-22.
[13] Handbook of Chemistry and Physics at page F-22.
[14] Handbook of Chemistry and Physics at page F-22.
[15] Handbook of Chemistry and Physics at page F-22.
[16] Handbook of Chemistry and Physics at page F-22.
[17] Handbook of Chemistry and Physics at page F-22.
[18] Handbook of Chemistry and Physics at page F-22.
[19] R. Weast (Ed.), Handbook of Chemistry and Physics, CRC Press (71st Ed. 1990) at page 4–158.

In one embodiment, the Mohs' hardness value of the particles is greater than 5. In certain embodiments, the Mohs' hardness value of the particles, such as silica, is greater than 6.

As mentioned above, the Mohs' hardness scale relates to the resistance of a material to scratching. The present invention therefore further contemplates particles that have a hardness at their surface that is different from the hardness of the internal portions of the particle beneath its surface. More specifically, and as discussed above, the surface of the particle can be modified in any manner well known in the art, including, but not limited to, chemically changing the particle's surface characteristics using techniques known in the art such that the surface hardness of the particle is greater the hardness of the materials that can abrade the polymeric coating or polymeric substrate while the hardness of the particle beneath the surface is less than the hardness of the materials that can abrade the polymeric coating or polymeric substrate.

As another alternative, a particle can be formed from a primary material that is coated, clad or encapsulated with one or more secondary materials to form a composite material that has a harder surface. Alternatively, a particle can be formed from a primary material that is coated, clad or encapsulated with a differing form of the primary material to form a composite material that has a harder surface.

In one example, and without limiting the present invention, an inorganic particle formed from an inorganic material such as silicon carbide or aluminum nitride can be provided with a silica, carbonate or nanoclay coating to form a useful composite particle. In another nonlimiting example, a silane coupling agent with alkyl side chains can interact with the surface of an inorganic particle formed from an inorganic oxide to provide a useful composite particle having a "softer" surface. Other examples include cladding, encapsulating or coating particles formed from nonpolymeric or polymeric materials with differing nonpolymeric or polymeric materials. A specific nonlimiting example of such composite particles is DUALITE™, which is a synthetic polymeric particle coated with calcium carbonate that is commercially available from Pierce and Stevens Corporation of Buffalo, N.Y.

In one nonlimiting embodiment of the invention, the particles are formed from solid lubricant materials. As used herein, the term "solid lubricant" means any solid used between two surfaces to provide protection from damage during relative movement or to reduce friction and wear. In one embodiment, the solid lubricants are inorganic solid lubricants. As used herein, "inorganic solid lubricant" means that the solid lubricants have a characteristic crystalline habit which causes them to shear into thin, flat plates which readily slide over one another and thus produce an antifriction lubricating effect. See R. Lewis, Sr., *Hawley's Condensed Chemical Dictionary*, (12th Ed. 1993) at page 712, which is specifically incorporated by reference herein. Friction is the resistance to sliding one solid over another. F. Clauss, *Solid Lubricants and Self-Lubricating Solids* (1972) at page 1, which is specifically incorporated by reference herein.

In one nonlimiting embodiment of the invention, the particles have a lamellar structure. Particles having a lamellar structure are composed of sheets or plates of atoms in hexagonal array, with strong bonding within the sheet and weak van der Waals bonding between sheets, providing low shear strength between sheets. A nonlimiting example of a lamellar structure is a hexagonal crystal structure. Inorganic solid particles having a lamellar fullerene (i.e., buckyball) structure also are useful in the present invention.

Nonlimiting examples of suitable materials having a lamellar structure that are useful in forming the particles of the present invention include boron nitride, graphite, metal dichalcogenides, mica, talc, gypsum, kaolinite, calcite, cadmium iodide, silver sulfide, and mixtures of any of the foregoing. Suitable metal dichalcogenides include molybdenum disulfide, molybdenum diselenide, tantalum disulfide, tantalum diselenide, tungsten disulfide, tungsten diselenide, and mixtures of any of the foregoing.

The particles can be formed from nonpolymeric, organic materials. Nonlimiting examples of nonpolymeric, organic materials useful in the present invention include, but are not limited to, stearates (such as zinc stearate and aluminum stearate), diamond, carbon black, and stearamide.

The particles can be formed from inorganic polymeric materials. Nonlimiting examples of useful inorganic polymeric materials include polyphosphazenes, polysilanes, polysiloxane, polygeremanes, polymeric sulfur, polymeric selenium, silicones, and mixtures of any of the foregoing. A specific, nonlimiting example of a particle formed from an inorganic polymeric material suitable for use in the present invention is TOSPEARL[20], which is a particle formed from cross-linked siloxanes and is commercially available from Toshiba Silicones Company, Ltd. of Japan.

[20] See R. J. Perry "Applications for Cross-Linked Siloxane Particles" *Chemtech*, February 1999 at pages 39–44.

The particles can be formed from synthetic, organic polymeric materials. Nonlimiting examples of suitable organic polymeric materials include, but are not limited to, thermoset materials and thermoplastic materials. As used herein, a "thermoplastic" material is a material that softens when exposed to heat and returns to its original condition when cooled to room temperature. Nonlimiting examples of suitable thermoplastic materials include thermoplastic polyesters such as polyethylene terephthalate, polybutylene terephthalate, and polyethylene naphthalate, polycarbonates, polyolefins such as polyethylene, polypropylene, and polyisobutene, acrylic polymers such as copolymers of styrene and an acrylic acid monomer, and polymers containing methacrylate, polyamides, thermoplastic polyurethanes, vinyl polymers, and mixtures of any of the foregoing.

Nonlimiting examples of suitable thermoset materials include thermoset polyesters, vinyl esters, epoxy materials, phenolics, aminoplasts, thermoset polyurethanes, and mixtures of any of the foregoing. A specific, nonlimiting example of a synthetic polymeric particle formed from an epoxy material is an epoxy microgel particle. As used herein, a "thermoset" material is a material that solidifies or "sets" irreversibly when heated. A thermoset material has formed a crosslinked network. As used herein, a polymeric material is "crosslinked" if it at least partially forms a polymeric network. One skilled in the art will understand that the presence and degree of crosslinking (crosslink density) can be determined by a variety of methods, such as dynamic mechanical thermal analysis (DMTA) using a TA Instruments DMA 2980 DMTA analyzer conducted under nitrogen. This method determines the glass transition temperature and crosslink density of free films of coatings or polymers. These physical properties of a cured material are related to the structure of the crosslinked network.

The particles also can be hollow particles formed from materials selected from polymeric and nonpolymeric inorganic materials, polymeric and nonpolymeric organic materials, composite materials, and mixtures of any of the foregoing. Nonlimiting examples of suitable materials from which the hollow particles can be formed are described above.

In an embodiment of the present invention, the at least one polysiloxane (a) is nonreactive with the particles.

In one embodiment, the present invention is directed to compositions as previously described wherein the particles, when added to the other components of the composition, are present in the composition in an amount ranging from 0.01 to 75 weight percent based on total weight of the resin solids of the components which form the composition. In another embodiment, the present invention is directed to compositions as previously described wherein the particles, when added to the other components of the composition, are present in the composition in an amount of at least 0.1 weight percent based on total weight of the resin solids of the components which form the composition. In another embodiment, the present invention is directed to compositions as previously described wherein the particles, when added to the other components of the composition, are present in the composition in an amount greater than 0.5 weight percent based on total weight of the resin solids of the components which form the composition. In another embodiment, the present invention is directed to compositions as previously described wherein the particles, when added to the other components of the composition, are present in the composition in an amount greater than 5 weight percent based on total weight of the resin solids of the components which form the composition.

In yet another embodiment, the present invention is directed to compositions as previously described wherein, the particles, when added to the other components of the composition, are present in the composition in an amount less than 75 weight percent based on total weight of the resin solids of the components which form the composition. In a further embodiment, the present invention is directed to compositions as previously described wherein the particles, when added to the other components of the composition, are present in the composition in an amount less than 50 weight percent based on total weight of the resin solids of the components which form the composition. In another embodiment, the present invention is directed to compositions as previously described wherein the particles, when added to the other components of the composition, are present in the composition in an amount less than 20 weight percent based on total weight of the resin solids of the components which form the composition. In another embodiment, the present invention is directed to compositions as previously described wherein the particles, when added to the other components of the composition, are present in the composition in an amount less than 10 weight percent based on total weight of the resin solids of the components which form the composition. The amount of particles may range betweeen any combination of these values inclusive of the recited values.

Prior to incorporation, one class of particles which can be used according to the present invention includes sols, such as an organosol, of the particles. These sols can be of a wide variety of small-particle, colloidal silicas having an average particle size in ranges such as identified above.

The colloidal silicas can be surface modified during or after the particles are initially formed. These surface modified silicas may contain on their surface chemically bonded carbon-containing moieties, as well as such groups as anhydrous $SiO_2$ groups and SiOH groups, various ionic groups physically associated or chemically bonded within the surface of the silica, adsorbed organic groups, or combinations of any of the foregoing, depending on the characteristics of the particular silica desired. Such surface modified silicas are described in detail in U.S. Pat. No. 4,680,204, which is incorporated herein by reference.

Such materials can be prepared by a variety of techniques in various forms, nonlimiting examples comprise organosols and mixed sols. As used herein the term "mixed sols" is intended to include those dispersions of colloidal silica in which the dispersing medium comprises both an organic liquid and water. Such small particle colloidal silicas are readily available, are essentially colorless and have refractive indices which permit their inclusion in compositions that, without additional pigments or components known in the art to color or decrease the transparency of such compositions, result in colorless, transparent coatings.

Suitable nonlimiting examples of particles include colloidal silicas, such as those commercially available from Nissan Chemical Company under the trademark ORGANOSILICASOLS™ such as ORGANOSILICASOL™ MT-ST, and from Clariant Corporation as HIGHLINK™; colloidal aluminas, such as those commercially available from Nalco Chemical under the trademark NALCO 8676®; and colloidal zirconias, such as those commercially available from Nissan Chemical Company under the trademark HIT-32M®.

The particles can be incorporated into the compositions of the invention in the form of a stable dispersion. When the particles are in a colloidal form, the dispersions can be prepared by dispersing the particles in a carrier under agitation and solvent that is present can be removed under vacuum at ambient temperatures. In certain embodiments, the carrier can be other than a solvent, such as the surface active agents described in detail below, including, but not limited to a polysiloxane containing reactive functional groups, including, but not limited to, the at least one polysiloxane (a).

In one embodiment, the particles, such as colloidal silica, are dispersed in the at least one polysiloxane (a). Alternatively, the dispersions can be prepared as described in U.S. Pat. Nos. 4,522,958 or 4,526,910, which are incorporated by reference herein. The particles can be "cold-blended" with the at least one polysiloxane (a) prior to incorporation into, the inventive compositions. Alternatively, the particles can be post-added to an admixture of any remaining composition components (including, but not limited to, the at least one polysiloxane (a)) and dispersed therein using dispersing techniques well-known in the art.

When the particles are in other than colloidal form, for example, but not limited to, agglomerate form, the dispersions can be prepared by dispersing the agglomerate in the carrier, for example, but not limited to, the at least one polysiloxane (a), to stably disperse the particles therein. Dispersion techniques such as grinding, milling, microfluidizing, ultrasounding, or any other pigment dispersing techniques well known in the art of coatings formulation can be used. Alternatively, the particles can be dispersed by any other dispersion techniques known in the art. If desired, the particles in other than colloidal form can be post-added to an admixture of other composition components and dispersed therein using any dispersing techniques known in the art.

The particles according to the present invention that are applied to the polymeric substrate or polymeric coating, for example, but not limited to, the electrodeposited coating, the primer coating, or the topcoat, can be present in a dispersion, suspension or emulsion in a carrier. Nonlimiting examples of suitable carriers include, but are not limited to, water, solvents, surfactants, or a mixture of any of the foregoing. Nonlimiting examples of suitable solvents include, but are not limited to, mineral oil, alcohols such as methanol or butanol, ketones such as methyl amyl ketone, aromatic hydrocarbons such as xylene, glycol ethers such as ethylene glycol monobutyl ether, esters, aliphatics, and mixtures of any of the foregoing.

As discussed above, besides the at least one polysiloxane (a), the compositions of the present invention can be formed from at least one reactant comprising at least one functional group that is reactive with at least one reactive functional group of the at least one polysiloxane (a). In one embodiment, the at least one reactant is selected from at least one curing agent.

In a further embodiment, the present invention is directed to compositions as previously described wherein a curing agent is present. This curing agent can be selected from an aminoplast resin, a polyisocyanate, a blocked polyisocyanate, a polyepoxide, a polyacid, a polyol, and mixtures of any of the foregoing.

In another embodiment, the present invention is directed to compositions as previously described wherein the curing agent is an aminoplast. Aminoplast resins, which comprise phenoplasts, as curing agents for hydroxyl, carboxylic acid, and carbamate functional group-containing materials are well known in the art. Suitable aminoplasts, such as those discussed above, are known to those of ordinary skill in the art. Aminoplasts can be obtained from the condensation reaction of formaldehyde with an amine or amide. Nonlimiting examples of amines or amides include melamine, urea, or benzoguanamine. Condensates with other amines or amides can be used; for example, aldehyde condensates of glycoluril, which give a high melting crystalline product useful in powder coatings. While the aldehyde used is most often formaldehyde, other aldehydes such as acetaldehyde, crotonaldehyde, and benzaldehyde can be used.

The aminoplast contains imino and methylol groups and in certain instances at least a portion of the methylol groups are etherified with an alcohol to modify the cure response. Any monohydric alcohol can be employed for this purpose including methanol, ethanol, n-butyl alcohol, isobutanol, and hexanol.

Nonlimiting examples of aminoplasts include melamine-, urea-, or benzoguanamine-formaldehyde condensates, in certain instances monomeric and at least partially etherified with one or more alcohols containing from one to four carbon atoms. Nonlimiting examples of suitable aminoplast resins are commercially available, for example, from Cytec Industries, Inc. under the trademark CYMEL®, and from Solutia, Inc. under the trademark RESIMENE®.

In another embodiment, the present invention is directed to compositions as previously described wherein the curing agent, when added to the other components of the composition, is generally present in an amount ranging from 1 weight percent to 65 weight percent based on total weight of the resin solids of the components which form the composition.

Other curing agents suitable for use include, but are not limited to, polyisocyanate curing agents. As used herein, the term "polyisocyanate" is intended to include blocked (or capped) polyisocyanates as well as unblocked polyisocyanates. The polyisocyanate can be an aliphatic or an aromatic polyisocyanate, or a mixture of the foregoing two. Diisocyanates can be used, although higher polyisocyanates such as isocyanurates of diisocyanates are often used. Higher polyisocyanates also can be used in combination with diisocyanates. Isocyanate prepolymers, for example, reaction products of polyisocyanates with polyols also can be used. Mixtures of polyisocyanate curing agents can be used.

If the polyisocyanate is blocked or capped, any suitable aliphatic, cycloaliphatic, or aromatic alkyl monoalcohol known to those skilled in the art can be used as a capping agent for the polyisocyanate. Other suitable capping agents include oximes and lactams. When used, the polyisocyanate curing agent is typically present, when added to the other components in the composition, in an amount ranging from 5 to 65 weight percent, can be present in an amount ranging from 10 to 45 weight percent, and often are present in an amount ranging from 15 to 40 percent by weight based on the total weight of the resin solids of the components which form the composition, inclusive of the recited values.

Other useful curing agents comprise blocked isocyanate compounds such as the tricarbamoyl triazine compounds described in detail in U.S. Pat. No. 5,084,541, which is incorporated by reference herein. When used, the blocked isocyanate curing agent can be present, when added to the other components in the composition, in an amount ranging up to 20 weight percent, and can be present in an amount ranging from 1 to 20 weight percent, based on the total weight of the resin solids of the components which form the composition, inclusive of the recited values.

Anhydrides as curing agents for hydroxyl functional group-containing materials also are well known in the art and can be used in the present invention. Nonlimiting examples of anhydrides suitable for use as curing agents in the compositions of the invention include those having at least two carboxylic acid anhydride groups per molecule which are derived from a mixture of monomers comprising an ethylenically unsaturated carboxylic acid anhydride and at least one vinyl co-monomer, for example, styrene, alpha-methyl styrene, vinyl toluene, and the like. Nonlimiting examples of suitable ethylenically unsaturated carboxylic acid anhydrides include maleic anhydride, citraconic anhydride, and itaconic anhydride. Alternatively, the anhydride can be an anhydride adduct of a diene polymer such as maleinized polybutadiene or a maleinized copolymer of butadiene, for example, a butadiene/styrene copolymer. These and other suitable anhydride curing agents are described in U.S. Pat. No. 4,798,746 at column 10, lines 16–50; and in U.S. Pat. No. 4,732,790 at column 3, lines 41–57, both of which are incorporated herein by reference.

Polyepoxides as curing agents for carboxylic acid functional group-containing materials are well known in the art. Nonlimiting examples of polyepoxides suitable for use in the compositions of the present invention comprise polyglycidyl ethers of polyhydric phenols and of aliphatic alcohols, which can be prepared by etherification of the polyhydric phenol, or aliphatic alcohol with an epihalohydrin such as epichlorohydrin in the presence of alkali. These and other suitable polyepoxides are described in U.S. Pat. No. 4,681,811 at column 5, lines 33 to 58, which is incorporated herein by reference.

Suitable curing agents for epoxy functional group-containing materials comprise polyacid curing agents, such as the acid group-containing acrylic polymers prepared from an ethylenically unsaturated monomer containing at least one carboxylic acid group and at least one ethylenically unsaturated monomer which is free from carboxylic acid groups. Such acid functional acrylic polymers can have an acid number ranging from 30 to 150. Acid functional group-containing polyesters can be used as well. The above-described polyacid curing agents are described in further detail in U.S. Pat. No. 4,681,811 at column 6, line 45 to column 9, line 54, which is incorporated herein by reference.

Also well known in the art as curing agents for isocyanate functional group-containing materials are polyols, that is, materials having two or more hydroxyl groups per molecule. Nonlimiting examples of such materials suitable for use in the compositions of the invention include polyalkylene ether polyols, including thio ethers; polyester polyols, including polyhydroxy polyesteramides; and hydroxyl-containing polycaprolactones and hydroxy-containing acrylic interpolymers. Also useful are polyether polyols formed from the oxyalkylation of various polyols, for example, glycols such as ethylene glycol, 1,6-hexanediol, Bisphenol A and the like, or higher polyols such as trimethylolpropane, pentaerythritol, and the like. Polyester polyols also can be used. These and other suitable polyol curing agents are described in U.S. Pat. No. 4,046,729 at column 7, line 52 to column 8, line 9; column 8, line 29 to column 9, line 66; and U.S. Pat. No. 3,919,315 at column 2, line 64 to column 3, line 33, both of which are incorporated herein by reference.

Polyamines also can be used as curing agents for isocyanate functional group-containing materials. Nonlimiting examples of suitable polyamine curing agents include primary or secondary diamines or polyamines in which the radicals attached to the nitrogen atoms can be saturated or unsaturated, aliphatic, alicyclic, aromatic, aromatic-substituted-aliphatic, aliphatic-substituted aromatic, and heterocyclic. Nonlimiting examples of suitable aliphatic and alicyclic diamines include 1,2-ethylene diamine, 1,2-porphylene diamine, 1,8-octane diamine, isophorone diamine, propane-2,2-cyclohexyl amine, and the like. Nonlimiting examples of suitable aromatic diamines include phenylene diamines and the toluene diamines, for example, o-phenylene diamine and p-tolylene diamine. These and other suitable polyamines described in detail in U.S. Pat. No. 4,046,729 at column 6, line 61 to column 7, line 26, which is incorporated herein by reference.

When desired, appropriate mixtures of curing agents may be used. It should be mentioned that compositions can be formulated as a one-component composition where a curing agent such as an aminoplast resin and/or a blocked polyisocyanate such as those described above is admixed with other composition components. The one-component composition can be storage stable as formulated. Alternatively, compositions can be formulated as a two-component composition where a polyisocyanate curing agent such as those described above can be added to a pre-formed admixture of the other composition components just prior to application. The pre-formed admixture can comprise curing agents such as aminoplast resins and/or triazine compounds such as those described above.

In another embodiment in which the coating is cured by actinic radiation or the combination of actinic radiation and thermal energy, the components from which the coating composition are formed further can comprise at least one photoinitiator or photosensitizer which provides free radicals or cations to initiate the polymerization process. Useful photoinitiators have an adsorption in the range of 150 to 2,000 nm. Non-limiting examples of useful photoinitiators include benzoin, benzophenone, hydroxy benzophenone, anthraquinone, thioxanthone, substituted benzoins such as butyl isomers of benzoin ethers, $\alpha,\alpha$-diethoxyacetophenone, $\alpha,\alpha$-dimethoxy-$\alpha$-phenylacetophenone, 2-hydroxy-2-methyl-1-phenyl propane 1-one and 2,4,6-trimethyl benzoyl diphenyl phosphine oxide.

In an alternative embodiment, the reactant can comprise at least one material which has at least one reactive functional group which is blocked with a silyl group. This silyl-blocked material is different from the polysiloxane (a) discussed above. Hydrolysis of the silyl group regenerates the reactive functional group on the material which is available for further reaction with the curing agent. A non-limiting example of suitable silyl blocking groups include those having the following structure (IX):

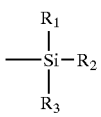

(IX)

wherein each $R_1$, $R_2$ and $R_3$, which may be identical or different, represents an alkyl group having from 1 to 18 carbon atoms, a phenyl group or an allyl group.

Non-limiting examples of suitable functional groups which can be blocked by the silyl group comprise hydroxyl groups, carbamate groups, carboxyl groups, amide groups and mixtures thereof. In one embodiment, the functional groups are hydroxyl groups.

Non-limiting examples of suitable compounds which can be reacted with the functional group to form the silyl group comprise hexamethyldisilazane, trimethylchlorosilane, trimethylsilyldiethylamine, t-butyl dimethylsilyl chloride, diphenyl methylsilyl chloride, hexamethyl disilylazide, hexamethyl disiloxane, trimethylsilyl triflate, hexamethyldisilyl acetamide, N,N'-bis[trimethylsilyl]-urea, and mixtures of any of the foregoing.

Further examples of suitable compounds for silylation reactions, and suitable reaction conditions and reagents for trimethylsilylation reactions are discussed in Example 28 below and in T. Greene et al., *Protective Groups in Organic Synthesis*, (2d. ed. 1991) at pages 68–86 and 261–263, which are incorporated herein by reference.

The backbone of the material can be a compound which comprises at least one linkage selected from an ester linkage, a urethane linkage, a urea linkage, an amide linkage, a siloxane linkage, and an ether linkage or a polymer such as a polyester, an acrylic polymer, a polyurethane, a polyether, a polyurea, a polyamide, and copolymers of any of the foregoing.

Suitable compounds or polymers having at least one ester linkage and at least one reactive functional group include half-esters formed from reacting at least one polyol with at least one 1,2-anhydride. The half-esters are suitable because they are of relatively low molecular weight and are quite reactive with epoxy functionality.

The half-ester is obtained, for example, by reaction between a polyol and a 1,2-anhydride under conditions sufficient to ring open the anhydride forming the half-ester with substantially no polyesterification occurring. Such reaction products are of relatively low molecular weight with narrow molecular weight distributions and low viscosity. By "substantially no polyesterification occurring" means that the carboxyl groups formed by the reaction of the anhydride are not further esterified by the polyol in a recurring manner. Further to this embodiment less than 10, and typically less than 5 weight percent of high molecular weight polyester is formed based on the resin solids of the components which form the coating composition.

The 1,2-anhydride and polyol can be mixed together and the reaction can be conducted in the presence of an inert atmosphere such as nitrogen and a solvent such as a ketone or aromatic hydrocarbon to dissolve the solid ingredients and/or lower the viscosity of the reaction mixture.

In one embodiment, for the desired ring opening reaction and half-ester formation, a 1,2-dicarboxylic anhydride can be used. Reaction of a polyol with a carboxylic acid instead of an anhydride would require esterification by condensation and elimination of water by distillation, and such conditions would promote undesired polyesterification. According to the present invention, the reaction temperature can be low, i.e., less than 135° C. and typically ranging from 70° C. to 135° C. The time of reaction can vary somewhat depending upon the temperature of reaction, and generally ranges from 10 minutes to 24 hours.

The equivalent ratio of anhydride to hydroxyl on the polyol can be at least 0.8:1 (the anhydride being considered monofunctional) to obtain maximum conversion to the desired half-ester. Ratios less than 0.8:1 can be used but such ratios may result in increased formation of lower functionality half-esters.

Useful anhydrides include aliphatic, cycloaliphatic, olefinic, cycloolefinic and aromatic anhydrides. Substituted aliphatic and aromatic anhydrides also are useful provided the substituents do not adversely affect the reactivity of the anhydride or the properties of the resultant polyester. Examples of substituents include chloro, alkyl and alkoxy. Examples of anhydrides include succinic anhydride, methylsuccinic anhydride, dodecenyl succinic anhydride, octadecenylsuccinic anhydride, phthalic anhydride, tetrahydrophthalic anhydride, methyltetrahydrophthalic anhydride, hexahydrophthalic anhydride, alkyl hexahydrophthalic anhydrides such as methylhexahydrophthalic anhydride, tetrachlorophthalic anhydride, endomethylene tetrahydrophthalic anhydride, chlorendic anhydride, itaconic anhydride, citraconic anhydride and maleic anhydride.

Among the polyols which can be used are simple polyols, that is, those containing from 2 to 20 carbon atoms, as well as polymeric polyols such as polyester polyols, polyurethane polyols and acrylic polyols.

Among the simple polyols which can be used are diols, triols, tetrols and mixtures thereof. Non-limiting examples of the polyols include those containing from 2 to 10 carbon atoms such as aliphatic polyols. Specific examples include but are not limited to the following compositions: di-trimethylol propane (bis(2,2-dimethylol)dibutylether); pentaerythritol; 1,2,3,4-butanetetrol; sorbitol; trimethylolpropane; trimethylolethane; 1,2,6-hexanetriol; glycerine; trishydroxyethyl isocyanurate; dimethylol propionic acid; 1,2,4-butanetriol; 2-ethyl-1,3-hexanediol; TMP/epsilon-caprolactone triols; ethylene glycol; 1,2-propanediol; 1,3-propanediol; 1,4-butanediol; 1,5-pentanediol; 1,6-hexanediol; neopentyl glycol; diethylene glycol; dipropylene glycol; 1,4-cyclohexanedimethanol and 2,2,4-trimethylpentane-1,3 diol.

With regard to oligomeric polyols, suitable polyols which can be used are polyols made from reaction of diacids with triols, such as trimethylol propane/cyclohexane diacid and trimethylol propane/adipic acid.

With regard to polymeric polyols, the polyester polyols can be prepared by esterification of an organic polycarboxylic acid or anhydride thereof with organic polyols and/or an epoxide. Usually, the polycarboxylic acids and polyols are aliphatic or aromatic dibasic acids or acid anhydrides and diols.

The polyols which can be employed in making the polyester include trimethylol propane, di-trimethylol propane, alkylene glycols such as ethylene glycol, neopentyl glycol and other glycols such as hydrogenated bisphenol A, cyclohexanediol, cyclohexanedimethanol, the reaction products of lactones and diols, for example, the reaction product of epsilon-caprolactone and ethylene glycol, hydroxyalkylated bisphenols, polyester glycols, for example, poly(oxytetramethylene)glycol and the like.

The acid component of the polyester comprises monomeric carboxylic acids or anhydrides having 2 to 18 carbon atoms per molecule. Among the acids which which can be used are phthalic acid, isophthalic acid, terephthalic acid, tetrahydrophthalic acid, hexahydrophthalic acid, methyl-hexahydrophthalic acid, adipic acid, azelaic acid, sebacic acid, maleic acid, glutaric acid, chlorendic acid, tetrachlorophthalic acid and other dicarboxylic acids of varying types. Also, there may be employed higher polycarboxylic acids such as trimellitic acid and tricarballylic acid.

Besides the polyester polyols formed from polybasic acids and polyols, polylactone-type polyesters also can be employed. These products can be formed from the reaction of a lactone such as epsilon-caprolactone and a polyol such as ethylene glycol, diethylene glycol and trimethylolpropane.

Besides polyester polyols, polyurethane polyols such as polyester-urethane polyols which can be formed from reacting an organic polyisocyanate with a polyester polyol such as those described above can be used. The organic polyisocyanate can be reacted with a polyol so that the OH/NCO equivalent ratio is greater than 1:1 so that the resultant product contains free hydroxyl groups. The organic polyisocyanate which can be used in preparing the polyurethane polyols can be an aliphatic or aromatic polyisocyanate or a mixture. Diisocyanates can be used, although higher polyisocyanates such as triisocyanates can also be used, but they do result in higher viscosities.

Examples of suitable diisocyanates include 4,4'-diphenylmethane diisocyanate, 1,4-tetramethylene diisocyanate, isophorone diisocyanate and 4,4'-methylenebis(cyclohexyl isocyanate). Examples of suitable higher functionality polyisocyanates include polymethylene polyphenol isocyanates.

At least a portion, and in certain instances all of the acid functional groups can be silylated. Alternatively at least a portion, and in certain instances all of the acid functional groups can be converted to hydroxyl groups by reaction with an epoxide. In certain embodiments the epoxide is a monofunctional epoxide such as ethylene oxide, butylene oxide, propylene oxide, cyclohexane oxide, glycidyl ethers, and glycidyl esters and then silylated. The equivalent ratio of epoxy to acid on the ester can range from 0.1:1 to 2:1. In another embodiment, an aliphatic diol, such a 1,2-propanediol, can be used in place of the epoxide.

In one embodiment, the components that form the composition further comprise at least one compound having the following structure (X):

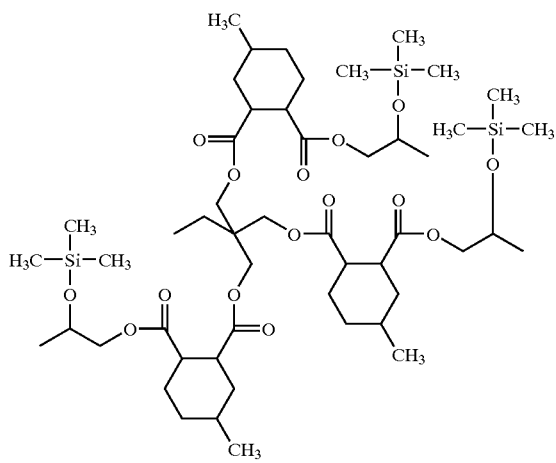

(X)

For example, the silylated compound can be the reaction product of trimethylolpropane, methylhexahydrophthalic anhydride, propylene oxide, and hexamethyl disylizid reacted at a ratio of 1:3:3:3.

Other useful materials having a linkage selected from an ester linkage, a urethane linkage, a urea linkage, an amide linkage, siloxane linkage, and an ether linkage and at least one reactive functional group which are suitable for silylation are disclosed above in the discussion of suitable additional polymers.

Alternatively, useful reactants include acrylic polymers containing hydroxyl groups blocked with hydrolyzable siloxy groups (polymerized for example from vinyl monomers and trimethyl siloxy methylmethacrylate) such as are disclosed in I. Azuma et al., "Acrylic Oligomer for High Solid Automotive Top Coating System Having Excellent Acid Resistance", *Progress in Organic Coatings* 32 (1997) 1–7, which is incorporated herein by reference.

In one embodiment, the present invention is directed to compositions as previously described wherein the silyl-blocked reactant, when added to the other components which form the coating composition, is present in the composition in an amount ranging from 0.1 to 90 weight percent based on total weight of the resin solids of the components which form the coating composition. In another embodiment, the present invention is directed to compositions as previously described wherein the silyl-blocked reactant, when added to the other components which form the coating composition, is present in the coating composition in an amount of at least 0.1 weight percent based on total weight of the resin solids of the components which form the coating composition. In another embodiment, the present invention is directed to compositions as previously described wherein the silyl-blocked reactant, when added to the other components which form the coating composition, is present in the coating composition in an amount of at least 1 weight percent based on total weight of the resin solids of the components which form the coating composition. In another embodiment, the present invention is directed to compositions as previously described wherein the silyl-blocked reactant, when added to the other components which form the coating composition in an amount of at least 5 weight percent based on total weight of the resin solids of the components which form the coating composition.

In yet another embodiment, the present invention is directed to compositions as previously described wherein the silyl-blocked reactant, when added to the other components which form the coating composition, is present in the coating composition in an amount less than 60 weight percent based on total weight of the resin solids of the components which form the coating composition. In a further embodiment, the present invention is directed to compositions as previously described wherein the silyl-blocked reactant, when added to the other components which form the coating composition, is present in the coating composition in an amount less than 30 weight percent based on total weight of the resin solids of the components which form the coating composition. In another embodiment, the present invention is directed to compositions as previously described wherein the silyl-blocked reactant, when added to the other components which form the coating composition, is present in the coating composition in an amount less than 10 weight percent based on total weight of the resin solids of the components which form the coating composition. The amount of silyl-blocked reactant may range between any combination of these values inclusive of the recited values.

In a further embodiment, the present invention is directed to compositions as previously described formed from components comprising at least one film forming material different from the at least one polysiloxane (a). This film forming material can be a polymer, in addition to the at least one polysiloxane (a), comprising at least one functional group reactive with at least one functional group of the at least one polysiloxane (a), and the at least one curing agent, if present. In one embodiment, this at least one additional polymer can have at least one reactive functional group selected from a hydroxyl group, a carbamate group, an epoxy group, an isocyanate group, and a carboxyl group. In another embodiment, the additional polymer can have at least one reactive functional group selected from a hydroxyl group, and a carbamate group.

The additional polymer may contain one or more reactive functional groups selected from hydroxyl groups, carboxyl groups, isocyanate groups, blocked polyisocyanate groups, primary amine groups, secondary amine groups, tertiary amine groups, amide groups, carbamate groups, urea groups, urethane groups, vinyl groups, acrylate groups, an anhydride group, a hydroxy alkylamide group, epoxy groups, and mixtures of any of the foregoing.

Nonlimiting examples of suitable hydroxyl group-containing additional polymers include acrylic polyols, polyester polyols, polyurethane polyols, polyether polyols, and mixtures of any of the foregoing. The additional polymer can be an acrylic polyol that can have a hydroxyl equivalent weight ranging from 1000 to 100 grams per solid equivalent.

Suitable hydroxyl group or carboxyl group-containing acrylic polymers can be prepared from polymerizable ethylenically unsaturated monomers and can be copolymers of (meth)acrylic acid or hydroxylalkyl esters of (meth)acrylic acid with one or more other polymerizable ethylenically unsaturated monomers such as alkyl esters of (meth)acrylic acid including methyl (meth)acrylate, ethyl (meth)acrylate, butyl (meth)acrylate and 2-ethyl hexylacrylate, and vinyl aromatic compounds such as styrene, alpha-methyl styrene, and vinyl toluene. As used herein, "(meth)acrylate" and like terms are intended to include both acrylates and methacrylates.

The acrylic polymer can be prepared from ethylenically unsaturated, beta-hydroxy ester functional monomers. Such monomers can be derived from the reaction of an ethylenically unsaturated acid functional monomer, such as monocarboxylic acids, for example, acrylic acid, and an epoxy compound which does not participate in the free radical initiated polymerization with the unsaturated acid monomer. Nonlimiting examples of such epoxy compounds are glycidyl ethers and esters. Nonlimiting examples of suitable glycidyl ethers comprise glycidyl ethers of alcohols and phenols such as butyl glycidyl ether, octyl glycidyl ether, phenyl glycidyl ether, and the like. Nonlimiting examples of suitable glycidyl esters include those which are commercially available from Shell Chemical Company under the tradename CARDURA E and from Exxon Chemical Company under the tradename GLYDEXX-10. Alternatively, the beta-hydroxy ester functional monomers are prepared from an ethylenically unsaturated, epoxy functional monomer, for example glycidyl (meth)acrylate and allyl glycidyl ether, and a saturated carboxylic acid, such as a saturated monocarboxylic acid, for example isostearic acid.

Epoxy functional groups can be incorporated into the polymer prepared from polymerizable ethylenically unsaturated monomers by copolymerizing oxirane group-containing monomers, for example glycidyl (meth)acrylate and allyl glycidyl ether, with other polymerizable ethylenically unsaturated monomers, such as those discussed above.

Preparation of such epoxy functional acrylic polymers is described in detail in U.S. Pat. No. 4,001,156 at columns 3 to 6, which columns are specifically incorporated herein by reference.

Carbamate functional groups can be incorporated into the polymer prepared from polymerizable ethylenically unsaturated monomers by copolymerizing, for example, the above-described ethylenically unsaturated monomers with a carbamate functional vinyl monomer such as a carbamate functional alkyl ester of methacrylic acid. Useful carbamate functional alkyl esters can be prepared by reacting, for example, a hydroxyalkyl carbamate (which can be the reaction product of ammonia and ethylene carbonate or propylene carbonate) with methacrylic anhydride.

Other useful carbamate functional vinyl monomers include, for instance, the reaction product of hydroxyethyl methacrylate, isophorone-diisocyanate, and hydroxypropyl carbamate; or the reaction product of hydroxypropyl methacrylate, isophorone diisocyanate, and methanol. Still other carbamate functional vinyl monomers may be used, such as the reaction product of isocyanic acid (HNCO) with a hydroxyl functional acrylic or methacrylic monomer such as hydroxyethyl acrylate, and those monomers described in U.S. Pat. No. 3,479,328, which is incorporated herein by reference.

Carbamate functional groups also can be incorporated into the acrylic polymer by reacting a hydroxyl functional acrylic polymer with a low molecular weight alkyl carbamate such as methyl carbamate. Pendant carbamate groups also can be incorporated into the acrylic polymer by a "transcarbamoylation" reaction in which a hydroxyl functional acrylic polymer is reacted with a low molecular weight carbamate derived from an alcohol or a glycol ether. The carbamate groups can exchange with the hydroxyl groups to yield the carbamate functional acrylic polymer and the original alcohol or glycol ether. Also, hydroxyl functional acrylic polymers can be reacted with isocyanic acid to provide pendent carbamate groups. Likewise, hydroxyl functional acrylic polymers can be reacted with urea to provide pendent carbamate groups.

The polymers prepared from polymerizable ethylenically unsaturated monomers can be prepared by solution polymerization techniques, which are well-known to those skilled in the art, in the presence of suitable catalysts such as organic peroxides or azo compounds, for example benzoyl peroxide or N,N-azobis(isobutylronitrile). The polymerization can be carried out in an organic solution in which the monomers are soluble by techniques conventional in the art. Alternatively, these polymers can be prepared by aqueous emulsion or dispersion polymerization techniques which are well-known in the art. The ratio of reactants and reaction conditions are selected to result in an acrylic polymer with the desired pendent functionality.

Polyester polymers also are useful in the compositions of the invention as the additional polymer. Useful polyester polymers can comprise the condensation products of polyhydric alcohols and polycarboxylic acids. Nonlimiting examples of suitable polyhydric alcohols include ethylene glycol, neopentyl glycol, trimethylol propane, and pentaerythritol. Nonlimiting examples of suitable polycarboxylic acids include adipic acid, 1,4-cyclohexyl dicarboxylic acid, and hexahydrophthalic acid. Besides the polycarboxylic acids mentioned above, functional equivalents of the acids such as anhydrides where they exist or lower alkyl esters of the acids such as the methyl esters can be used. Also, small amounts of monocarboxylic acids such as stearic acid can be used. The ratio of reactants and reaction conditions are selected to result in a polyester polymer with the desired pendent functionality, i.e., carboxyl or hydroxyl functionality.

For example, hydroxyl group-containing polyesters can be prepared by reacting an anhydride of a dicarboxylic acid such as hexahydrophthalic anhydride with a diol such as neopentyl glycol in a 1:2 molar ratio. Where it is desired to enhance air-drying, suitable drying oil fatty acids may be used and can include those derived from linseed oil, soya bean oil, tall oil, dehydrated castor oil, or tung oil.

Carbamate functional polyesters can be prepared by first forming a hydroxyalkyl carbamate that can be reacted with the polyacids and polyols used in forming the polyester. Alternatively, terminal carbamate functional groups can be incorporated into the polyester by reacting isocyanic acid with a hydroxy functional polyester. Also, carbamate functionality can be incorporated into the polyester by reacting a hydroxyl polyester with a urea. Additionally, carbamate groups can be incorporated into the polyester by a transcarbamoylation reaction. Preparation of suitable carbamate functional group-containing polyesters are those described in U.S. Pat. No. 5,593,733 at column 2, line 40 to column 4, line 9, which portion is incorporated herein by reference.

Polyurethane polymers containing terminal isocyanate or hydroxyl groups also can be used as the additional polymer in the compositions of the invention. The polyurethane polyols or NCO-terminated polyurethanes which can be used are those prepared by reacting polyols including polymeric polyols with polyisocyanates. Polyureas containing terminal isocyanate or primary or secondary amine groups which also can be used can be those prepared by reacting polyamines including, but not limited to, polymeric polyamines with polyisocyanates.

The hydroxyl/isocyanate or amine/isocyanate equivalent ratio can be adjusted and reaction conditions can be selected to obtain the desired terminal groups. Nonlimiting examples of suitable polyisocyanates include those described in U.S. Pat. No. 4,046,729 at column 5, line 26 to column 6, line 28, which portion is incorporated herein by reference. Nonlimiting examples of suitable polyols include those described in U.S. Pat. No. 4,046,729 at column 7, line 52 to column 10, line 35, which portion is incorporated herein by reference. Nonlimiting examples of suitable polyamines include those described in U.S. Pat. No. 4,046,729 at column 6, line 61 to column 7, line 32 and in U.S. Pat. No. 3,799,854 at column 3, lines 13 to 50, the indicated portions of both are incorporated herein by reference.

Carbamate functional groups can be introduced into the polyurethane polymers by reacting a polyisocyanate with a polyester having hydroxyl functionality and containing pendent carbamate groups. Alternatively, the polyurethane can be prepared by reacting a polyisocyanate with a polyester polyol and a hydroxyalkyl carbamate or isocyanic acid as separate reactants. Nonlimiting examples of suitable polyisocyanates include aromatic isocyanates, (such as 4,4'-diphenylmethane diisocyanate, 1,3-phenylene diisocyanate and toluene diisocyanate) and aliphatic polyisocyanates (such as 1,4-tetramethylene diisocyanate and 1,6-hexamethylene diisocyanate). Cycloaliphatic diisocyanates, such as 1,4-cyclohexyl diisocyanate and isophorone diisocyanate can be employed.

Nonlimiting examples of suitable polyether polyols include polyalkylene ether polyols such as those having the following structural formulas (VII) or (VIII):

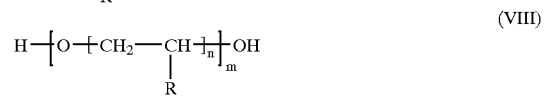

wherein the substituent group R represents hydrogen or a lower alkyl group of 1 to 5 carbon atoms including mixed substituents, n has a value ranging from 2 to 6, and m has a value ranging from 8 to 100 or higher. Nonlimiting examples of polyalkylene ether polyols include poly(oxytetramethylene) glycols, poly(oxytetraethylene) glycols, poly(oxy-1,2-propylene) glycols, and poly(oxy-1,2-butylene) glycols.

Also useful can be polyether polyols formed from oxyalkylation of various polyols, for example, but not limited to, glycols such as ethylene glycol, 1,6-hexanediol, Bisphenol A, and the like, or other higher polyols such as trimethylolpropane, pentaerythritol, and the like. Polyols of higher functionality which can be utilized as indicated can be made, for instance, by oxyalkylation of compounds such as sucrose or sorbitol. One oxyalkylation method that can be used is reaction of a polyol with an alkylene oxide, including but not limited to, propylene or ethylene oxide, in the presence of an acidic or basic catalyst. Specific, nonlimiting examples of polyethers include those sold under the names TERATHANE and TERACOL, available from E. I. duPont de Nemours and Co., Inc.

In one embodiment, the present invention is directed to a cured composition as previously described in which the at least one film-forming material comprises reactive functional groups which are thermally curable functional groups. In an alternative embodiment, at least one of the reactive functional groups of the film-forming material can be curable by ionizing radiation or actinic radiation. In another alternative embodiment, the film-forming material can comprise at least one functional group which is curable by thermal energy and at least one functional group which is curable by ionizing or actinic radiation.

Useful radiation-curable groups which can be present as reactive functional groups on the polysiloxane include unsaturated groups such as vinyl groups, vinyl ether groups, epoxy groups, maleimide groups, fumarate groups and combinations of the foregoing. In one embodiment, the UV curable groups can include acrylate groups, maleimides, fumarates, and vinyl ethers. Suitable vinyl groups include those having unsaturated ester groups and vinyl ether groups as discussed below.

In one embodiment, the at least one additional polymer can have a weight average molecular weight (Mw) ranging from 1000 to 20,000, as determined by gel permeation chromatography using a polystyrene standard. In another embodiment, the Mw of the at least one additional polymer ranges from 1500 to 15,000, and can range from 2000 to 12,000, as determined by gel permeation chromatography using a polystyrene standard.

It should be mentioned that in embodiments where at least one of each of the at least one polysiloxane (a) and the at least one additional polymer are present during the formation of the composition, the reactive functional groups of the at least one polysiloxane (a) and the additional polymer can be the same or different, but each must be reactive with at least functional group of the curing agent if employed. Nonlimiting examples of such reactive functional groups include hydroxyl groups, carboxylic acid groups, isocyanate groups, blocked isocyanate groups carboxylate groups, primary amine groups, secondary amine groups, amide groups, carbamate groups, anhydride groups, hydroxy alkylamide groups, and epoxy groups.

In an embodiment of the present invention, the additional polymer having at least one reactive functional group, if employed, is generally present, when added to the other components in the composition, in an amount of at least 2 percent by weight. That additional polymer can be present in an amount of at least 5 percent by weight, and is typically present in an amount of at least 10 percent by weight based on total weight of the resin solids of the components which form the composition. Also the additional polymer having at least one reactive functional group, if employed, is generally present, when added to the other components in the composition, in an amount of less than 80 percent by weight. It can be present in an amount of less than 60 percent by weight, and is typically present in an amount of less than 50 percent by weight based on total weight of the resin solids of the components which form the composition. The amount of the additional polymer having at least one reactive functional groups present in the compositions may range between any combination of these values inclusive of the recited values.

The compositions of the present invention can be solvent-based compositions, water-based compositions, in solid particulate form, that is, a powder composition, or in the form of a powder slurry or an aqueous dispersion. The components of the present invention used to form the compositions of the present invention can be dissolved or dispersed in an organic solvent. Nonlimiting examples of suitable organic solvents include alcohols, such as butanol; ketones, such as methyl amyl ketone; aromatic hydrocarbons, such as xylene; and glycol ethers, such as, ethylene glycol monobutyl ether; esters; other solvents; and mixtures of any of the foregoing.

In solvent based compositions, the organic solvent generally is present in amounts ranging from 5 to 80 percent by weight based on total weight of the resin solids of the components which form the composition, and can be present in an amount ranging from 30 to 50 percent by weight, inclusive of the recited values. The compositions as described above can have a total solids content ranging from 40 to 75 percent by weight based on total weight of the resin solids of the components which form the composition, and can have a total solids content ranging from 50 to 70 percent by weight, inclusive of the recited values. Alternatively, the inventive compositions can be in solid particulate form suitable for use as a powder coating, or suitable for dispersion in a liquid medium such as water for use as a powder slurry.

In a further embodiment where the compositions as previously described are formed from at least one reactant, a catalyst is additionally present during the composition's formation. In one embodiment, the catalyst is present in an amount sufficient to accelerate the reaction between at least one reactive functional group of the reactant and at least one reactive functional group of the at least one polysiloxane (a). In one embodiment, the catalyst is an acid catalyst.

Nonlimiting examples of suitable catalysts include acidic materials, for example, acid phosphates, such as phenyl acid phosphate, and substituted or unsubstituted sulfonic acids such as dodecylbenzene sulfonic acid or para-toluene sulfonic acid. Non-limiting examples of suitable catalysts for reactions between isocyanate groups and hydroxyl groups include tin catalysts such as dibutyl tin dilaurate. Nonlimiting examples of epoxy acid base catalysts include tertiary amines such as N,N'-dimethyldodecyl amine catalysts. In another embodiment, the catalyst can be a phosphatized polyester or a phosphatized epoxy. In this embodiment, the catalyst can be, for example, the reaction product of phosphoric acid and a bisphenol A diglycidyl ether having two hydrogenated phenolic rings, such as DRH-151, which is commercially available from Shell Chemical Co. The catalyst can be present, when added to the other components of the composition, in an amount ranging from 0.1 to 5.0 percent by weight, and is typically present in an amount ranging from 0.5 to 1.5 percent by weight based on the total weight of the resin solids of the components which form the composition, inclusive of the recited values.

In another embodiment, additional components can be present during the formation of the compositions as previously described. These additional components include, but are not limited to, flexibilizers, plasticizers, surface active agents as defined herein (such as polysiloxanes), thixotropic agents, anti-gassing agents, organic cosolvents, flow controllers, hindered amine light stabilizers, anti-oxidants, UV light absorbers, coloring agents or tints, and similar additives conventional in the art, as well as mixtures of any of the foregoing can be included in the composition. These additional ingredients can present, when added to the other components of the composition, in an amount up to 40 percent by weight based on the total weight of the resin solids of the components which form the composition.

In yet another embodiment of the present invention, at least one surface active agent can be present during the formation of the compositions as previously described. The at least one surface active agent can be selected from anionic, nonionic, and cationic surface active agents.

As used herein, by "surface active agent" is meant any material which tends to lower the solid surface tension or surface energy of the cured composition or coating. That is, the cured composition or coating formed from a composition comprising a surface active agent has a lower solid surface tension or surface energy than a cured coating formed from the analogous composition which does not contain the surface active agent.

For purposes of the present invention, solid surface tension can be measured according to the Owens-Wendt method using a Rame'-Hart Contact Angle Goniometer with distilled water and methylene iodide as reagents. Generally, a 0.02 cc drop of one reagent is placed upon the cured coating surface and the contact angle and its complement are measured using a standard microscope equipped with the goniometer. The contact angle and its complement are measured for each of three drops. The process is then repeated using the other reagent. An average value is calculated for the six measurements for each of the reagents. The solid surface tension is then calculated using the Owens-Wendt equation:

$$\{\gamma l(1+\cos \Phi)\}/2 = (\gamma l^d \gamma_s^d)^{1/2} + (\gamma l^p \gamma_s^p)^{1/2}$$

where $\gamma l$ is the surface tension of the liquid (methylene iodide=50.8, distilled water=72.8) and $\gamma^d$ and $\gamma^p$ are the dispersion and polar components (methylene iodide $\gamma^d$=49.5, $\gamma^p$=1.3; distilled water $\gamma^d$=21.8, $\gamma^p$=51.0); the values for $\Phi$ measured and the cos $\Phi$ determined. Two equations are then setup, one for methylene iodide and one for water. The only unknowns are $\gamma_s^d$ and $\gamma_s^p$. The two equations are then solved for the two unknowns. The two components combined represent the total solid surface tension.

The at least one surface active agent can be selected from amphiphilic, reactive functional group-containing polysiloxanes, amphiphilic fluoropolymers, and mixtures of any of the foregoing. With reference to water-soluble or water-dispersible amphiphilic materials, the term "amphiphilic" means a polymer having a generally hydrophilic polar end and a water-insoluble generally hydrophobic end. Nonlimiting examples of suitable functional group-containing polysiloxanes for use as surface active agents include the at least one polysiloxane (a) described above. Nonlimiting examples of suitable amphiphilic fluoropolymers include fluoroethylene-alkyl vinyl ether alternating copolymers (such as those described in U.S. Pat. No. 4,345,057) available from Asahi Glass Company under the tradename LUMIFLON; fluorosurfactants, such as the fluoroaliphatic polymeric esters commercially available from 3M of St. Paul, Minn. under the tradename FLUORAD; functionalized perfluorinated materials such as 1H,1H-perfluorononanol commercially available from FluoroChem USA; and perfluorinated (meth)acrylate resins.

Nonlimiting examples of other surface active agents suitable for use in the cured composition or coating of the present invention can include anionic, nonionic and cationic surface active agents.

Nonlimiting examples of suitable anionic surface active agents include sulfates or sulfonates. Specific nonlimiting examples include higher alkyl mononuclear aromatic sulfonates such as the higher alkyl benzene sulfonates containing from 10 to 16 carbon atoms in the alkyl group and a straight- or branched-chain, e.g., the sodium salts of decyl, undecyl, dodecyl, tridecyl, tetradecyl, pentadecyl or hexadecyl benzene sulfonate and the higher alkyl toluene, xylene and phenol sulfonates; alkyl naphthalene sulfonate, and sodium dinonyl naphthalene sulfonate. Other nonlimiting examples of suitable anionic surface active agents include olefin sulfonates, including long chain alkenylene sulfonates, long chain hydroxyalkane sulfonates, and mixtures of any of the foregoing. As used herein, "long chain" refers to a chain having greater than 8 carbon atoms. Nonlimiting examples of other sulfate or sulfonate detergents are paraffin sulfonates such as the reaction products of alpha olefins and bisulfites (e.g., sodium bisulfite). Also comprised are sulfates of higher alcohols, such as sodium lauryl sulfate, sodium tallow alcohol sulfate, or sulfates of mono-or di-glycerides of fatty acids (e.g., stearic monoglyceride monosulfate), alkyl poly(ethoxy)ether sulfates including, but not limited to, the sulfates of the condensation products of ethylene oxide and lauryl alcohol (usually having 1–5 ethenoxy groups per molecule); lauryl or other higher alkyl glyceryl ether sulfonates; aromatic poly(ethenoxy)ether sulfates including, but not limited to, the sulfates of the condensation products of ethylene oxide and nonyl phenol (usually having 1–20 oxyethylene groups per molecule).

Further nonlimiting examples include salts of sulfated aliphatic alcohol, alkyl ether sulfate or alkyl aryl ethoxy sulfate available from Rhone-Poulenc under the general tradename ABEX. Phosphate mono-or di-ester type anionic surface active agents also can be used. These anionic surface active agents are well known in the art and are commercially available under the general trademark GAFAC from GAF Corporation and under the general trademark TRITON from Rohm & Haas Company.

Nonlimiting examples of nonionic surface active agents suitable for use in the cured composition or coating of the present invention include those containing ether linkages and which are represented by the following general formula: RO(R'O)$_n$H; wherein the substituent group R represents a hydrocarbon group containing 6 to 60 carbon atoms, the substituent group R' represents an alkylene group containing 2 or 3 carbon atoms, and mixtures of any of the foregoing, and n is an integer ranging from 2 to 100.

Such nonionic surface active agents can be prepared by treating fatty alcohols or alkyl-substituted phenols with an excess of ethylene or propylene oxide. The alkyl carbon chain may contain from 14 to 40 carbon atoms and may be derived from a long chain fatty alcohol such as oleyl alcohol or stearyl alcohol. Nonionic polyoxyethylene surface active agents of the type represented by the formula above are commercially available under the general trade designation SURFYNOL from Air Products Chemicals, Inc.; PLURONIC or TETRONIC from BASF Corporation; TERGITOL from Union Carbide; and SURFONIC from Huntsman Corporation. Other nonlimiting examples of suitable nonionic surface active agents include block copolymers of ethylene oxide and propylene oxide based on a glycol such as ethylene glycol or propylene glycol including, but not limited to, those available from BASF Corporation under the general trade designation PLURONIC.

As indicated above, cationic surface active agents also can be used. Nonlimiting examples of cationic surface active agents suitable for use in the cured compositions or coatings of the present invention include acid salts of alkyl amines such as ARMAC HT, an acetic acid salt of n-alkyl amine available from Akzo Nobel Chemicals; imidazoline derivatives such as CALGENE C-100 available from Calgene Chemicals Inc.; ethoxylated amines or amides such as DETHOX Amine C-5, a cocoamine ethoxylate available from Deforest Enterprises; ethoxylated fatty amines such as ETHOX TAM available from Ethox Chemicals, Inc.; and glyceryl esters such as LEXEMUL AR, a glyceryl stearate/stearaidoethyl diethylamine available from Inolex Chemical Co.

Other examples of suitable surface active agents can include polyacrylates. Nonlimiting examples of suitable polyacrylates include homopolymers and copolymers of acrylate monomers, for example polybutylacrylate and copolymers derived from acrylate monomers (such as ethyl (meth)acrylate, 2-ethylhexylacrylate, butyl (meth)acrylate and isobutyl acrylate), and hydroxy ethyl(meth)acrylate and (meth)acrylic acid monomers. In one embodiment, the polyacrylate can have amino and hydroxy functionality. Suitable amino and hydroxyl functional acrylates are disclosed in Example 26 below and in U.S. Pat. No. 6,013,733, which is incorporated herein by reference. Another example of a useful amino and hydroxyl functional copolymer is a copolymer of hydroxy ethyl acrylate, 2-ethylhexylacrylate, isobutyl acrylate and dimethylamino ethylmethacrylate. In another embodiment, the polyacrylate can have acid functionality, which can be provided, for example, by including acid functional monomers such as (meth)acrylic acid in the components used to prepare the polyacrylate. In another embodiment, the polyacrylate can have acid functionality and hydroxyl functionality, which can be provided, for example, by including acid functional monomers such as (meth)acrylic acid and hydroxyl functional monomers such as hydroxy ethyl (meth)acrylate in the components used to prepare the polyacrylate.

In one embodiment, the present invention is directed to a powder composition formed from components comprising:
  (a) at least one surface active agent comprising:
    (i) at least one polysiloxane comprising at least one reactive functional group, the at least one polysiloxane comprising at least one of the following structural units (I)

$$R^1{}_n R^2{}_m SiO_{(4-n-m)/2} \qquad (I)$$

wherein each $R^1$, which may be identical or different, represents H, OH, a monovalent hydrocarbon group or a monovalent siloxane group; each $R^2$, which may be identical or different, represents a group comprising at least one reactive functional group, wherein m and n fulfill the requirements of 0<n<4, 0<m<4 and 2≦(m+n)<4; and (ii) at least one polyacrylate surface active agent having at least one functional group selected from amino and hydroxyl functionality, acid functionality and acid and hydroxyl functionality; and (b) a plurality of particles; wherein each component is different.

In yet another embodiment, the present invention is directed to a coated substrate comprising a substrate and a composition coated over the substrate, wherein the composition is selected from any of the foregoing compositions. In still another embodiment, the present invention is directed to a method of coating a substrate which comprises applying a composition over the substrate, wherein the composition is selected from any of the foregoing compositions. In another embodiment, the present invention is directed to a method for forming a cured coating on a substrate comprising applying over the substrate a coating composition, wherein the composition is selected from any of the foregoing compositions.

In another embodiment, the present invention is directed to a method of coating a substrate further comprising a step of curing the composition after application to the substrate. The components used to form the compositions in these embodiments can be selected from the components discussed above, and additional components also can be selected from those recited above.

As used herein, a composition "over a substrate" refers to a composition directly applied to at least a portion of the substrate, as well as a composition applied to any coating material which was previously applied to at least a portion of the substrate.

The compositions of the present invention can be applied over virtually any substrate including wood, metals, glass, cloth, plastic, foam, polymeric substrates such as elastomeric substrates, and the like. In one embodiment, the present invention is directed to a coated substrate as previously described wherein the coated substrate is a flexible substrate. In another embodiment, the present invention is directed to a coated substrate as previously described wherein the coated substrate is a rigid substrate.

In a further embodiment, the present invention is directed to coated substrates as previously described wherein the coated substrate is a ceramic substrate. In still another embodiment, the present invention is directed to coated substrates as previously described wherein the coated substrate is a polymeric substrate. In another embodiment, the present invention is directed to a coated metallic substrate comprising a metallic substrate and a composition coated over the metallic substrate, wherein the composition is selected from any of the foregoing compositions. The components used to form the compositions in these embodiments can be selected from the components discussed above, and additional components also can be selected from those recited above.

A further embodiment of the present invention is directed to a coated automobile substrate comprising an automobile substrate and a composition coated over the automobile substrate, wherein the composition is selected from any of the foregoing compositions. In yet another embodiment, the present invention is directed to a method of making a coated automobile substrate comprising providing an automobile substrate and applying over the automotive substrate a composition selected from any of the foregoing compositions. Again, the components used to form the compositions in these embodiments can be selected from the components discussed above, and additional components also can be selected from those recited above.

Suitable flexible elastomeric substrates can include any of the thermoplastic or thermoset synthetic materials well known in the art. Nonlimiting examples of suitable flexible elastomeric substrate materials include polyethylene, polypropylene, thermoplastic polyolefin ("TPO"), reaction injected molded polyurethane ("RIM"), and thermoplastic polyurethane ("TPU").

Nonlimiting examples of thermoset materials useful as substrates in connection with the present invention include polyesters, epoxides, phenolics, polyurethanes such as "RIM" thermoset materials, and mixtures of any of the foregoing. Nonlimiting examples of suitable thermoplastic materials include thermoplastic polyolefins such as polyethylene, polypropylene, polyamides such as nylon, thermoplastic polyurethanes, thermoplastic polyesters, acrylic polymers, vinyl polymers, polycarbonates, acrylonitrile-butadiene-styrene ("ABS") copolymers, ethylene propylene diene terpolymer ("EPDM") rubber, copolymers, and mixtures of any of the foregoing.

Nonlimiting examples of suitable metal substrates include ferrous metals (e.g., iron, steel, and alloys thereof), nonferrous metals (e.g., aluminum, zinc, magnesium, and alloys thereof), and mixtures of any of the foregoing. In the particular use of automobile components, the substrate can be formed from cold rolled steel, electrogalvanized steel such as hot dip electrogalvanized steel, electrogalvanized iron-zinc steel, aluminum, and magnesium.

When the substrates are used as components to fabricate automotive vehicles (including, but not limited to, automobiles, trucks and tractors) they can have any shape, and can be selected from the metallic and flexible substrates described above. Typical shapes of automotive body components can include bodies (frames), hoods, doors, mirror housings, fenders, bumpers, and trim for automotive vehicles.

In a further embodiment, the present invention is directed to coated automotive substrates as previously described to coated automotive substrates as previously described wherein the coated automotive substrate is a hood. In another embodiment, the present invention is directed to coated automotive substrates as previously described wherein the coated automotive substrate is a door. In another embodiment, the present invention is directed to coated automotive substrates as previously described wherein the coated automotive substrate is a fender. In another embodiment, the present invention is directed to coated automotive substrates as previously described wherein the coated automotive substrate is a housing for a mirror. In another embodiment, the present invention is directed to coated automotive substrates as previously described wherein the coated automotive substrate is a quarterpanel. The components used to form the compositions used to coat the automotive substrates in these embodiments can be selected from the components discussed above.

In embodiments of the present invention directed to automotive applications, the cured compositions can be, for example, the electrodeposition coating, the primer coating, the basecoat, and/or the topcoat. Suitable topcoats include monocoats and basecoat/clearcoat composites. Monocoats are formed from one or more layers of a colored coating composition. Basecoat/clearcoat composites comprise one or more layers of a colored basecoat composition, and one or more layers of a clearcoating composition, wherein the basecoat composition has at least one component which is different from the clearcoat composition. In the embodiments of the present invention directed to automotive applications, the clearcoat can be transparent after application.

In one embodiment, the particles can be dispersed or suspended in a carrier and applied to the polymeric substrate or polymeric coating, i.e., the electrodeposited coating, the primer coating, or the topcoat discussed above. The carrier can be water, a solvent, a surfactant and the like, as well as mixtures thereof.

In another embodiment, the present invention is directed to multi-component composite coating compositions comprising a basecoat deposited from a pigmented coating composition, and a topcoating composition applied over the basecoat, wherein the topcoating composition is selected from any of the compositions previously described.

In one embodiment, the present invention is directed to a multi-component composite coating composition as previously described, wherein the topcoating composition is transparent after curing and is selected from any of the compositions previously described. The components used to form the topcoating composition in these embodiments can be selected from the coating components discussed above.

The basecoat and transparent topcoat (i.e., clearcoat) compositions used in the multi-component composite coating compositions of the present invention in certain instances can be formulated into liquid high solids coating compositions, that is, compositions generally containing 40 percent, or in certain instances greater than 50 percent by weight resin solids. The solids content can be determined by heating a sample of the composition to 105° C. to 110° C. for 1–2 hours to drive off the volatile material, and subsequently measuring relative weight loss. As aforementioned, although the compositions can be liquid coating compositions, they also can be formulated as powder coating compositions.

The coating composition of the basecoat in the color-plus-clear system can be any of the compositions useful in coatings applications, particularly automotive applications. The coating composition of the basecoat can comprise a resinous binder and a pigment to act as the colorant. Nonlimiting examples of resinous binders are acrylic polymers, polyesters, alkyds, and polyurethanes.

The resinous binders for the basecoat can be organic solvent-based materials such as those described in U.S. Pat. No. 4,220,679, note column 2, line 24 continuing through column 4, line 40, which portions is incorporated by reference. Also, water-based coating compositions such as those described in U.S. Pat. Nos. 4,403,003, 4,147,679 and 5,071,904 can be used as the binder in the basecoat composition. These U.S. patents are incorporated herein by reference.

The basecoat composition can comprise one or more pigments as colorants. Nonlimiting examples of suitable metallic pigments include aluminum flake, copper bronze flake, and metal oxide coated mica.

Besides the metallic pigments, the basecoat compositions can contain nonmetallic color pigments conventionally used in surface coatings such as inorganic pigments such as titanium dioxide, iron oxide, chromium oxide, lead chromate, and carbon black; and organic pigments such as phthalocyanine blue and phthalocyanine green.

Optional ingredients in the basecoat composition can comprise those which are well known in the art of formulating surface coatings and can comprise surface active agents, flow control agents, thixotropic agents, fillers, anti-gassing agents, organic co-solvents, catalysts, and other customary auxiliaries. Nonlimiting examples of these materials and suitable amounts are described in U.S. Pat. Nos. 4,220,679; 4,403,003; 4,147,769; and 5,071,904, which patents are incorporated herein by reference.

The basecoat compositions can be applied to the substrate by any conventional coating technique such as brushing, spraying, dipping, or flowing. Spray techniques and equipment for air spraying, airless spray, and electrostatic spraying in either manual or automatic methods, known in the art can be used.

During application of the basecoat to the substrate, the film thickness of the basecoat formed on the substrate can range from 0.1 to 5 mils. In another embodiment, the film thickness of the basecoat formed on the substrate can range 0.1 to 1 mils, and can be 0.4 mils.

After forming a film of the basecoat on the substrate, the basecoat can be cured or alternatively given a drying step in which solvent is driven out of the basecoat film by heating or an air drying period before application of the clearcoat. Suitable drying conditions may depend on the particular basecoat composition, and on the ambient humidity if the composition is water-borne, but a drying time from 1 to 15 minutes at a temperature of 750 to 200° F. (210 to 93° C.) can be adequate.

The transparent or clear topcoat composition can be applied to the basecoat by any conventional coating technique, including, but not limited to, compressed air spraying, electrostatic spraying, and either manual or automatic methods. The transparent topcoat can be applied to a cured or to a dried basecoat before the basecoat has been cured. In the latter instance, the two coatings can then be heated to cure both coating layers simultaneously. Typical curing conditions can range from 50° F. to 475° F. (10° C. to 246° C.) for 1 to 30 minutes. Alternatively, the transparent topcoat can be cured by ionizing or actinic radiation or the combination of thermal energy and ionizing or actinic radiation as described in detail above. The clearcoating thickness (dry film thickness) can be 1 to 6 mils.

A second topcoat coating composition can be applied to the first topcoat to form a "clear-on-clear" topcoat. The first topcoat coating composition can be applied over at least a portion of the basecoat as described above. The second topcoat coating composition can be applied to a cured or to a dried first topcoat before the basecoat and first topcoat have been cured. The basecoat, the first topcoat, and the second topcoat then can be heated to cure the three coatings simultaneously.

It should be understood that the second transparent topcoat and the first transparent topcoat coating compositions can be the same or different provided that, when applied wet-on-wet, one topcoat does not substantially interfere with the curing of the other, for example by inhibiting solvent/water evaporation from a lower layer. Moreover, the first topcoat, the second topcoat or both can be the coating composition of the present invention. The first transparent topcoat coating composition can be virtually any transparent topcoating composition known to those skilled in the art. The first transparent topcoat composition can be water-borne or solventborne, or, alternatively, in solid particulate form, i.e., a powder coating.

Nonlimiting examples of suitable first topcoating compositions include crosslinkable coating compositions comprising at least one thermosettable coating material and at least one curing agent. Suitable waterborne clearcoats are disclosed in U.S. Pat. No. 5,098,947, which patent is incorporated herein by reference, and are based on water-soluble acrylic resins. Useful solvent borne clearcoats are disclosed in U.S. Pat. Nos. 5,196,485 and 5,814,410, which patents are incorporated herein by reference, and include polyepoxides and polyacid curing agents. Suitable powder clearcoats are described in U.S. Pat. No. 5,663,240, which patent is incorporated herein by reference, and include epoxy functional acrylic copolymers and polycarboxylic acid curing agents.

Typically, after forming the first topcoat over at least a portion of the basecoat, the first topcoat is given a drying step in which solvent is driven out of the film by heating or, alternatively, an air drying period or curing step, before the application of the second topcoat. Suitable drying conditions will depend on the particular first topcoat composition, and on the ambient humidity if the composition is water-borne, but, in general, a drying time from 1 to 15 minutes at a temperature of 750 to 200° F. will be adequate.

The polysiloxane-containing second topcoat coating composition of the present invention can be applied as described above for the first topcoat by any conventional coating application technique. Curing conditions can be those described above for the topcoat. The second topcoating dry film thickness can range from 0.1 to 3 mils, and typically ranges from 0.5 to 2 mils.

It should be mentioned that the polysiloxane-containing coating compositions can be advantageously formulated as a "monocoat," that is, a coating which forms essentially one coating layer when applied to a substrate. The monocoat coating composition can be pigmented. Nonlimiting examples of suitable pigments include those mentioned above. When employed as a monocoat, the polysiloxane-containing coating compositions of the present invention can be applied (by any of the conventional application techniques discussed above) in two or more successive coats, and, in certain instances can be applied with only an ambient flash period between coats. The multi-coats when cured can form essentially one coating layer.

In another embodiment, the present invention is directed to a method for making a multi-component composite comprising (a) applying a pigmented composition to a substrate to form a basecoat; and (b) applying a topcoating composition over at least a portion of the basecoat to form a topcoat thereon, wherein the topcoating composition is selected from any of the compositions described above. The components used to form the topcoating composition in this embodiment can be selected from the coating components discussed above, and additional components also can be selected from those recited above.

The coatings formed from the compositions according to the present invention can have outstanding appearance properties and initial scratch (mar) resistance properties, as well as retained scratch (mar) resistance, which can be evaluated by measuring the gloss of coated substrates before and after abrading of the coated substrates.

In one embodiment, the present invention is directed to methods of improving the scratch resistance of a substrate comprising applying to the substrate any of the inventive compositions described for the substrate. In another embodiment, the present invention is directed to a method of improving the dirt repellency of a substrate comprising applying to the comprising any of the inventive compositions described for the substrate.

In another embodiment, the present invention is directed to a method for retaining the gloss of a substrate over time comprising applying to the substrate comprising any of the inventive compositions described for the substrate. In another embodiment, the present invention is directed to a method for revitalizing the gloss of a substrate comprising applying to the substrate any of the inventive compositions described for the substrate.

The initial 20° gloss of a coated substrate according to the present invention can be measured with a 20° NOVO-GLOSS 20 statistical glossmeter, available from Gardner Instrument Company, Inc. The coated substrate can be subjected to scratch testing by linearly scratching the coating or substrate with a weighted abrasive paper for ten double rubs using an Atlas AATCC Scratch Tester, Model CM-5, available from Atlas Electrical Devices Company of Chicago, Ill. The abrasive paper is 3M 281Q WETORDRY™ PRODUCTION™ 9 micron polishing paper sheets, which are commercially available from 3M Company of St. Paul, Minn. Panels are then rinsed with tap water and carefully patted dry with a paper towel. The 20° gloss is measured on the scratched area of each test panel. The number reported is the percent of the initial gloss retained after scratch testing, i.e., 100%×scratched gloss/initial gloss. This test method is fully disclosed in the examples that follow.

In one embodiment, the present invention is directed to cured compositions having an initial scratch resistance value such that after scratch testing greater than 40 percent of initial 20° gloss is retained.

In another embodiment, the present invention is directed to cured compositions having an initial scratch resistance value such that after scratch testing greater than 50 percent of initial 20° gloss is retained. In another embodiment, the present invention is directed to cured compositions having a retained scratch resistance value such that after scratch testing greater than 30 percent of initial 20° gloss is retained. In another embodiment, the present invention is directed to cured compositions having a retained scratch resistance value such that after scratch testing greater than 40 percent of initial 20° gloss is retained.

In another embodiment, the present invention is directed to a cured coating formed from any of the compositions previously described. In another embodiment, the cured composition is thermally cured. In another embodiment, the cured composition is cured by exposure to ionizing radiation, while in yet another embodiment, the cured composition is cured by exposure to actinic radiation. In another embodiment the cured composition is cured by exposure to (1) ionizing radiation or actinic radiation and (2) thermal energy.

In another embodiment, the compositions of the present invention also can be useful as decorative or protective coatings for pigmented plastic (elastomeric) substrates, such as those described above, or mold-in-color ("MIC") plastic substrates. In these applications, the compositions can be applied directly to the plastic substrate or included in the molding matrix. Optionally, an adhesion promoter can first be applied directly to the plastic or elastomeric substrate and the composition applied as a topcoat thereover. The compositions of the present invention also can be advantageously formulated as pigmented coating compositions for use as primer coatings, as basecoats in multi-component composite coatings, and as monocoat topcoats including pigments or colorants. The components used to form the compositions in these embodiments can be selected from the coating components discussed above, and additional components also can be selected from those recited above.

In another embodiment of the present invention, a transparent thermally-cured composition is provided which comprises a plurality of particles within the cured composition.

As discussed in greater detail below, in such embodiments a first portion of the particles is present in a surface region of the cured composition in a concentration which is higher than a concentration of a second portion of particles which is present in a bulk region of the cured composition. In certain instances, the BYK Haze value of the cured composition is less than 50, can be less than 35, and is often less than 20 as measured using a BYK Haze Gloss meter available from BYK Chemie USA.

As used herein "surface region" of the cured composition means the region which is generally parallel to the exposed air-surface of the coated substrate and which has thickness generally extending perpendicularly from the surface of the cured coating to a depth ranging from at least 20 nanometers to 150 nanometers beneath the exposed surface. In certain embodiments, this thickness of the surface region ranges from at least 20 nanometers to 100 nanometers, and can range from at least 20 nanometers to 50 nanometers. As used herein, "bulk region" of the cured composition means the region which extends beneath the surface region and which is generally parallel to the surface of the coated substrate. The bulk region has a thickness extending from its interface with the surface region through the cured coating to the substrate or coating layer beneath the cured composition.

In embodiments of the present invention in which the particles have an average particle size greater than 50 nanometers, the thickness of the surface region generally extends perpendicularly from the surface of the cured coating to a depth equal to three times the average particle size of the particles, and this surface can extend to a depth equal to two times the average particle size of the particles.

The concentration of particles in the cured coating can be characterized in a variety of ways. For example, the average number density of particles (i.e., the average number or population of particles per unit volume) within the surface region is greater than the average number density within the bulk region. Alternatively, the average volume fraction (i.e., volume occupied by particles/total volume) or average weight percent per unit volume, i.e., ((the weight of particles within a unit volume of cured coating)/(total weight of the unit volume of cured coating))×100% of the particles dispersed in the surface region is greater than the average volume fraction or average weight percent of particles within the bulk region.

The concentration of particles (as characterized above) present in the surface region of the cured coating can be determined, if desired, by a variety of surface analysis techniques well known in the art, such as Transmission Electron Microscopy ("TEM"), Surface Scanning Electron Microscopy ("X-SEM"), Atomic Force Microscopy ("AFM"), and X-ray Photoelectron Spectroscopy.

Figure 4:
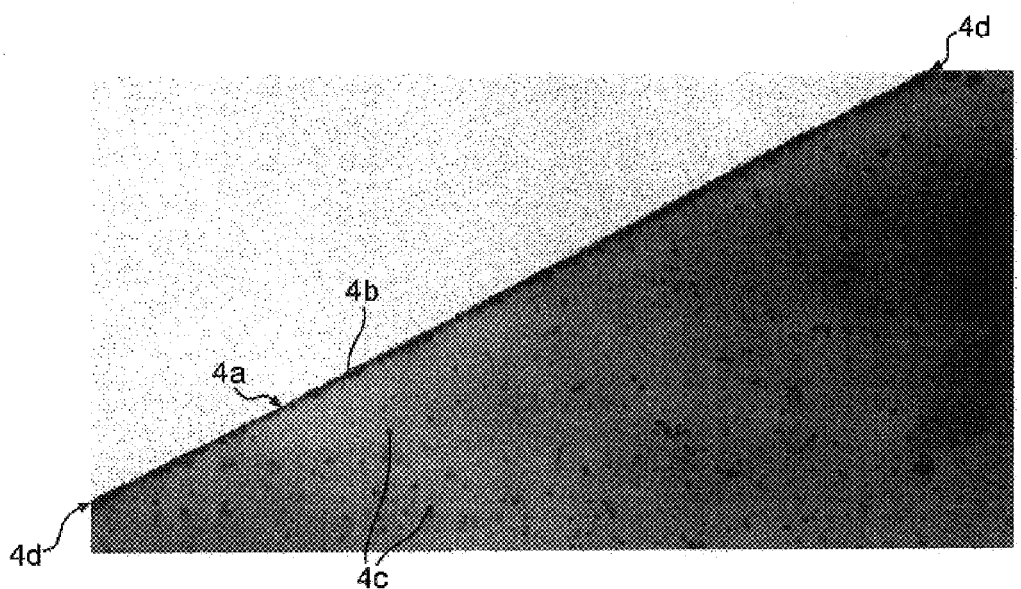
FIG. 4 is a transmission electron micrograph (105,000× magnification) of a cross-section of a cured transparent topcoating composition of the present invention which included a preformed dispersion of colloidal silica and polysiloxane.

For example, the concentration of particles present in the surface region of the cured coating may be determined by cross-sectional transmission electron microscopy techniques. A useful transmission electron microscopy method can be described generally as follows. A coating composition is applied to a substrate and cured under conditions appropriate to the composition and substrate. Samples of the cured coating are then removed or delaminated from the substrate and embedded in a cured epoxy resin using techniques as are well known in the art. The embedded samples can then be microtomed at room temperature using techniques well known in the art, such as by forming a block face. The sections can be cut using a 45° diamond knife edge mounted in a holder with a "boat cavity" to hold water. During the cutting process, sections float to the surface of the water in the boat cavity. Once a few cuts reach an interference color of bright to dark gold (i.e., approximately 100 to 150 nanometers thickness), individual samples typically are collected onto a formvar-carbon coated grid and dried at ambient temperature on a glass slide. The samples are then placed in a suitable transmission electron microscope, such as a Philips CM12 TEM, and examined at various magnifications, such as at 105,000× magnification, for documentation of particle concentration at the surface region, via electron micrography. The concentration of particles in a surface region of a cured coating can be ascertained upon visual inspection of the electron micrograph, and FIG. 4 provides an example of such an electron micrograph.

It should be understood that the particles can be present in the surface region such that a portion of the particles at least partially protrudes above the cured coating surface, essentially unprotected by an organic coating layer. Alternatively, the particles can be present in the surface region such that this organic coating layer lies between the particles and the exposed air-surface interface of the surface region.

In certain embodiments, the cured composition or coating of the present invention has an initial 20° gloss (as measured using a 20° NOVO-GLOSS 20 statistical glossmeter, available from Gardner Instrument Company) of greater than 70, can be greater than 75, and is often greater than 80. This high gloss composition can be curable under ambient or thermal conditions and can be curable by radiation. In one embodiment, the high gloss composition can be cured by ambient or thermal conditions.

Moreover, the cured topcoat can exhibit excellent initial scratch (mar) resistance as well as retained scratch (mar) resistance properties. The cured topcoat can have an initial scratch (mar) resistance value (as measured by first determining the initial 20° gloss as described above, linearly abrading the cured coating surface with a weighted abrasive paper for ten double rubs using an Atlas AATCC Scratch Tester, Model CM-5, available from Atlas Electrical Devices Company, and measuring the 20° gloss as described above for the abraded surface) such that after mar testing greater than 40 percent of initial 20° gloss is retained, in certain instances greater than 50 percent of initial 20° gloss is retained, and in other instances greater than 70 percent of initial 20° gloss is retained after abrading the coating surface (that is, 100%×scratched gloss/initial gloss).

Also, the cured topcoat of the present invention can have a retained scratch (mar) resistance (as measured using the scratch test method described above after the unscratched test panels were subjected to simulated weathering by QUV exposure to UVA-340 bulbs in a weathering cabinet available from Q Panel Company) such that greater than 30 percent of initial 20° gloss is retained is retained after weathering. In another embodiment, greater than 40 percent of initial 20° gloss is retained, an often greater than 60 percent of initial 20° gloss is retained after weathering.

The cured compositions of the present invention advantageously can be employed as the transparent topcoat in a cured multi-component composite coating comprising a basecoat deposited from a pigmented coating composition and the topcoat deposited from a topcoat coating composition. When so employed, the cured topcoat can be deposited from any topcoating composition described above which comprises particles, in certain instances having a particle size ranging from 1 to 1000 nanometers prior to incorporation into the coating composition. Of course whether the haze is too great will depend upon the size, composition and shape of the particles.

In yet another embodiment of the present invention, a composition is provided which comprises particles dispersed in a composition comprising one or more thermoplastic materials. As previously described, the concentration of particles is greater in the surface region than in the bulk region. The composition can be derived from a thermoplastic resinous composition. Nonlimiting examples of suitable thermoplastic materials include high molecular weight (i.e., Mw greater than 20,000, greater than 40,000, or greater than 60,000), acrylic polymers, polyolefin polymers, polyamide polymers, and polyester polymers suitable for use in lacquer dry systems. One nonlimiting example of a class of thermoplastic materials from which the composition can be derived is fluoropolymer-acrylic copolymers such as those prepared from polyvinylidene fluoride, for example, KYNAR 500 (available from Ausimont USA, Inc.) and thermoplastic acrylic copolymers, such as ACRYLOID B44 (65% methyl methacrylate and 35% ethyl acrylate), available from Dock Resin, Inc.

In another embodiment, the present invention is directed to a method for retaining the gloss of a polymeric substrate or polymer coated substrate after a predetermined period of time comprising applying to the substrate comprising any of the inventive compositions described for the substrate. This predetermined period of time can generally be at least 6 months and can be at least one year. In another embodiment, the present invention is directed to a method for revitalizing the gloss of a polymeric substrate or polymer coated substrate comprising applying to the substrate any of the inventive compositions described above.

Illustrating the invention are the following examples which, however, are not to be considered as limiting the invention to their details. Unless otherwise indicated, all parts and percentages in the following examples, as well as throughout the specification, are by weight.

EXAMPLES

Example A describes the preparation of a polysiloxane polyol which is the hydrosilylation reaction product of a pentasiloxane containing silicon hydride and trimethylolpropane monoallyl ether. Example B describes the preparation of a carbamate functional group-containing polysiloxane using the polysiloxane of Example A as a starting material. Example C describes the preparation of a carbamate functional group-containing polysiloxane using a commercially available hydroxyl functional polysiloxane.

Examples AA, BB, CC, DD and EE describe the preparation of various silica dispersions which are subsequently incorporated into coating compositions.

Examples 1 through 10 describe the preparation of one-pack coating compositions which contain aminoplast curing agents.

Comparative Examples 1 through 3 describe the preparation of high solids coating compositions which were used to form the transparent topcoats in comparative multi-component composite coating compositions. The composition of Example 1 contains no polysiloxane and no inorganic particles, and the compositions of Examples 2 and 3 contain no polysiloxane but include inorganic particles in the form of a colloidal silica dispersion.

Examples 4 and 5 describe the preparation of coating compositions of the invention which contain a carbamate functional group-containing polysiloxane and inorganic particles in the form of a colloidal silica dispersion. Example 6 describes the preparation of a coating composition of the invention which contains a carbamate functional group-containing polysiloxane and inorganic particles in the form of colloidal silica dispersed in the polysiloxane. Example 7 describes the preparation of the coating composition which is the nonsilica containing analogue of Example 6. Example 8 describes the preparation of a coating composition which contains a carbamate functional group-containing siloxane different from that used in the examples above. Examples 9 and 10 describes the preparation of a film forming compositions of the invention which contains inorganic particles in the form of a fumed silica dispersion prepared by grinding the fumed silica in the presence of a polysiloxane prior to incorporation into the composition.

Examples 11 through 17 describe the preparation of coating compositions which are prepared as two-component systems, i.e., the compositions comprise a polyisocyanate curing agent which is added to the compositions just prior to application.

Comparative Example 11 describes the preparation of a coating composition used to form the transparent topcoat in a multi-component composite coating composition which contains an acrylic polyol and a polyisocyanate curing agent. Comparative Example 12 describes the preparation of the acid catalyst containing analogue of Example 11. Comparative Example 13 describes the preparation of the aminoplast containing analog of Example 11 and Comparative Example 14 describes the preparation of the acid catalyst containing analogue of Example 13. Example 15 describes the preparation of a coating composition of the invention which contains the acrylic polyol, both aminoplast and polyisocyanate curing agents and a polysiloxane polyol. Example 16 is the acid catalyst containing analogue of Example 15. Example 17 describes the preparation of a coating composition of the invention which contains an acrylic polyol, both aminoplast and polyisocyanate curing agents, acid catalyst, the polysiloxane polyol and inorganic particles in the form of a colloidal silica dispersed in the polysiloxane polyol. Example 18 is the analogue of Example 17, but containing a higher level of the colloidal silica.

Examples 19 and 20 describe the preparation of respective one-component and two-component coating compositions of the present invention which are suitable for application to flexible elastomeric substrates.

Example 21 describes the preparation of epoxy/acid coating compositions. Examples 21A and 21B describe the preparation of comparative compositions which contain no inorganic particles and Examples 21C–21D describe the preparation of coating compositions of the invention which contain varying amounts of the inorganic particles.

Examples 22A to 22I describe the preparation of two-component coating compositions which illustrate the effects of lower levels of various polysiloxanes in conjunction with inorganic particles in the form of colloidal silica.

Example 23 describes the preparation of transparent topcoat coating compositions of the present invention (Examples 23A–23C) which were applied to respective substrates and subsequently evaluated using transmission electron microscopy.

Example 24 describes the preparation of coating compositions of the present invention which contain various polysiloxanes in conjunction with inorganic particles in the form of colloidal silica. The coating composition was applied to a basecoated substrate and evaluated versus a similarly applied commercial two-component isocyanate clearcoat (comparative example) for penetration (scratch depth) as a function of load and scratch distance to determine the critical load at which coating failure occurs.

Example 25 describes the preparation of coating compositions of the present invention which contain various levels of the polysiloxane polyol of Example A (Examples 25B to 25G) in conjunction with various levels of inorganic particles in the form of colloidal silica. Comparative Example 24A contains polysiloxane polyol but no colloidal silica.

Example 26 describes the preparation of coating compositions of the present invention in solid particulate form (i.e., powder coating compositions, Examples 26C and 26D) which contain surface active agents in conjunction with inorganic particles in the form of aluminum oxide. Comparative Examples 26A and 26B describes powder compositions which contain surface active agents but no aluminum oxide.

Example 27 describes the preparation of transparent topcoat coating compositions of the present invention.

Example 28 describes the preparation of coating compositions of the present invention which contains silylated compounds.

Example 29 describes the preparation of a coating composition of the present invention which is cured via a dual cure system.

Example 30 describes the preparation of a coating compositions of the present invention.

Example 31 describes the preparation of coating compositions of the present invention.

Polysiloxanes

Example A

This example describes the preparation of polysiloxane polyol, a product of the hydrosilylation of pentasiloxane with an approximate degree of polymerization of 3 to 4, i.e., $(Si-O)_3$ to $(Si-O)_4$. The polysiloxane polyol was prepared from a proportionately scaled-up batch of the following mixture of ingredients in the ratios indicated:

| Ingredients | Equivalent Weight | Equivalents | Parts By Weight (kilograms) |
|---|---|---|---|
| Charge I: | | | |
| Trimethylolpropane monoallyl ether | 174.0 | 756.0 | 131.54 |
| Charge II: | | | |
| MASILWAX BASE[1] | 156.7[2] | 594.8 | 93.21 |
| Charge III: | | | |
| Chloroplatinic acid | | 10 ppm | |
| Toluene | | | 0.23 |
| Isopropanol | | | .07 |

[1]Polysiloxane-containing silicon hydride, commercially available from BASF Corporation.
[2]Equivalent weight based on mercuric bichloride determination.

To a suitable reaction vessel equipped with a means for maintaining a nitrogen blanket, Charge I and an amount of sodium bicarbonate equivalent to 20 to 25 ppm of total monomer solids was added at ambient conditions and the temperature was gradually increased to 75° C. under a nitrogen blanket. At that temperature, 5.0% of Charge II was added under agitation, followed by the addition of Charge III, equivalent to 10 ppm of active platinum based on total monomer solids. The reaction was then allowed to exotherm to 95° C. at which time the remainder of Charge II was added at a rate such that the temperature did not exceed 95° C. After completion of this addition, the reaction temperature was maintained at 95° C. and monitored by infrared spectroscopy for disappearance of the silicon hydride absorption band (Si—H, 2150 cm$^{-1}$).

Example B

This Example describes the preparation of a carbamate-functional polysiloxane using the polysiloxane polyol of Example A.

A suitable reaction vessel equipped for vacuum distillation was flushed with $N_2$. To the reaction flask was added 1782.9 g of polysiloxane polyol of Example A, 5.48-g of butyl stannoic acid and 16.41 g triphenyl phosphite. The reaction was placed under vacuum and heated to a temperature of 140° C. To the resulting mixture was added over a period of 3 hours, 665.4 g of a 38% solution of 1-methoxy-2-propyl carbamate in 1-methoxy-2-propanol. After the addition was completed the temperature was increased to 150° C. and held until distillation was complete. The reaction was cooled to a temperature of 90° C. and brought to atmospheric pressure. The resulting resin was diluted with 825.3 g of 1-methoxy-2-propanol.

Example C

This Example describes the preparation of a carbamate-functional polysiloxane. A suitable reaction vessel equipped with stirrer, temperature probe, distillation condenser and receiver was flushed with $N_2$. To the reaction vessel was added 291.9 grams of KR-2001, a polysiloxane available from Shin-Etsu Chemicals, 1.91 grams of butyl stannoic acid and 250.4 grams of xylene. The reaction mixture was heated to a temperature of 140° C. at which time 148.6 grams of methyl carbamate was added over a period of 1 hour. The reaction was held at that temperature for a period of 3.5 hours.

Silica Dispersions

Example AA

This Example describes the preparation of a colloidal silica dispersion. The dispersion was prepared as follows:

To a suitable reaction vessel equipped for vacuum distillation and flushed with $N_2$ was added 811.9 g of an 88% acrylic polyol solution (40% hydroxy propyl acrylate, 60% butyl methacrylate) in 1-methoxy-2-propanol; 544.3 g of colloidal silica (available as ORGANOSILICASOL MT-ST from Nissan Chemical Co.); 1.58 g of butyl stannoic acid and 3.18 g triphenyl phosphite. The reaction was placed under vacuum and heated to 140° C. To the resulting mixture was added, over a period of 3 hours, 665.4 g of a 38% solution of 1-methoxy-2-propyl carbamate in 1-methoxy-2-propanol. After the addition was complete, the temperature was increased to 150° C. and held at that temperature until distillation had stopped. The reaction was cooled to 90° C. and brought to atmospheric pressure. The resulting resin had a hydroxyl value of 80.51 and was diluted with 251.4 g of 1-methoxy-2-propanol.

Example BB

This Example describes a colloidal silica dispersion prepared as described in Example 5 of U.S. Pat. No. 5,853,809 as follows: To a suitable reaction vessel equipped with stirrer and temperature probe and flushed with $N_2$ was added 858.7 g of the carbamate functional acrylic resin as describe below. The resin was heated to a temperature of 40° C. To the resulting solution was added over a period of 20 minutes, 124.4 g of gamma-isocyanatopropyl triethoxysilane (available as A1310 from OSi Specialties, a subsidiary of Witco Corporation) diluted in 148.2 g of amyl acetate and 10.5 g butanol. That temperature was maintained for 3.5 hours and the reaction was monitored for completion by infrared spectroscopy. With stirring, 60 g of the resulting resin was added to 1500 g of NALCO 1057 (available from Nalco Chemical Co.). The resulting mixture was heated to a temperature of 60° C. and held for a period of 19 hours.

The carbamate functional acrylic resin prepared as follows: A suitable reaction flask equipped for vacuum distillation was flushed with $N_2$ and 1670.2 g of 88% acrylic polyol solution, (40% HPA, 60% BMA), in 1-methoxy-2-propanol, 4.9 g of butyl stannoic acid and 4.9 g of triphenyl phosphite added. The reaction was placed under vacuum and heated to a temperature of 140° C. To the resulting mixture was added, over a period of 3 hours, 1263.64 g of a 38% solution of 1-methoxy-2-propyl carbamate in 1-methoxy-2-propanol. The resulting distillate was collected. After the addition was complete, the temperature was increased to 150° C. and held at that temperature until distillation had stopped. The reaction was cooled to 90° C. and brought to atmospheric pressure. The resulting resin had a hydroxyl value of 34.48 and was diluted with a mixture of 251.4 g of 1-methoxy-2-propanol and 3-ethoxy ethyl propionate.

Example CC

This Example describes a colloidal silica dispersion prepared as follows: A suitable reaction vessel equipped for vacuum distillation was flushed with $N_2$. To the reaction flask was added 509.6 g of the polysiloxane polyol of Example A, 566.3 g of ORGANOSILICASOL MA-ST-M colloidal silica (available from Nissan Chemicals), 1.57 g of butyl stannoic acid and 4.69 g of triphenyl phosphite. The reaction was placed under vacuum and heated to 140° C. To the resulting mixture was added over a period of 3 hours 997.9 g of a 38% solution of 1-methoxy-2-propyl carbamate in 1-methoxy-2-propanol. The resulting distillate was collected. After the feed was complete, the temperature was increased to 150° C. and held until distillation was complete. The reaction was cooled to 90° C. and brought to atmospheric pressure. The resulting dispersion was diluted with 160.8 g of 1-methoxy-2-propanol.

Example DD

This Example describes a colloidal silica dispersion prepared as follows: A suitable reaction vessel equipped for vacuum distillation was flushed with $N_2$. To the reaction flask was added 150.7 g of the polysiloxane polyol of Example A and 500.4 g of ORGANOSILICASOL MT-ST, colloidal silica (available from Nissan Chemicals). The resulting mixture was vacuum distilled at 25° C. for a period of 2 hours and then diluted with 160.8 g of methyl amyl ketone.

Example EE

This Example describes a fumed silica dispersion prepared as follows: A suitable mixing container was equipped with a Cowles dispersing agitator. To the container was added 315.3 g of the polysiloxane polyol of Example A, 451.0 g of methyl amyl ketone and 135.2 g of R812 fumed silica (available from Degussa Corporation). The mixture was agitated until all of the R812 silica was dispersed. The dispersion was then added to an EIGER Mill for a period of 60 minutes to achieve a grind fineness of 8+ Hegman.

Coating Compositions

The following Examples 1–10 describe the preparation of coating compositions of the invention, as well as comparative coating compositions, used to form the transparent topcoat in multi-component composite coating compositions. Amounts indicated represent parts by weight. The coating compositions were prepared from a mixture of the following ingredients.

| INGREDIENT | Example 1* | Example 2* | Example 3* | Example 4 | Example 5 | Example 6 | Example 7 | Example 8 | Example 9 | Example 10 |
|---|---|---|---|---|---|---|---|---|---|---|
| Methyl amyl ketone | 35.0 | 35.0 | 35.0 | 35.0 | 35.0 | 35.0 | 35.0 | 35.0 | 35.0 | 40.0 |
| TINUVIN 928[1] | 2.0 | 2.0 | 2.0 | 2.0 | 2.0 | 2.0 | 2.0 | 2.0 | 2.0 | 3.0 |
| TINUVIN 123[2] | 0.50 | 0.50 | 0.50 | 0.50 | 0.50 | 0.50 | 0.50 | 0.50 | 0.50 | 1.00 |
| RESIMENE 757[3] | 41.24 | 41.24 | 41.24 | 41.24 | 41.24 | 41.24 | 41.24 | 41.24 | 41.24 | 41.24 |
| Flow additive[4] | 0.50 | 0.50 | 0.50 | 0.50 | 0.50 | 0.50 | 0.50 | 0.50 | 0.50 | 0.50 |
| Catalyst[5] | 1.43 | 1.43 | 1.43 | 1.43 | 1.43 | 1.43 | 1.43 | 1.43 | 1.43 | — |
| Catalyst[6] | — | — | — | — | — | — | — | — | — | 2.50 |
| Carbamate-functional acrylic resin[7] | 93.75 | 70.17 | 93.34 | 69.91 | 46.73 | 70.31 | 70.31 | 70.31 | 65.63 | 70.31 |
| Silica dispersion of Example AA | — | 23.87 | — | — | 23.87 | — | — | — | — | — |
| Silica dispersion of Example BB | — | — | 10.40 | 10.40 | — | — | — | — | — | — |
| Silica dispersion at Example CC | — | — | — | — | — | 15.09 | — | — | — | — |
| Silica dispersion of Example DD | — | — | — | — | — | — | — | — | 9.23 | — |
| Silica dispersion of Example EE | — | — | — | — | — | — | — | — | — | 33.33 |
| Carbamate-functional polysiloxane of Example B | — | — | — | 18.75 | 18.75 | 4.53 | 18.75 | — | 18.75 | 4.91 |
| Carbamate-functional | — | — | — | — | — | — | — | 27.53 | — | — |

-continued

| INGREDIENT | Example 1* | Example 2* | Example 3* | Example 4 | Example 5 | Example 6 | Example 7 | Example 8 | Example 9 | Example 10 |
|---|---|---|---|---|---|---|---|---|---|---|
| polysiloxane of Example C | | | | | | | | | | |

* Comparative examples.
[1]2-(2H-Benzotriazol-2-yl)-6-(1-methyl-1-phenylethyl)-4-(1,1,3,3-tetramethylbutyl)phenol, ultraviolet light stabilizer available from Ciba-Geigy Corp.
[2]Sterically hindered amino ether light stabilizer available from Ciba-Geigy Corp.
[3]Methylated/butylated melamine formaldehyde resin available from Solutia, Inc.
[4]Polybutylacrylate, 60 percent solids in xylene.
[5]Dodecylbenzenesulfonic acid, 70 percent solids in isopropanol.
[6]Dodecylbenzenesulfonic acid, 91% total neutralization with diisopropanolamine, 40% acid solids in ethanol.
[7]Carbamate functional acrylic resin prepared as follows: A suitable reaction flask equipped for vacuum distillation was flushed with $N_2$ and 1670.2 g of 88% acrylic polyol solution, (40% HPA, 60% BMA), in 1-methoxy-2-propanol, 4.9 g of butyl stannoic acid and 4.9 g triphenyl phosphite added. The reaction was placed under vacuum and heated to a temperature of 140° C. To the resulting mixture was added, over a period of 3 hours, 1263.64 g of a 38% solution of 1-methoxy-2-propyl carbamate in 1-methoxy-2-propanol. The resulting distillate was collected. After the addition was completed, the temperature was increased to 150° C. and held at that temperature until distillation had stopped. The reaction was cooled to 90° C. and brought to atmospheric pressure. The resulting resin had a hydroxyl value of 34.48 and was diluted with a mixture of 251.4 g of 1-methoxy-2-propanol and 3-ethoxy ethyl propionate.

Each of the above coating compositions of Examples 1 through 10 was prepared as a one-pack coating composition by adding the ingredients in the order shown and mixing under mild agitation.
Test Panel Preparation:
BWB-5555 black waterborne basecoat (commercially available from PPG Industries, Inc.) was spray applied to steel panels (4 inches×12 inches) coated with ED5000, cationic electrodepositable primer commercially available from PPG Industries, Inc. The panels were pre-baked at a temperature of 285° F. for approximately 30 minutes. Each of the coating compositions of Examples 1 through 10 above was applied as a transparent topcoat to the basecoated panels (prepared as described immediately above) using a 6 mil drawdown bar to form thereon a transparent topcoat. The topcoated panels were allowed to flash at ambient temperatures for approximately 5 minutes, then thermally cured at 285° F. for 30 minutes. The multi-component composite coatings were tested for various physical properties including gloss, scratch resistance, hardness and haze.
Test Procedures:
Scratch resistance of coated test panel was measured using the following method: Initial 20° gloss of the coated panels is measured with a 20° NOVO-GLOSS 20 statistical glossmeter, available from Gardner Instrument Company, Inc. Coated panels were subjected to scratch testing by linearly scratching the coated surface with a weighted abrasive paper for ten double rubs using an Atlas AATCC Scratch Tester, Model CM-5, available from Atlas Electrical Devices Company of Chicago, Ill. Panels were then rinsed with water and carefully patted dry. The 20° gloss was measured on the scratched area of each test panel. The number reported is the percent of the initial gloss retained after scratch testing, i.e., 100%×scratched gloss/initial gloss. Post-weathering scratch resistance (retained scratch resistance) was measured using the scratch test method described above after the unscratched test panels were subjected to simulated weathering by QUV exposure to UVA-340 bulbs in a weathering cabinet available by Q Panel Co. Testing was as follows a cycle of 70° C. for 8 hours followed by 50° C. for 4 hours (total exposure time of 100 hours). The number reported is the percent of the initial gloss retained after post-weathering scratch testing, i.e., 100×post-weathering scratched gloss/initial gloss.
Film hardness of the multi-layer composite coatings was measured using a TUKON Hardness Tester according to ASTM-D1474-92 to give Knoop Hardness values. Higher reported values indicate harder coating surfaces.

The degree of haziness or lack of film clarity of the transparent topcoat was measured using BYK HAZE/GLOSS instrument from BYK Chemical. Higher numbers indicate a higher degree of haziness or lack of clarity. Test results are provided in the following Table 1.

TABLE 1

| Example | 20° Gloss (Initial) | % Initial 20° Gloss After Mar/Scratch Test | % Initial 20° Gloss Retained Post-Weathering Mar/Scratch Test | Knoop Hardness | Byk Haze |
|---|---|---|---|---|---|
| 1 | 89 | 26% | 25% | 10.9 | 14 |
| 2 | 89 | 58% | 30% | 12.1 | 18 |
| 3 | 88 | 82% | 86% | 11.2 | 19 |
| 4 | 50 | 82% | 62% | 12.1 | 294 Haze |
| 5 | 89 | 85% | 28% | 11.8 | 19 |
| 6 | 87 | 95% | 94% | 12.1 | 14 |
| 7 | 89 | 80% | 22% | 11.9 | 14 |
| 8 | 91 | 69% | 31% | 10.9 | 14 |
| 9 | 88 | 95% | 93% | 11.2 | 14 |
| 10 | 86 | 97% | 92% | — | — |

The results reported in Table 1 above illustrate that the multi-component composite coating compositions of the invention of Examples 4–10 provide coatings with good Knoop film hardness and initial and retained scratch resistance after simulated weathering testing.

Examples 11–18

The following describes the preparation of coating compositions prepared as two-pack systems, that is, a polyisocyanate curing agent was added to the remaining ingredients just prior to application. The two-pack systems were prepared from a mixture of the ingredients listed below. Amounts indicated for each component are expressed in grams total weight.

| Ingredients | Example 11* | Example 12* | Example 13* | Example 14* | Example 15 | Example 16 | Example 17 | Example 18 |
|---|---|---|---|---|---|---|---|---|
| Methyl amyl ketone | 20.0 | 20.0 | 20.0 | 20.0 | 20.0 | 20.0 | 20.0 | 40.0 |
| Acrylic polyol[1] | 89.6 | 89.6 | 89.6 | 89.6 | 43.3 | 43.3 | — | 43.3 |
| CYMEL 202[2] | — | — | 18.8 | 18.8 | 18.8 | 18.8 | 18.8 | 18.8 |
| Acid catalyst[3] | — | 1.3 | — | 1.3 | — | 1.3 | 1.3 | 1.3 |
| Polysiloxane polyol or Example 4 | — | — | — | — | 23.4 | 23.4 | 20.9 | 13.4 |
| Silica dispersion[4] | — | — | — | — | — | — | 7.7 | 30.8 |
| DESMODUR N-3390[5] | 41.4 | 41.4 | 24.8 | 24.8 | 33.3 | 33.3 | 33.3 | 33.3 |

*Comparative examples.
[1](18% butyl methacrylate/40% hydroxy-propylmethacrylate/1% methyl methacrylate/20% styrene/19% butyl acrylate/2% acrylic acid) 71% solids in a solvent blend of (55% xylene/45% aromatic hydrocarbon).
[2]High imino, methylated/butylated melamine formaldehyde resin available from Cytec Industries, Inc.
[3]Phenyl acid phosphate solution, 75 percent in isopropanol.
[4]Silica Dispersion of Example DD
[5]Polyisocyanate based on hexamethylene diisocyanate available from Bayer Corporation.

TABLE 2

| Example | Initial 20° Gloss | % Initial 20° Gloss After Mar/Scratch Test | % Initial 20° Gloss Retained Post-Weathering Mar/Scratch Test | Knoop Hardness | Byk Haze |
|---|---|---|---|---|---|
| 11 | 88 | 17% | 22% | 10.9 | 11 |
| 12 | 88 | 15% | 19% | 10.0 | 11 |
| 13 | 90 | 30% | 21% | 10.9 | 10 |
| 14 | 92 | 57% | 48% | 13.9 | 11 |
| 15 | 88 | 47% | 14% | 10.0 | 14 |
| 16 | 89 | 88% | 66% | 9.8 | 15 |
| 17 | 86 | 98% | 97% | 11.8 | 18 |
| 18 | 84 | 98% | 98% | 10.5 | 18 |

The data presented in Table 2 above illustrate that the coating compositions of Examples 15–18 of the present invention exhibit good initial and retained scratch resistance properties after simulated weathering.

Example 19

This example describes the preparation of a one-component coating composition used to form the transparent topcoat in a multi-component composite composition of the present invention suitable for application to a flexible elastomeric substrate. The film forming composition contains a hydroxyl functional group-containing polysiloxane and inorganic particles in the form of a colloidal silica. The coating composition was prepared from a mixture of the following ingredients under agitation in the order which they appear:

| Ingredients | Resin Solids | Silica Solids | Weight in Grams |
|---|---|---|---|
| 2-Methoxy propyl acetate | | | 2.7 |
| Methyl amyl ketone | | | 40.0 |
| TINUVIN 928 | 3.0 | | 3.0 |
| TINUVIN 123 | 0.5 | | 0.5 |
| Carbamate functional acrylic[1] | 21.5 | | 33.6 |
| Carbamate functional polyester[2] | 21.5 | | 30.7 |
| Carbamate functional polyether[3] | 10.0 | | 10.3 |
| Silica dispersion[4] | 7.0 | 3.0 | 12.8 |
| RESIMENE 757 | 40.0 | | 41.2 |
| Flow additive of Comparative Example 1 | 0.3 | | 0.5 |
| Catalyst solution[5] | 1.0 | | 2.5 |

[1]Carbamate functional acrylic resin prepared as follows: To a suitable flask was added 3652.5 g of 90% acrylic polyol solution (40% HPA, 58% BMA, 2% methyl styrene dimer) in 1-methoxy-2-propanol, 2836.2 grams of a 38% solution of 1-methoxy-2-propyl carbamate in 1-methoxy-2-propanol, 25.0 grams of 1-methoxy-2-propanol, 9.6 grams triphenyl phosphite, and 2.4 grams butyl stannoic acid. The materials were mixed and then transferred over a period of 7.3 hours into a reactor vessel suitable for vacuum distillation. During the transfer, the temperature of the reactor was held between 131° C. and 139° C., and reduced pressure was maintained to ensure steady distillation of 1-methoxy-2-propanol. Upon completion of the transfer, pressure was gradually reduced to maintain distillation until a final pressure of 41 mm Hg was reached. When distillation was completed, the resulting resin was cooled and thinned with 925 g 1-methoxy-2-propanol and 950 g ethyl 3-ethoxypropionate. Prior to thinning, the resin had a measured hydroxyl value of 40.8. After thinning, the resin had a measured solids content of 63%, a weight average molecular weight of 9107, and a number average molecular weight of 3645 as determined by gel permeation chromatography vs. a polystyrene standard.
[2]Carbamate functional polyester prepared as follows: A polyester was prepared from 2,2,4-trimethyl-1,3-pentanediol/trimethylolpropane/neopentyl/glycol/hexahydrophthalic anhydride (22.7/10.6/17.5/49.2 weight ratio) with a resulting hydroxyl value of 146 and at 100% solids. To a reactor equipped with a thermocouple, overhead stirrer, nitrogen inlet, and reflux condenser was added 375.1 parts by weight of the polyester as prepared immediately above, 71.9 parts methyl carbamate, 1.0 parts butyl stannoic acid, 0.8 parts triphenyl phosphite, and 35.0 parts 2-methoxy-1-propanol. The reactants were heated to reflux under nitrogen blanket at 141° C. and held for 1 hour. Then, the reflux condenser was removed and the reactor equipped for distillation at atmospheric pressure. The temperature was gradually increased to 151° C. until 28.7 parts of distillate were collected. The mixture was then cooled to 145° C. and the reactor equipped for vacuum distillation. Distillation continued under reduced pressure until 60 mmHg was attained. A total distillate of 78.3 parts was collected. The resulting resin hydroxy value was 33.8 at 100% solids. The resin was cooled and diluted with 140 parts 2-methoxy-1-propanol. The final resin solution was 72.2% solids with a weight average molecular weight of 2197 and number average molecular weight of 1202 as determined by gel permeation chromatography using polystyrene standards.
[3]Polyester of Example B of U.S. Pat. No. 5,663,244.
[4]Silica dispersion prepared as follows: a 4-neck reaction flask equipped for vacuum distillation was flushed with $N_2$. To the reaction flask was added 1051.1 g of siloxane polyol from Example A, 1125.8 g of ORGANOSILICASOL MT-ST-M colloidal silica from Nissan Chemicals and 480.3 g of methyl amyl ketone. The resulting mixture was vacuum distilled at 25° C. for 4 h.
[5]Solution of 72.9 g dodecylbenzene sulfonic acid/27.1 g diisopropanol amine/51.1 g ethanol/31.2 g isopropanol.

Example 20

This example describes the preparation of a two-component coating composition used to form a transparent topcoat in a multi-component composite composition of the present invention. The film forming composition contains both aminoplast and polyisocyanate curing agents, hydroxyl functional group-containing polysiloxane and inorganic particles in the form of a colloidal silica. The coating composition was prepared from a mixture of the following ingredients under agitation in the order which they appear:

| Ingredients | Resin Solids | Silica Solids | Weight in Grams |
|---|---|---|---|
| Methyl amyl ketone | | | 35.0 |
| Ethyl 3-ethoxy propionate | | | 11.9 |
| Silica dispersion of Example 19 | 4.7 | 2.0 | 8.6 |
| TINUVIN 928 | 3.0 | | 3.0 |
| CYMEL 202 | 15.0 | | 18.8 |
| Acrylic polyol[1] | 23.6 | | 47.2 |
| Polyester polyol[2] | 20.3 | | 25.3 |
| Polysiloxane of Example A | 10.4 | | 10.4 |
| TINUVIN 292[3] | 0.5 | | 0.5 |
| Flow additive of Example 1 | 0.3 | | 0.5 |
| The following two ingredients were added to the above mixture immediately prior to application of the coating: | | | |
| DESMODUR N-3390 | 26.0 | | 28.9 |
| Catalyst of Example 12 | 1.0 | | 1.3 |

[1]Acrylic polyol: (34.8% HEMA/23.4% 2-EHMA/20.8% 2-EHA/20% Styrene/1% MAA), 51% in 1:1 xylene/butyl acetate, having a weight average molecular weight of 7200, a number average molecular weight of 2850 based on gel permeation chromatography using polystyrene standards.
[2]Polyester polyol: (32% 4-methyl hexahydrophthalic anhydride/22.9% 1,6 hexane diol/18.6% trimethylol propane/18.4% adipic acid/8.1% trimethyl pentane diol), 80% in 60:40 butyl acetate/Solvesso 100, having a hydroxy value of 145 and a Gardner-Holte viscosity of X–Z.
[3]Hindered amine light stabilizer available from Ciba-Geigy Corp.

Test Panel Preparation:

MPP4100D, high solids adhesion promoter commercially available from PPG Industries, Inc., was applied to SEQUEL 1440 TPO plaques, commercially available from Standard Plaque (4 inches×12 inches), by hand spraying at a dry film thickness of 0.15 mils to 0.25 mils (3.8 microns to 6.4 microns). Each Sequel 1440 plaque was cleaned with isopropyl alcohol prior to being treated. The treated Sequel 1440 plaques were allowed to stand for one day before a solventborne black basecoat commercially available from PPG Industries, Inc., either CBCK8555A (used in conjunction with 2K clearcoats) or CBC8555T (used in conjunction with 1K clearcoats), was applied at a dry film thickness of 0.8 mils to 1.0 mils (20.3 microns to 25.4 microns). CBCK8555A and CBC8555T basecoats were applied by spraymation in two coats with a 90 second Aflash-dry" period at ambient temperatures between each coat. The basecoated panels were flash-dried at ambient temperature for 90 seconds before the transparent topcoats described in the above Examples 19 and 20 were applied by spraymation in two coats with a 90 second ambient flash between each coat. The transparent topcoats had a dry film thickness ranging from 1.6 mils to 1.8 mils (40.6 microns to 45.7 microns). The topcoated panels were flashed-dried at ambient temperature for 10 minutes and then thermally cured at 254° F. (123.3° C.) for 40 minutes. The coated test panels sat at ambient temperature for four days prior to testing.

The test panels prepared as described immediately above were evaluated for 20° gloss, scratch resistance and post-weathering scratch resistance using the methods described above for these properties versus commercial one-pack and two-pack systems.

Additionally, the coated test panels were tested for flexibility at 70° F. (21.1° C.). For flex testing, a 1-inch by 4-inch piece was cut from the coated test panel. The piece was subjected to a mandrel bend using a 2 inch diameter steel mandrel, such that the two ends of the 4-inch long test piece contacted one another. The test panels were then rated for flexibility by visual inspection for coating cracking on a scale of 0 to 10. A "10" rating is recorded where there is no visible paint cracking; a "9" rating has less than five interrupted short line cracks; an "8" has interrupted line cracks with a maximum of four uninterrupted line cracks; a "6" has five to ten uninterrupted line cracks; a "4" has more than 15 uninterrupted line cracks; and a "0" represents fracture of the substrate.

Test results are reported in the following Table 3.

TABLE 3

| EXAMPLE | 20° Gloss (Initial) | % Initial 20° gloss retained after mar/scratch test | % Initial 20° gloss retained post-weathering | Flexibility Rating |
|---|---|---|---|---|
| Example 19 | 86 | 83 | 55 | 8 |
| *Commercial Flexible 1K Clear[1] | 88 | 46 | 11 | 8 |
| Example 20 | 85 | 69 | 35 | 10 |
| *Commercial Flexible 2K Clear[2] | 87 | 17 | 8 | 9 |

*Comparative examples.
[1]UDC-1000 flexible 1-component clearcoat available from PPG industries, Inc.
[2]TKU-2000 flexible 2-component clearcoat available from PPG Industries, Inc.

The data presented in Table 3 above illustrate that the coating compositions of Examples 19 and 20 of the present invention, when applied to thermoplastic polyolefin (TPO) elastomeric substrates, provide similar initial gloss and flexibility properties compared to commercial clearcoats without silica or polysiloxane, while providing superior post-weathering scratch resistance.

Example 21

This example describes the preparation of epoxy/acid coating compositions which contain both a functional group-containing polysiloxane and inorganic particles in the form of colloidal silica at levels lower than 1% based on total weight of resin solids in the compositions. The coating compositions were prepared from a mixture of the following ingredients:

| Ingredients: | Example 21A* (grams) | Example 21B* (grams) | Example 21C (grams) | Example 21D (grams) | Example 21E (grams) |
|---|---|---|---|---|---|
| Methyl amyl ketone | 40.0 | 40.0 | 40.0 | 40.0 | 40.0 |
| CYMEL 202 | 2.50 | — | — | — | — |
| Silica dispersion[1] | — | — | 0.03 | 0.08 | 0.17 |
| CYLINK 2000[2] | — | 28.30 | 28.30 | 28.30 | 28.30 |
| Polybutylacrylate | 0.50 | 0.50 | 0.50 | 0.50 | 0.50 |
| N,N-dimethyl dodecyl amine | 0.30 | 0.30 | 0.30 | 0.30 | 0.30 |
| Acrylic resin[3] | 87.89 | 87.89 | 87.89 | 87.89 | 87.89 |
| Crosslinker[4] | 63.69 | 63.69 | 63.69 | 63.69 | 63.69 |

-continued

| Ingredients: | Example 21A* (grams) | Example 21B* (grams) | Example 21C (grams) | Example 21D (grams) | Example 21E (grams) |
|---|---|---|---|---|---|
| Catalyst of Example 12 | — | 1.30 | 1.30 | 1.30 | 1.30 |

*Comparative examples.
[1] 30% by weight on solilds Nissan MT-ST colloidal silica dispersed in the polysiloxane polyol of Example A.
[2] Tris(alkylcarbamoyl)triazine crosslinker (TACT), available from CYTEC Industries, Inc.
[3] Epoxy functional acrylic resin prepared from 50% glycidyl methacrylate, 40.8% butyl methacrylate, 7% styrene, 0.2% methyl methacrylate, and 2% methyl styrene dimer; 60% solids in xylene.
[4] Acid functional crosslinker prepared from 17 weight percent pentaerythritol and 83 weight percent methyl-hexahydrophthalic anhydride.

The coating compositions of Examples 21A–21E were applied over a black basecoat (OBISIDIAN SCHWARTZ basecoat, available from PPG Industries, Inc,) which had been previously applied to the test panels and cured for 30 minutes at 285° F. (140.6° C.). The transparent coating composition of each example was drawn down over the cured basecoat using a 6 mil square drawdown bar and cured for 30 minutes at 285° F. (140.6° C.).

TABLE 4

| Example | Initial 20° Gloss | Post-Mar % 20° Gloss Retained | Post-weathering scratch (mar) % 20° Gloss Retained |
|---|---|---|---|
| 21A* | 84 | 14 | 12 |
| 21B* | 86 | 27 | 23 |
| 21C | 86 | 49 | 42 |
| 21D | 86 | 67 | 58 |
| 21E | 85 | 80 | 68 |

The data presented in Table 4 above illustrate that the coating compositions of Examples 21C–21E of the present invention provide superior initial and retained mar resistance when compared to comparative compositions which contain no inorganic particles or polysiloxane.

Example 22

This example describes the preparation of two-component coating compositions 22A through 22I which illustrate the effects of lower (i.e., ≦2 weight percent) levels of polysiloxane. Comparative Examples 22A and 22B contain 0% colloidal silica/0% polysiloxane and 2% colloidal silica/0% polysiloxane, respectively. Examples 22C–22I describe coating compositions which each contain 2 weight % of a polysiloxane.

POLYSILOXANES EVALUATED

| SILOXANE CODE | HYDROXYL EQUIVALENT WEIGHT | DESCRIPTION |
|---|---|---|
| Polysiloxane of Example A | 190 | Reaction product of pentasiloxane containing Si—H with trimethylolpropane monoallyl ether |
| KR 2001 | 252 | Hydroxy functional methyl and phenyl siloxane from Shin-Etsu Chemical Co. |
| BYK 370 | 1600 | Polyester modified hydroxy functional dimethylpolysiloxane from BYK Chemie |
| BYK 373 | 701 | Polyether modified hydroxy functional dimethylpolysiloxane from BYK Chemie |
| BYK 375 | 1870 | Polyether-polyester modified hydroxy functional dimethylpolysiloxane from BYK Chemie |
| BYK 325 | 0 | Polyether modified methyl alkylpolysiloxane from BYK Chemie |
| BYK 310 | 0 | Polyester modified dimethylpolysiloxane from BYK Chemie |

Coating Compositions

A coating composition was prepared from a mixture of the following ingredients:

| Ingredient | Solid Weight (G) | Formula Weight (G) |
|---|---|---|
| Methyl amyl ketone | — | 31.2 |
| CYMEL 202 | 15.0 | 18.8 |
| Acrylic polyol[1] | 61.5 | 102.1 |
| Polybutylacrylate | 0.3 | 0.5 |
| DESMODUR N-3390 | 22.4 | 24.9 |
| Phenyl acid phosphate catalyst | 1.0 | 1.3 |

[1] Copolymer of 39.35 weight % hydroxyethyl methacrylate/57.05 weight % isobutyl methacrylate/1.96 weight % acrylic acid/1.63 weight % methyl styrene dimer, 60.25% solids in a solvent blend.

Each of the coating compositions of Example 22A–22I was prepared by adding the following weight percentages of colloidal silica and polysiloxane ingredients to 178.8 grams of the coating composition described immediately above. The coating compositions thus prepared were applied and tested as described above for Examples 1–18.

| Example | % Colloidal Silica[1] | % Siloxane | Siloxane Type | Initial 20° Gloss | % Initial 20° Gloss Retained After Mar/Scratch Test | Coefficient of Friction ($\mu$) |
|---|---|---|---|---|---|---|
| 22A | 0 | 0 | — | 86 | 38% | 0.19 |
| 22B | 2 | 0 | — | 86 | 44% | 0.18 |
| 22C | 2 | 1.1 | Polysiloxane of Example A | 84 | 89% | 0.17 |

-continued

| Example | % Colloidal Silica[1] | % Siloxane | Siloxane Type | Initial 20° Gloss | % Initial 20° Gloss Retained After Mar/Scratch Test | Coefficient of Friction ($\mu$) |
|---|---|---|---|---|---|---|
| 22D | 2 | 1.5 | KR-2001 | 85 | 51% | 0.12 |
| 22E | 2 | 1.0 | Byk-370 | 85 | 58% | 0.07 |
| 22F | 2 | 1.0 | Byk-373 | | Too Seedy To Test | |
| 22G | 2 | 1.0 | Byk-375 | 76 | 57% | 0.04 |
| 22H | 2 | 1.0 | Byk-325 | | Too Seedy To Test | |
| 22I | 2 | 1.0 | Byk-310 | 84 | 52% | 0.09 |

[1]ORGANOSILICASOL MT-ST, available from Nissan Chemicals.

The data reported above illustrate that the coating compositions of Example 22C of the present invention containing very low levels (i.e., 1.0 weight percent) of the polysiloxane polyol of Example A in conjunction with inorganic particles in the form of colloidal silica provide excellent initial scratch (mar) resistance. Further, the data illustrate that the inorganic particles and the polysiloxane polyol act synergistically to provide excellent post-weathering scratch resistance.

Example 23

This example describes the preparation of transparent topcoat coating compositions which, subsequent to application and cure, were evaluated using transmission electron microscopy surface characterization techniques. Example 23A describes the preparation of a transparent topcoat composition of the present invention containing inorganic particles in the form of colloidal silica in conjunction with the polysiloxane polyol of Example A, both of which were added as separate components. Comparative Example 23B describes the preparation of a comparative transparent topcoat composition containing inorganic particles in the form of colloidal silica, but no polysiloxane. Example 23C describes the preparation of a transparent topcoat composition of the present invention where the inorganic particles in the form of colloidal silica were dispersed in the polysiloxane polyol of Example A prior to incorporation into the composition.

Each of the coating compositions were prepared as described below.

Example 23A

| Description | Solids | Total Weight |
|---|---|---|
| Methyl Amyl Ketone | — | 66.6 |
| Tinuvin 928 | 3.0 | 3.0 |
| Colloidal silica[1] | 5.0 | 16.7 |
| Cymel 202 | 15.0 | 18.8 |
| Polysiloxane polyol of Example A | 2.0 | 2.0 |
| Acrylic polyol[2] | 63.0 | 106.1 |
| Tinuvin 123 | 1.0 | 1.0 |
| Polybutylacrylate | 0.3 | 0.5 |
| Catalyst of Example 12 | 1.0 | 1.3 |
| Desmodur N-3390[3] | 20.0 | 22.2 |

[1]ORGANOSILICASOL MT-ST, available from Nissan Chemicals.
[2]Polymerization reaction product prepared from the following monomer composition in Dowanol PM acetate, using VAZO 67 (azo bis-2,2=-(2-methylbutyronitrile), 4.9% on total monomer charge as an initiator): 39.4 parts of hydroxyethyl methacrylate, 2 parts of acrylic acid, 57 parts of isobutyl methacrylate, and 1.6 parts of α-methylstyrene dimer. The polymer solution exhibited the following properties: 60% solids contents; 82.4 OH value; molecular weight: 7410 (Mw).
[3]Hexamethylene diisocyanate crosslinker, 90% solids, available from Bayer Corporation Example 23B

| Description | Solids | Total Weight |
|---|---|---|
| Methyl Amyl Ketone | — | 66.2 |
| Tinuvin 928 | 3.0 | 3.0 |
| ORGANOSILICASOL ® MT-ST | 5.0 | 16.7 |
| Cymel 202 | 15.0 | 18.8 |
| Acrylic polyol of Example 23A | 65.7 | 110.7 |
| Tinuvin 123 | 1.0 | 1.0 |
| Polybutylacrylate | 0.3 | 0.5 |
| Catalyst of Example 12 | 1.0 | 1.3 |
| Desmodur N-3390 | 19.3 | 21.4 |

Example 23C

| Description | Solids | Total Weight |
|---|---|---|
| Methyl amyl ketone | — | 25.0 |
| Silica dispersion[1] | 6.7 | 8.6 |
| Tinuvin 928 | 3.0 | 3.0 |
| Acrylic polyol[2] | 35.9 | 65.3 |
| Tinuvin 292 | 0.5 | 0.5 |
| Polybutylacrylate | 0.3 | 0.5 |
| Polysiloxane polyol of Example A | 15.3 | 15.3 |
| Cymel 202 | 15.0 | 18.8 |

-continued

| Description | Solids | Total Weight |
| --- | --- | --- |
| Catalyst of Example 12 | 0.5 | 0.7 |
| Desmodur N-3300[3] | 29.1 | 29.1 |

[1]Dispersion of colloidal silica in polysiloxane prepared as follows:
A 4-neck reaction flask equipped for vacuum distillation was flushed with $N_2$. To the reaction flask was added 3151.4 g of polysiloxane polyol of Example A, 4501.9 of colloidal silica (ORGANOSILICASOL MT-ST, available from Nissan Chemicals) and 1440.6 g of methyl amyl ketone. The resulting mixture was vacuum distilled.
[2]VK-114, an acrylic polyol having the following properties: solids 55%, Mw 4000 and OH value 101, available from PPG Industries, Inc.
[3]Hexamethylene diisocyanate crosslinker, 100% solids, available from Bayer Corporation.

Test Panel Preparation for Examples 23A AND 23B:

A black basecoat, SMARAGDSCHWARZ MICA, available from PPG (B&K) Germany, was spray applied to steel test panels (4"×12" panels commercially available from ACT Laboratories, Inc. of Hillsdale, Mich.) which had been coated with ED-5000 electrocoat primer and GPXH-5379 primer surfacer (both commercially available from PPG Industries, Inc.) using spraymation. The basecoat was applied in two coats with a no flash between coats followed by a five minute heated flash at 200° F. before application of the clearcoats. The basecoat had a dry film thickness of 0.47 mils (11.75 micrometers). The coating compositions of Examples 23A and 23B were spray-applied to the cured basecoats in two coats with a 60-second flash between coats followed by 5 minute ambient flash prior to curing for 30 minutes at 285° F. (140.6° C.). Each clearcoat had a dry film thickness of approximately 2.1 mils (54.5 micrometers).

Test Panel Preparation for Example 23C:

A black basecoat, OBSIDIAN SCHWARTZ, available from PPG (B&K) Germany was spray applied and cured as described immediately above for Examples 23A and 23B. The coating composition of Example 23C was applied to the basecoat as a clearcoat and cured using the procedure described above for the clearcoats of Example 23A and 23B. The basecoat had a dry film thickness of 0.5 mils (12.5 micrometers) and the clearcoat had a dry film thickness of 1.44 mils (36 micrometers).

Cross-Sectional Transmission Electron Microscopy

Cured coating samples were delaminated from the substrate and embedded in epoxy using an EPONATE 812 epoxy embedding kit available from Ted Pella's Inc. in a polyester bottle cap mold. Once heat set, samples were removed from the molds and were cut using an X-ACTO razor saw, extra fine tooth #75350 to a size of approximately 1.5 centimeters×1 centimeter. The sized samples were then microtomed at ambient temperature using a RMC MY6000XL microtome using a vice clamp specimen holder. Microtome sections were cut using a 452 diamond knife edge mounted in a holder with a water-filled boat cavity. Cuts were made to an interference color of bright to dark gold color (approximately 100 nanometers to 150 nanometers), then individual cut specimens were collected onto a TEM formvar-carbon coated grid. Excess water was removed with filter paper and the thin sections were air-dried at ambient temperature on a glass microscope slide. Sections were sorted by interference color thickness. The coating specimens were oriented on the glass slides to permit tilting on axis such that a perpendicular cross-section could be observed. Samples were placed in a Philips CM12 TEM operated at a 100 KV accelerating voltage, in transmission mode, using a standard tungsten filament and examined at various magnifications for documenting of coating surface morphologies and particle concentration by visual observation. Kodak SO-163 electron image film was used to create electron micrograph negatives and the negatives subsequently developed.

FIG. 1 is an electron micrograph of a transmission electron microscopy image (30,000× magnification) of a cross-section of a cured transparent topcoat composition of Example 23A which contains both colloidal silica and polysiloxane added as separate components. Upon visual inspection, it can be observed that the concentration of particles in the form of colloidal silica 1b at the surface region of the cured composition, that is, a region extending from the exposed air-surface interface 1a to a cured coating depth of 20 to 50 nanometers (1 millimeter=approximately 30 nanometers) below the exposed surface is greater than the concentration of colloidal silica 1c within a bulk region of the cured composition. It should also be noted that the particles 1b and 1c exist as agglomerates dispersed within the polymer matrix, rather than as discrete monodispersed particles.

Figure 2:
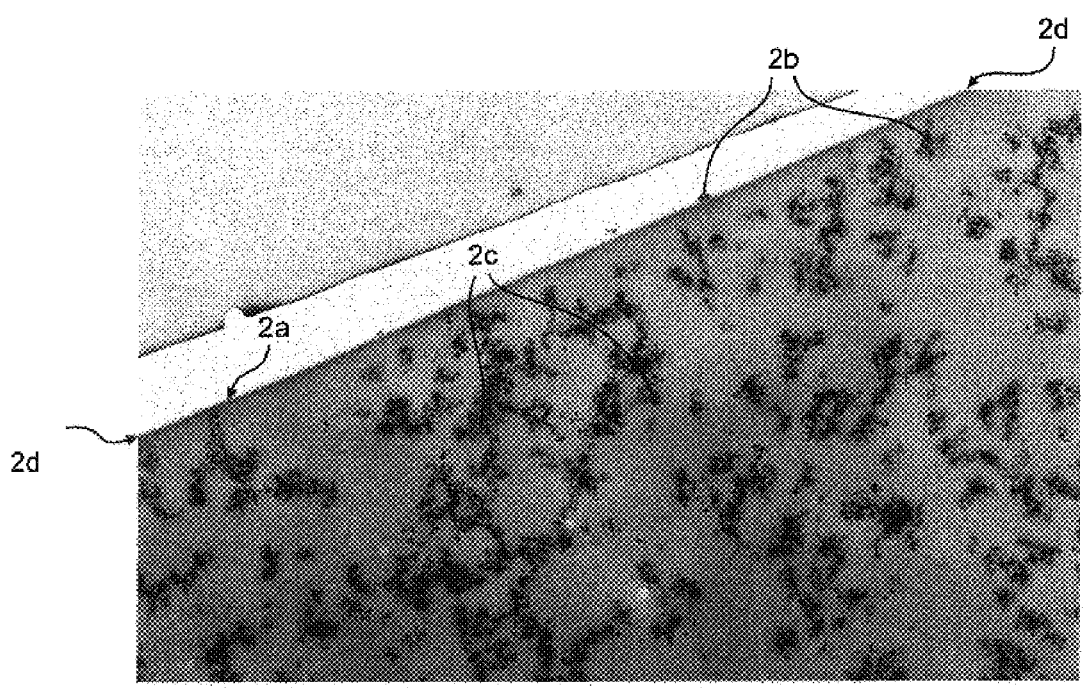
FIG. 2 is a transmission electron micrograph (30,000× magnification) of a cross-section of a comparative example of a transparent topcoating composition which contains colloidal silica but not polysiloxane.

FIG. 2 is an electron micrograph of a transmission electron microscopy image (30,000× magnification) of a cross-section of the cured comparative transparent topcoat coating composition of Example 23B which contains colloidal silica but not polysiloxane. Upon visual inspection, it can be observed that the concentration of particles in the form of colloidal silica 2b at the surface region of the comparative cured composition, that is, a region extending from the exposed air-surface interface 2a to a cured coating depth of 20 to 50 nanometers (1 millimeter=approximately 30 nanometers) below the exposed surface is less than the concentration of colloidal silica 2c within a bulk region of the cured composition. In fact, there is essentially no colloidal silica observed in the surface region. It should also be noted that the particles 2b and 2c appear as agglomerates within the polymer matrix, rather than as discrete monodispersed particles.

Figure 3:
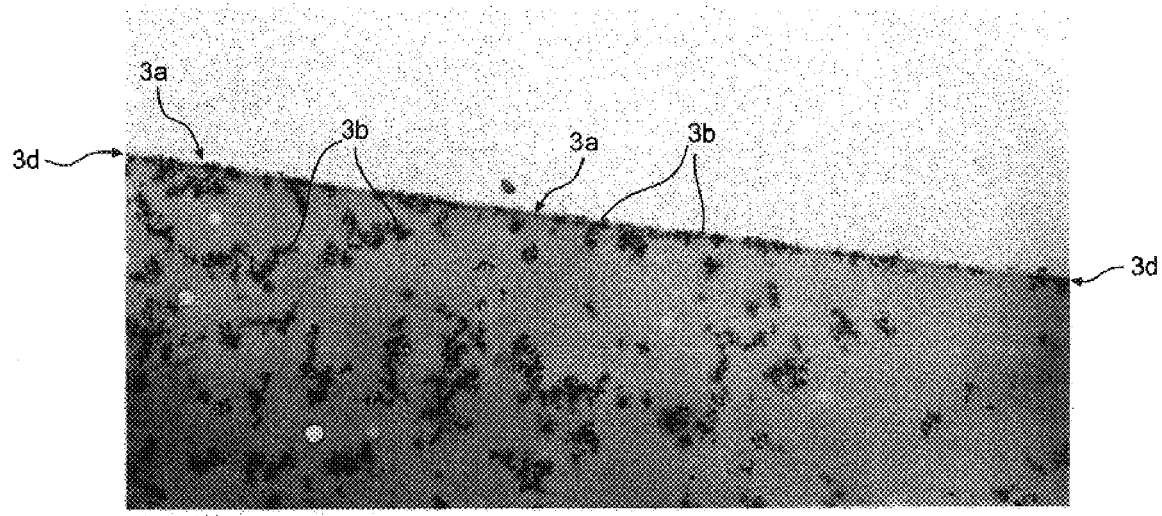
FIG. 3 is a transmission electron micrograph of a cross-section of the cured transparent topcoating composition of FIG. 1, but viewed at 54,000× magnification.

FIG. 3 is an electron micrograph of a transmission electron microscopy image of a cross-section of the cured transparent topcoat coating composition of Example 23A (see FIG. 1) viewed at a magnification of 54,000×.

FIG. 4 is an electron micrograph of a transmission electron microscopy image (105,000× magnification) of a cross-section of a preferred cured transparent topcoat coating composition of the present invention which contains a pre-formed dispersion of colloidal silica and a polysiloxane. Upon visual inspection, it clearly can be observed that the concentration of particles in the form of colloidal silica 4b at the surface region of the cured composition, that is, a region extending from the exposed air-surface interface 2a to a cured coating depth of 20 to 50 nanometers below the exposed surface, is greater than the concentration of colloidal silica 4c within a bulk region of the cured composition. It should also be noted that the particles 4b and 4c appear as discrete monodispersed particles distributed within the polymer matrix, rather than as agglomerated particles (compare FIGS. 1 and 2).

Example 24

In this example, a coating composition of the present invention which contains inorganic particles in the form of colloidal silica pre-dispersed in a functional group-containing polysiloxane was evaluated versus a comparative commercial two-component isocyanate clearcoat for coating penetration (scratch depth) as a function of load and scratch distance.

Example 24A

A coating composition of the present invention was prepared from a mixture of the following ingredients:

| Ingredient | Solids | Total Weight (grams) |
|---|---|---|
| Methyl amyl ketone | — | 25.0 |
| Silica dispersion[1] | 6.7 | 8.6 |
| TINUVIN 928 | 3.0 | 3.0 |
| Acrylic polyol of Example 23C | 40.9 | 74.4 |
| TINUVIN 292 | 0.5 | 0.5 |
| Polybutylacrylate flow additive | 0.3 | 0.5 |
| Polysiloxane polyol of Example A | 10.3 | 10.3 |
| CYMEL 202 | 15.0 | 18.8 |
| Catalyst of Example 12 | 0.5 | 0.7 |
| DESMODUR N-3300 | 29.1 | 29.1 |

[1] A proportional scaled batch of Example 23C.

Example 24B

A black waterborne basecoat was prepared from a mixture of the following ingredients:

| Ingredients | Solids (grams) | Total Weight (grams) |
|---|---|---|
| PROPASOL B[1] | — | 45.0 |
| CYMEL 327[2] | 35.0 | 38.9 |
| TINUVIN 1130[3] | 3.2 | 3.2 |
| Phosphated epoxy[4] | 0.5 | 0.8 |
| Dimethylethanolamine (50% in water) | — | 2.0 |
| Latex[5] | 46.5 | 109.4 |
| Mineral spirits | — | 8.0 |
| Water-reducible urethane[6] | 10.0 | 42.6 |
| Black pigment dispersion[7] | 11.5 | 47.6 |
| Dimethylethanolamine (50% in water) | — | 1.0 |
| Deionized water | — | 57.5 |

[1] N-Butoxypropanol available from Chemcentral Corporation, Chicago.
[2] Methylated melamine-formaldehyde resin available from Cytec Corporation.
[3] Substituted hydroxyphenyl benzotriazole ultraviolet light stabilizer available from Ciba Geigy Corporation.
[4] Proprietary phosphatized epoxy resin (EPON 828 from Shell Chemical Company) from PPG Industries, Inc.
[5] Proprietary acrylic-polyester latex from PPG Industries, Inc.
[6] Proprietary waterborne polyurethane, PPG Industries, Inc.
[7] Proprietary carbon black dispersion in water dispersible acrylic resin, PPG Industries, Inc.

Test Panel Preparation:

Steel substrate test panels (available from ACT Laboratories, Inc.) were coated with ED-5000 electrocoat primer (available from PPG Industries, Inc.). The basecoat of Example 24B above was spray applied to the primed panels in two successive coats with no flash period between coats. The basecoated panels were flash-heated for 5 minutes at 200° F. prior to application of the clearcoats. Basecoat dry film thickness was 0.4 mils (10 micrometers). The coating composition of Example 24A above and a commercial two-component clearcoat (TKU-1050 available from PPG Industries, Inc.) were spray applied to the basecoated panels in two coats with a 60-second flash between coats, followed by a 10-minute ambient flash before curing for 30 minutes at 285° F. (140.6° C.). Clearcoat dry film thickness was 1.6 mils for each example (40 micrometers).

The test panels prepared as described above were tested by MTS Corporation of Oak Ridge, Tenn. for surface penetration (or scratch depth) as a function of load applied at a given rate over a given distance. The Nano Indenter XP system was employed using a cube corner indenter, at a scratch velocity of 20 $\mu$m/s, using normal load ramp of 1000 $\mu$N/s to a maximum load of 25 mN over a scratch length of 500 $\mu$m.

Figure 5:
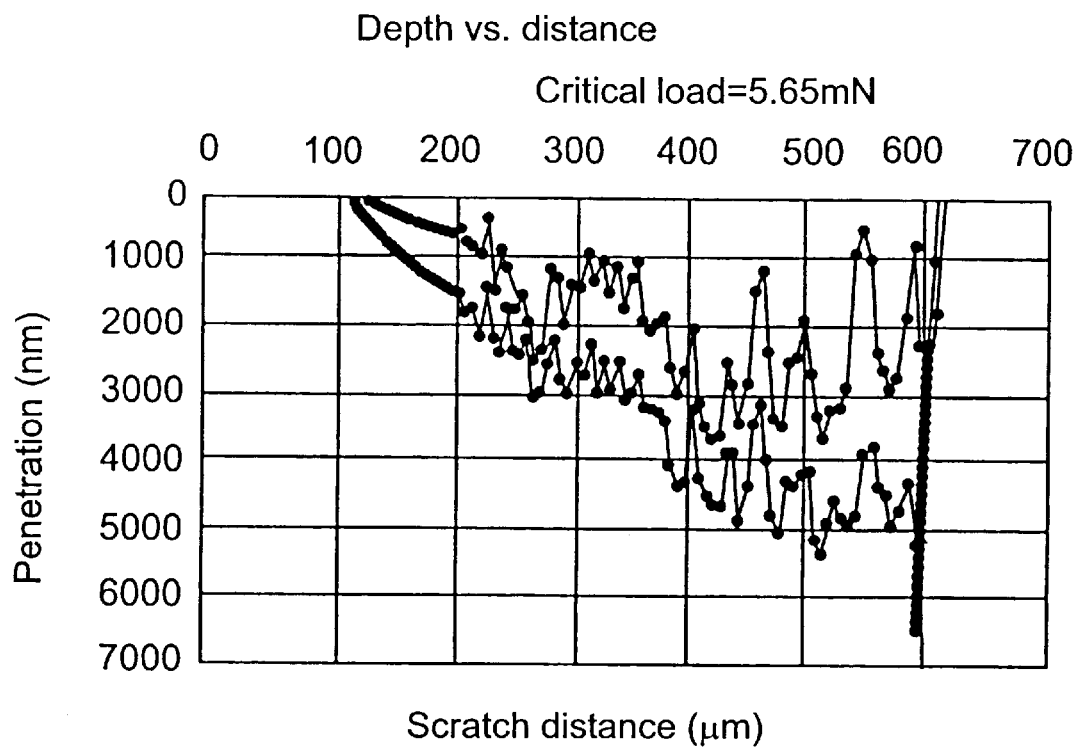
FIG. 5 is a graph of scratch depth as a function of load over a given scratch distance showing scratch (mar) resistance of a commercial two-component polyurethane coating.

FIG. 5 is a graph (scratch depth versus scratch distance) of coating surface penetration relative to load for the commercial two-component polyurethane coating (comparative example) using nano-indenter techniques described above. Critical load determined for this composition is 5.62 mN. As used herein, the term "critical load" is defined from the onset of catastrophic cracking, i.e., failure of the coating.

Figure 6:
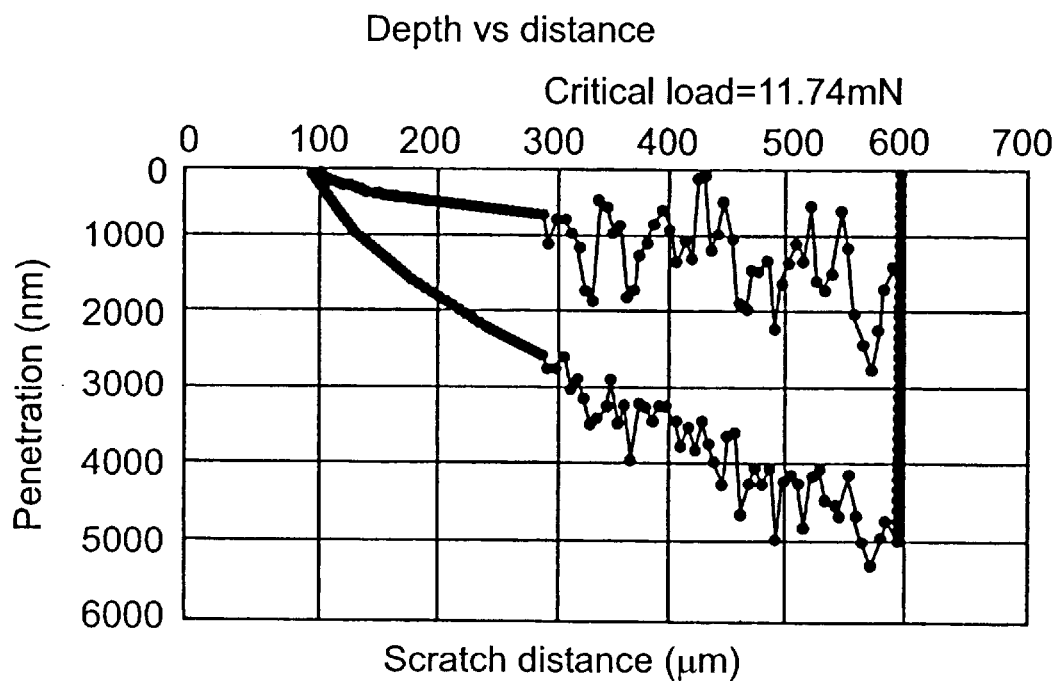
FIG. 6 is a graph of scratch depth as a function of load over a given scratch distance showing scratch (mar) resistance of a two-component coating containing colloidal silica and polysiloxane of the present invention.

FIG. 6 is a graph (scratch depth versus scratch distance) of coating surface penetration relative to load for the two-component coating of Example 24A of the present invention described above using the nano-indenter techniques described above. Critical load determined for the composition of the invention is 11.74. The coating composition of the present invention required a greater force to bring about coating failure than did the commercial control under the same test conditions.

Example 25

This example describes the preparation of a series of coating compositions of the present invention (Examples 25B–25G) which contain increasing amounts of particles in the form of colloidal silica. Comparative example 25A describes a coating composition which contains no particles. The test results in the following Table 5 illustrate the effect of silica loading on post-weathering scratch resistance properties of the cured coating compositions.

Coating Composition Without Inorganic Particles

A coating composition was prepared by mixing under mild agitation the following components: 35.9 weight percent of the acrylic polyol of Example 23C; 29.1 weight percent DESMODUR N-3300; 20 weight percent of the siloxane polyol of Example A (this amount includes the siloxane polyol incorporated in the form of the silica dispersion); 15 weight percent CYMEL 202; 3 weight percent TINUVIN 98, 0.3 weight percent polybutylacrylate flow additive, and 0.5 weight percent of the catalyst of Example 12, where weight percentages were based on weight of total resin solids of the coating composition. Particles were incorporated at levels ranging from 0 to 8.5 weight percent into the composition described immediately above in the form of the colloidal silica dispersion of Example 19.

The compositions of Examples 25A–25G were applied to test panels as described above for Example 24. The coated panels were subsequently tested for initial and post-weathering scratch resistance properties as described above. Test results are reported below in the following Table 5.

TABLE 5

| Example 25 | % Silica** | Initial Scratch Resistance 20° Gloss | | Scratch Resistance After 148 Hours QUV Exposure 20° Gloss | |
|---|---|---|---|---|---|
| | | Initial Retained | % Gloss | Initial Retained | % Gloss |
| A* | 0 | 88 | 79% | 89 | 51% |
| B | 0.25 | 88 | 89% | 86 | 90% |
| C | 0.5 | 86 | 95% | 88 | 91% |
| D | 1.0 | 86 | 95% | 87 | 93% |
| E | 2.0 | 85 | 93% | 86 | 95% |

TABLE 5-continued

| Example 25 | % Silica** | Initial Scratch Resistance 20° Gloss | | Scratch Resistance After 148 Hours QUV Exposure 20° Gloss | |
|---|---|---|---|---|---|
| | | Initial Retained | % Gloss | Initial Retained | % Gloss |
| F | 4.0 | 85 | 91% | 86 | 95% |
| G | 8.5 | 86 | 88% | 87 | 95% |

*Comparative example.
**Percent by weight based on weight of total resin solids in the composition of silica incorporated in the form of the silica dispersion of a proportionally scaled batch of Example 23C.

Figure 7:
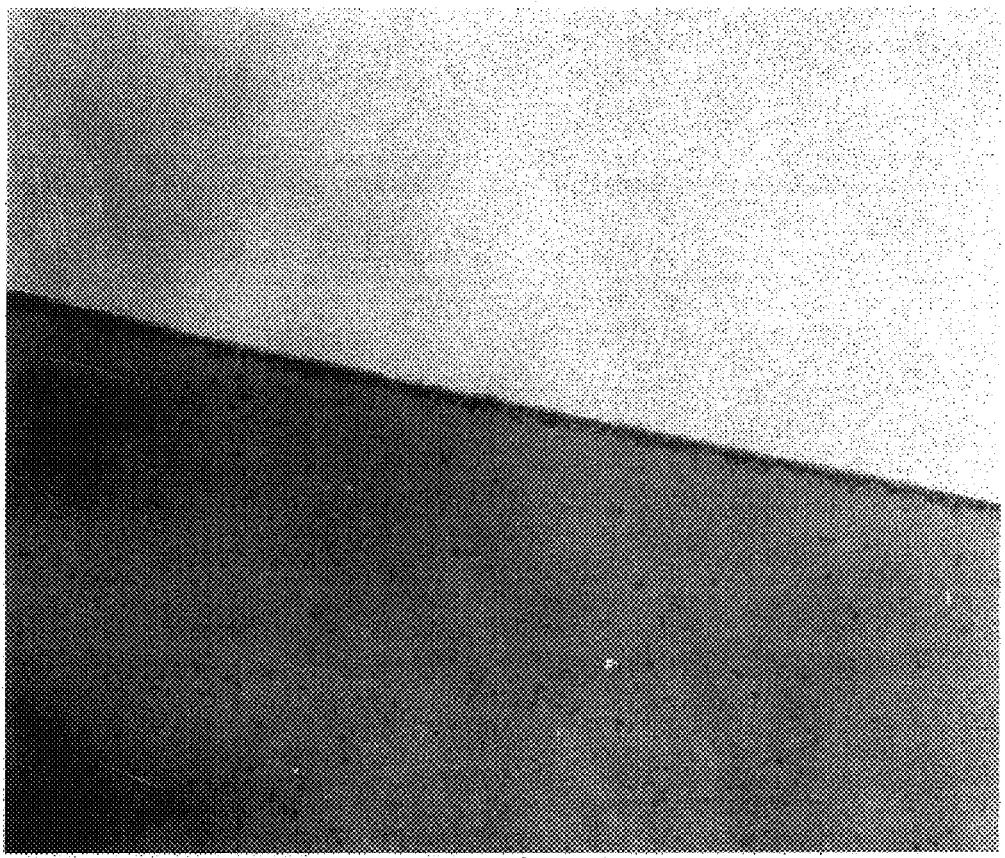
FIG. 7 is a transmission electron micrograph (105,000× magnification) of a cross-section of a cured transparent topcoating composition of the present invention, taken generally perpendicular to the surface of the coating, which included a preformed polysiloxane dispersion comprising 2% colloidal silica.
Figure 8:
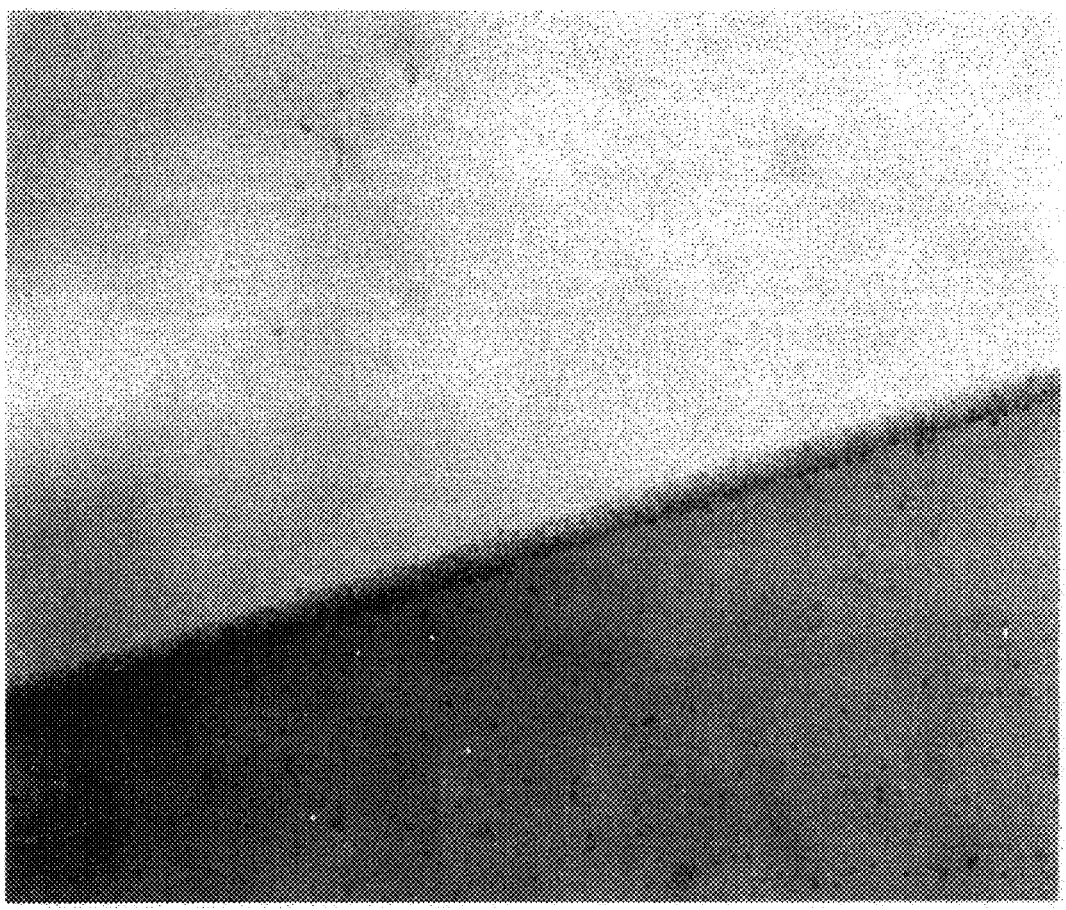
FIG. 8 is a transmission electron micrograph (105,000× magnification) of a cross-section of a cured transparent topcoating composition of the present invention, taken at an angle with respect to the surface of the coating, which included a preformed polysiloxane dispersion comprising 2% colloidal silica.
Figure 9:
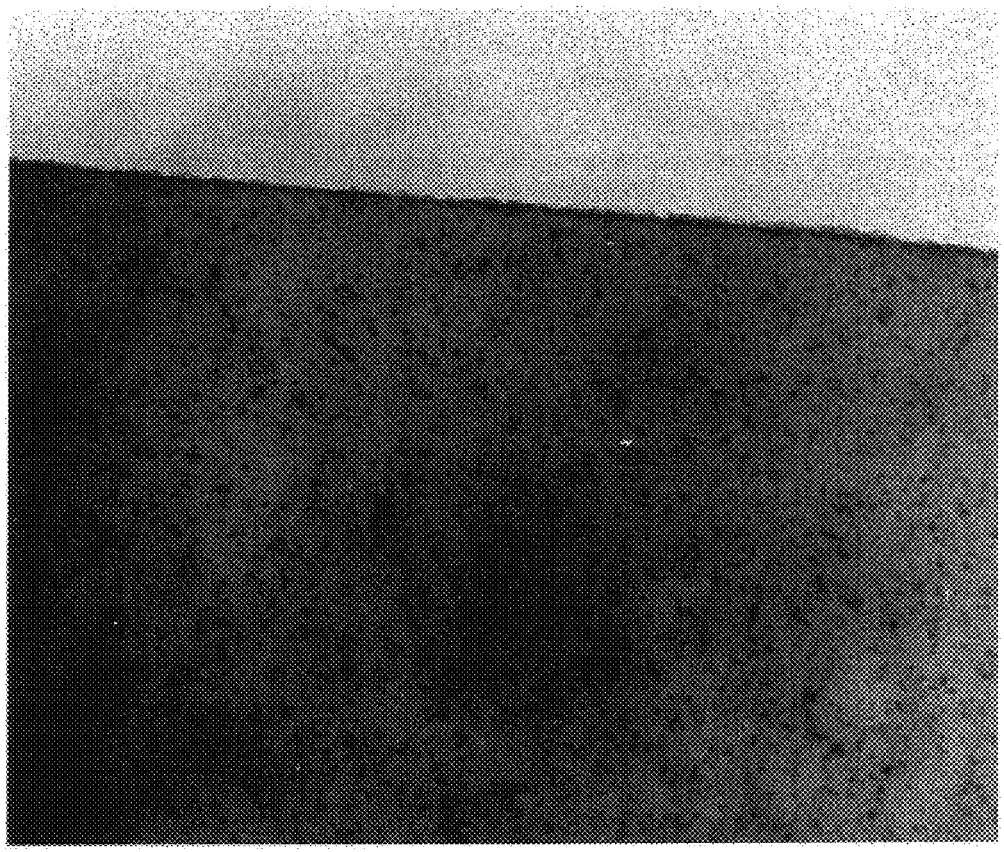
FIG. 9 is a transmission electron micrograph (105,000× magnification) of a cross-section of a cured transparent topcoating composition of the present invention, taken generally perpendicular to the surface of the coating, which included a preformed polysiloxane dispersion comprising 8.5% colloidal silica.
Figure 10:
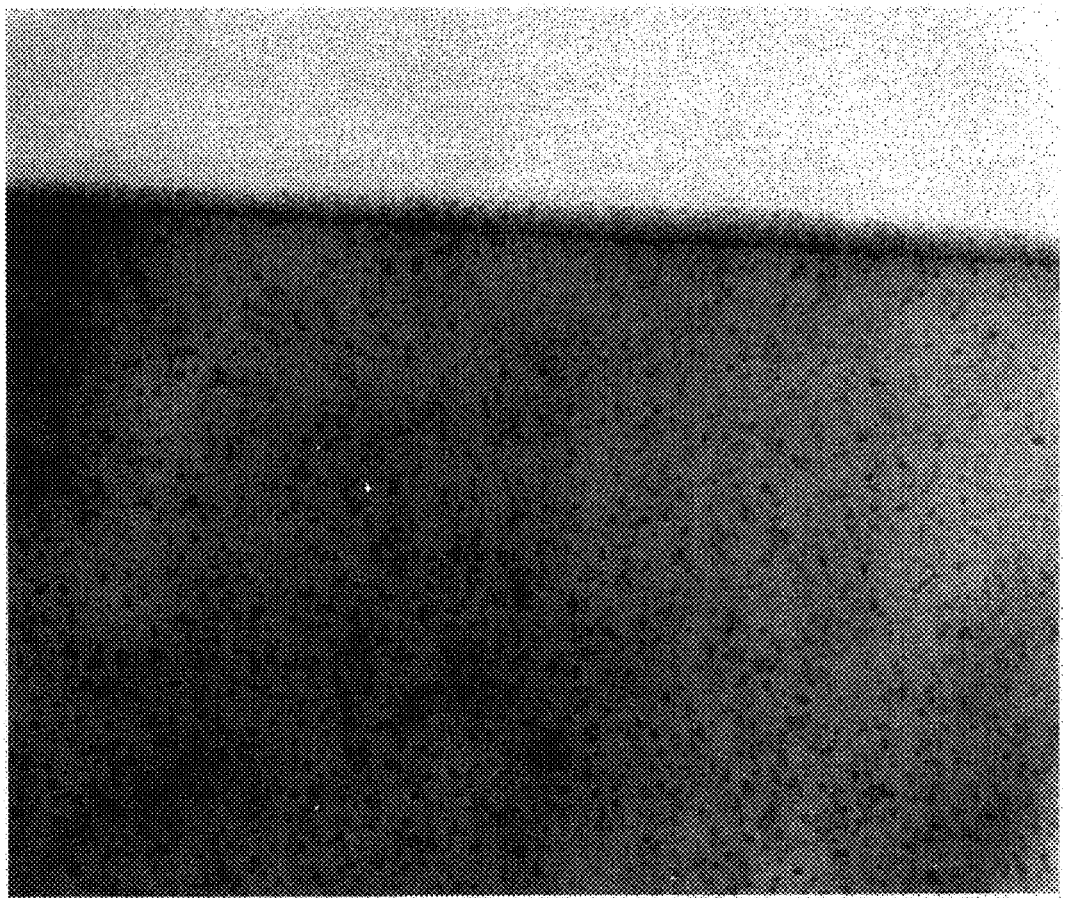
FIG. 10 is a transmission electron micrograph (105,000× magnification) of a cross-section of a cured transparent topcoating composition of the present invention, taken at an angle with respect to the surface of the coating, which included a preformed polysiloxane dispersion comprising 8.5% colloidal silica.

The test data reported above in Table 5 illustrate the significant improvement in post-weathering scratch resistance attained by incorporating even low levels (e.g. 0.25%) of silica in the coating compositions of the invention. Further, the data illustrates that initial and post-weathering scratch resistance results obtained using coating compositions having low levels of silica (i.e., 2.0% or less) are similar to those results obtained using coating compositions having higher levels of silica. FIGS. 7 and 8 are electron micrographs of a transmission electron microscopy image (105,000× magnification) of a cross-section of the coating composition according to Example 25E, and FIGS. 9 and 10 are electron micrographs of a transmission electron microscopy image (105,000× magnification) of a cross-section of the coating composition according to Example 25G.

Example 26

This example describes the preparation of several coating compositions of the present invention (Examples 26B–26D) which are in solid particulate form. The compositions of Examples 26C and 26D contain inorganic particles in the form of aluminum oxide. In the composition of Example 26C, the aluminum oxide particles have been dispersed in a surface active agent and in the composition of Example 26D, the aluminum oxide particles have been dispersed in the polysiloxane polyol of Example A. The compositions of Comparative Examples 26A and 26B each contain a surface active agent but no aluminum oxide. Each of the compositions was prepared by blending the components listed below in a Henschel Blender for 60 to 90 seconds and subsequently extruding the mixtures through a Werner & Pfeider co-rotating twin screw extruder at a screw speed of 450 rpm and an extrudate temperature of 100° C. to 125° C. (212° F. to 257° F.). Each of the extruded compositions was then ground to a particle size of 14 to 27 microns using an ACM Grinder (Air Classifying Mill from Micron Powder Systems of Summit, N.J. to form a powder coating composition. Each powder coating composition was electrostatically spray applied to test panels and evaluated for scratch resistance properties (as described below). Amounts listed below represent parts by weight.

| Ingredients | Example 26A | Example 26B | Example 26C | Example 26D |
|---|---|---|---|---|
| Epoxy functional acylic[1] | 69.05 | 69.05 | 68.98 | 49.11 |
| Dodecanedioic acid | 22.68 | 22.68 | 22.65 | 22.04 |
| Benzoin | 0.20 | 0.20 | 0.20 | 0.20 |
| WAX C MICROPOWDER[2] | 0.60 | 0.60 | 0.60 | 0.60 |
| TINUVIN 144[3] | 2.00 | 2.00 | 2.00 | 2.00 |
| CGL-1545[4] | 2.00 | 2.00 | 2.00 | 2.00 |
| HCA-1[5] | 2.00 | 2.00 | 2.00 | 2.00 |
| ARMEEN M2C[6] | 0.37 | 0.37 | 0.37 | 0.37 |
| Surface active agent A[7] | — | 1.10 | — | — |
| Surface active agent B[8] | 1.10 | — | — | — |
| Aluminum oxide dispersion A[9] | — | — | 1.20 | — |
| Aluminum oxide dispersion B[10] | — | — | — | 20.58 |
| Total | 100.00 | 100.00 | 100.00 | 100.00 |

[1]Glycidyl methacrylate functional acrylic polymer prepared as described in PCT Patent Publication WO 97/29854 and PCT patent application Ser. No. US97/16800, having a number average molecular weight ("Mn") range of 1000 to 5500; a range of glass transition temperature (Tg) of 30° C. to 60° C. as measured or 50° C. to 85° C. as calculated by the Acrylic Glass Transition Temperature Analyzer from Rohm and Haas Company, based on the Fox equation; and a range of epoxy content ranging from 35 to 85 weight percent of the monomers to prepare the epoxy acrylic polymer.
[2]A fatty acid amide (ethylene bis-stearoylamide) available from Hoechst-Celanese.
[3]2-tert-butyl-2-(4-hydroxy-3,5-di-tert-butylbenzyl)[bis(methyl-2,2,6,6,-tetramethyl-4-piperidinyl)]dipropionate, an ultraviolet light stabilizer available from Ciba-Geigy Corp.
[4]2-[4((2-Hydroxy-3-(2-ethylhexyloxy)propyl)-oxy]-2-hydroxyphenyl)-4,6-bis(2,4-dimethylphenyl)-1,3,5-triazine, an ultraviolet light stabilizer available from Ciba-Geigy Corp.
[5]Oxaphosphone oxide, an anti-yellowing agent available from Sanko Chemical Corp.
[6]Methyl dicocoamine available from Akzo Nobel Corp.
[7]Prepared by solution polymerization in xylene of the following monomers: 73.5% 2-ethyl hexyl acrylate, 23.5% ethyl acrylate and 3% methacrylic acid. Polymerization was carried out at reflux temperature in the presence of di-t-amyl peroxide and t-butyl peracetate. The surface active agent was then vacuum stripped to 100% resin solids.
[8]Prepared by solution polymerization in xylene and toluene of the following monomers: 81.2% 2-ethyl hexyl acrylate, 11.8% hydroxy ethyl acrylate and 7% N,N-dimethylaminoethyl methacrylate. Polymerization was carried out at reflux temperature in the presence of VAZO 67 (2,2=-Azobis-(2-methylbutyronitrile)). The surface active agent was then vacuum stripped to 100% resin solids.
[9]Fumed aluminum oxide (available as ALUMINUM OXIDE C from Degussa-Huls Corporation) dispersed 10% in the surface active agent A described above.
[10]Fumed aluminum oxide (described above) dispersed in the polysiloxane polyol of Example A, then blended in the glycidyl methacrylate functional acrylic described above (87.5% acrylic/2.43% aluminum oxide/10.07 siloxane polyol).

The powder coating compositions of Examples 26A–26D were electrostatically spray applied to test panels which were previously coated with an electrodepositable primer (commercially available as ED5051 from PPG Industries, Inc. of Pittsburgh, Pa.). The powder coating compositions were applied at film-thickness of 2.3 to 2.8 mils (58 to 71 micrometers) and cured for a period of 30 minutes at a temperature of 293° F. (145° C.). The resulting coated panels were evaluated for initial 20° gloss as described above. The coated panels were then tested for scratch (mar) resistance properties using an Atlas Mar Tester and the following procedure. Using a felt cloth clamped to the acrylic finger on the arm of the instrument, a set of ten double rubs was run on each coated panel to which BON AMI cleanser had been applied. Each of the tested panels was washed with cool tap water and thoroughly dried. The marred surface of each tested panel was then re-evaluated for 20° gloss. Scratch (mar) resistance test results are expressed as the percentage of the 20° gloss retained after the surface is marred. That is, Scratch (mar) Resistance=(Marred 20° gloss/Initial 20° gloss)×100. The test data presented below in the following Table 6 is reported in comparative form, i.e., the results for Examples 26B to 26D are compared with test results for the control composition of Example 26A. A "+" indicates an improvement in scratch (mar) resistance properties over the control composition.

TABLE 6

| | Scratch (mar) Resistance Rating |
|---|---|
| Comparative Example A | Control |
| Example B | + |
| Example C | ++ |
| Example D | 0 |

The mar resistance testing data presented in Table 6 illustrate the improvement in scratch (mar) resistance provided by the inclusion in powder coating compositions of particles in the form of aluminum oxide particles.

Example 27

A coating composition of the present invention was prepared from a mixture of the following ingredients:

| Ingredients | Resin Solids (%) | Total Weight (Grams |
|---|---|---|
| Methyl Amyl Ketone | — | 45.0 |
| Tinuvin 928 | 3.0 | 3.0 |
| Silica dispersion of Example 23C | 4.67 | 8.8 |
| Polysiloxane polyol of Example A | 10.33 | 10.33 |
| Cymel 202 | 15.0 | 18.75 |
| Acrylic polyol of Example 23C | 43.10 | 69.68 |
| Tinuvin 292 | 0.5 | 0.5 |
| Catalyst of Example 12 | 0.5 | 0.67 |
| DESMODUR N3300 | 23.4 | 23.4 |
| DESMODUR Z4470 | 3.5 | 5.0 |

A basecoat, Azuritblau, available from PPG (B&K) Germany was applied to primed steel automotive substrate. The basecoat was built to a film thickness ranging from between 12 and 15 microns, followed by a five minute heated flash at 80° C. before application of the coating composition of Example 27. The coating composition of Example 27 was spray-applied wet-on-wet to the basecoat to build a film thickness of the clearcoat ranging from between 35 and 45 microns. The coating was then cured 30 minutes at 130° C.

Example 28

Silylated compounds for use in the coating compositions disclosed below were prepared as follows:

Silylated Compound Resin A

This example illustrates the preparation of a silylated compound that is a half-acid ester of methyl hexahydrophthalic anhydride and trimethylolpropane with residual carboxyl groups reacted with propylene oxide.

A reaction vessel equipped with stirrer, thermocouple, temperature control, pumps and fitted with valved ports was charged with 1202.9 grams trimethylolpropane (commercially available from Bayer USA), 14.4 grams of triphenyl phosphine (commercially available from Aldrich®), 12.1 grams of triisooctyl phosphite (commercially available from GE Specialty Chemicals), and 800.0 grams of n-butyl acetate (commercially available from Union Carbide Chemicals and Plastics Co., Inc.).

The reactor was heated to 115° C. and 4436.7 grams of methylhexahydrophthalic anhydride (commercially available from Milliken Chemical) were added over 90 minutes, and then held 4 hours at 115° C. 1533.4 grams of propylene oxide (commercially available from Fisher Scientific Company) was charged to the reactor over 1 hour. The reaction was held 4 hours until the acid value was less 5.38 mg KOH/gram. Residual propylene oxide was removed by vacuum distilling at 60 to 80 mm Hg at 96° C. max. The resultant product had a total solids content of 95.25%.

This product was silylated by the following procedure: 637.6 grams (95.25% solids) of the previously described material were charged to a reaction flask equipped with an overhead stirrer, nitrogen inlet, thermocouple, addition funnel, and condenser. The temperature was increased to 110° C. for one hour with nitrogen sparge to ensure that the system was dry. The temperature was then decreased to 85° C. under nitrogen blanket, at which time 180.9 grams hexamethyldisilazane (commercially available from Aldrich®) were added drop-wise over a 30 minute period. The reaction was allowed to continue one additional hour, at which time a nitrogen sparge was introduced. The reaction was considered complete when the size of the IR peak corresponding to the hydroxyl moiety was negligible. The solution was allowed to continue stirring under nitrogen sparge at 85° C. until the ammonia (by-product) was removed. Theoretical resin solids content was 96.3%.

Silylated Compound Resin B

This example illustrates the preparation of a silylated compound that is a half-acid ester of methyl hexahydrophthalic anhydride and trimethylolpropane with residual carboxyl groups reacted with propylene oxide.

A reaction vessel equipped with stirrer, thermocouple, temperature control, pumps and fitted with valved ports was charged with 550.0 grams trimethylolpropane (commercially available from Bayer USA), 6.8 grams of triphenyl phosphine (commercially available from Aldrich®), 5.57 grams of triisooctyl phosphite (commercially available from GE Specialty Chemicals), and 205.7 grams of n-butyl acetate (commercially available from Union Carbide Chemicals and Plastics Co., Inc.). The reaction was heated to 115° C. 2030 grams of methylhexylhydrophthalic anhydride (commercially available from Milliken Chemical) was added over 90 minutes. The reaction was held 4 hours at 115° C. The reactor was cooled to 100° C. and 769.9 grams of propylene oxide (commercially available from Fisher Scientific Company) was added over 1 hour. The reaction was held 5 hours at 100° C. until the acid value was 3.1 mg KOH/gram. Residual propylene oxide was removed by vacuum distilling at 60 to 80 mm Hg at 70C. The resultant product had a total solids content of 95.08%. The product was thinned to 80.0% solids with butyl acetate.

This product was silylated by the following procedure: 3449.3 grams (80.0% solids) of the previously described material were charged to a reaction flask equipped with an overhead stirrer, nitrogen inlet, thermocouple, addition funnel, and condenser. The temperature was increased to 110° C. for one hour with nitrogen sparge to ensure that the system was dry. The temperature was then decreased to 85° C. under nitrogen blanket, at which time 821.9 grams hexamethyldisilazane (commercially available from Aldrich®) were added drop-wise over a one hour period. The reaction was allowed to continue 15 additional hours, at which time a nitrogen sparge was introduced. The reaction was considered complete when the size of the IR peak corresponding to the hydroxyl moiety was negligible. The solution was allowed to continue stirring under nitrogen sparge at 85° C. until the ammonia (by-product) was removed. Theoretical resin solids content was 96.3%.

A silica dispersion, polysiloxane polyol and composition pre-mixtures for use in the coating compositions disclosed below were prepared as follows:

Silica Dispersion

The colloidal silica dispersion was prepared from a proportionaly scaled batch of the silica dispersion of Example 23C.

Polysiloxane Polyol

The polysiloxane polyol was a product of the hydrosilylation of a reactive silicone fluid with an approximate degree of polymerization of 3 to 7, i.e., (Si—O)$_3$ to (Si—O)$_7$. The polysiloxane polyol was prepared from a proportionately scaled-up batch of the following mixture of ingredients in the ratios indicated:

| Ingredients | Equivalent Weight | Equivalents | Parts By Weight (kilograms) |
|---|---|---|---|
| Charge I: | | | |
| Trimethylolpropane monoallyl ether | 174.0 | 756.0 | 131.54 |
| Charge II: | | | |
| MASILWAX BASE[1] | 156.7[2] | 594.8 | 93.21 |
| Charge III: | | | |
| Chloroplatinic acid | | 10 ppm | |
| Toluene | | | 0.23 |
| Isopropanol | | | 0.07 |

[1]Polysiloxane-containing silicon hydride, commercially available from BASF Corporation.
[2]Equivalent weight based on mercuric bichloride determination.

To a suitable reaction vessel equipped with a means for maintaining a nitrogen blanket, Charge I and an amount of sodium bicarbonate equivalent to 20 to 25 ppm of total monomer solids was added at ambient conditions and the temperature was gradually increased to 75° C. under a nitrogen blanket. At that temperature, 5.0% of Charge II was added under agitation, followed by the addition of Charge II, equivalent to 10 ppm of active platinum based on total monomer solids. The reaction was then allowed to exotherm to 95° C. at which time the remainder of Charge II was added at a rate such that the temperature did not exceed 95° C. After completion of this addition, the reaction temperature was maintained at 95° C. and monitored by infrared spectroscopy for disappearance of the silicon hydride absorption band (Si—H, 2150 cm$^{-1}$).

Composition Pre-Mixtures

The following pre-mixtures of selected components of the coating compositions discussed below were prepared by sequentially mixing each of the components with agitation.

| Ingredient | Total weight (grams) | Solid weight (grams) |
|---|---|---|
| Pre-Mix 1: | | |
| Methyl n-amyl ketone | 18.0 | — |
| Butyl Cellosolve ® acetate[1] | 18.0 | — |
| Butyl Carbitol ® acetate[2] | 4.0 | — |
| TINUVIN 384[3] | 1.58 | 1.50 |
| TINUVIN 400[4] | 1.76 | 1.50 |
| TINUVIN 292[5] | 0.40 | 0.40 |
| Silica Dispersion from above | 13.2 | 10.0 |
| RESIMENE 757[6] | 27.1 | 26.3 |
| LUWIPAL 018[7] | 11.9 | 8.7 |

[1]2-Butoxyethyl acetate solvent is commercially available from Union Carbide Corp.
[2]2-(2-Butoxyethoxy) ethyl acetate is commercially available from Union Carbide Corp.
[3]Substituted benzotriazole UV light stabilizer commercially available from Ciba Specialty Chemicals Corp.
[4]Substituted triazine UV light stabilizer commercially available from Ciba Specialty Chemicals Corp.
[5]Sterically hindered amine light stabilizer commercially available from Ciba Specialty Chemicals Corp.
[6]Methylated and butylated melamine-formaldehyde resin available from Solutia Inc.
[7]High imino, butylated melamine formaldehyde resin commercially available from BASF Corp.

Pre-Mix 2:

| Ingredient | Total weight (grams) | Solid weight (grams) |
|---|---|---|
| Carbamoylated acrylic[1] | 79.4 | 50.0 |
| Carbamoylated polyester[2] | 69.4 | 50.0 |

[1](58% butyl methacrylate/40% hydroxypropyl acrylate/2% methyl styrene dimer) 64% solids in a solvent blend of (50% DOWANOL PM/50% propanoic acid, 3-ethoxy ethyl ester) 75% carbamoylated with methyl carbamate.
[2](10.6% trimethylol propane/22.7% 2,2,4-trimethyl-1,3-pentanediol/17.5% neopentyl glycol/49.2% hexahydrophthalic anhydride) 69% solids in a solvent blend of (44% DOWANOL PM/56% DOWANOL PM Acetate) 75% carbamoylated with methyl carbamate.

Pre-Mix 3:

| Ingredient | Total weight (grams) | Solid weight (grams) |
|---|---|---|
| Methyl n-amyl ketone | 5.4 | — |
| Butyl Cellosolve ® acetate[1] | 10.8 | — |
| Butyl Carbitol ® acetate[2] | 1.8 | — |
| TINUVIN ® 928[3] | 3.00 | 3.00 |
| TINUVIN ® 292[4] | 0.40 | 0.40 |
| TINUVIN ® 123[5] | 0.60 | 0.60 |
| CYMEL ® 1130[6] | 29.9 | 29.9 |
| RESIMENE ® 741[7] | 11.3 | 9.9 |

[1]2-Butoxyethyl acetate solvent is commercially available from Union Carbide Corp.
[2]2-(2-Butoxyethoxy) ethyl acetate is commercially available from Union Carbide Corp.
[3]2-(2H-Benzotriazol-2yl)-6-(1-methyl-1-phenylethyl)-4-(1,1,3,3-tetramethylbutyl)phenol UV absorber available from Ciba Specialty Chemicals Corp.
[4]Sterically hindered amine light stabilizer commercially available from Ciba Specialty Chemicals Corp.
[5]Bis-(1-octyloxy-2,2,6,6-tetramethyl-4-piperidinyl) sebacate hindered aminoether light stabilizer available from Ciba Specialty Chemicals Corp.
[6]Methylated and butylated melamine-formaldehyde resin available from Cytec Industries, Inc.
[7]Methylated melamine-formaldehyde resin available from Solutia Inc.

Pre-Mix 4:

| Ingredient | Total weight (grams) | Solid weight (grams) |
|---|---|---|
| Methyl n-amyl ketone | 7.5 | — |
| Butyl Cellosolve ® acetate[1] | 15.0 | — |
| Butyl Carbitol ® acetate[2] | 2.50 | — |
| TINUVIN ® 928[3] | 3.00 | 3.00 |
| TINUVIN ® 292[4] | 0.40 | 0.40 |
| TINUVIN ® 123[5] | 0.60 | 0.60 |
| Silica Dispersion from above | 26.4 | 20.0 |
| Polysiloxane polyol from above | 1.00 | 1.00 |

-continued

| Ingredient | Total weight (grams) | Solid weight (grams) |
|---|---|---|
| CYMEL ® 1130[6] | 29.9 | 29.9 |
| RESIMENE ® 741[7] | 11.3 | 9.9 |

[1]2-Butoxyethyl acetate solvent is commercially available from Union Carbide Corp.
[2]2-(2-Butoxyethoxy) ethyl acetate is commercially available from Union Carbide Corp.
[3]2-(2H-Benzotriazol-2yl)-6-(1-methyl-1-phenylethyl)-4-(1,1,3,3-tetramethylbutyl)phenol UV absorber available from Ciba Specialty Chemicals Corp.
[4]Sterically hindered amine light stabilizer commercially available from Ciba Specialty Chemicals Corp.
[5]Bis-(1-octyloxy-2,2,6,6-tetramethyl-4-piperidinyl) sebacate hindered aminoether light stabilizer available from Ciba Specialty Chemicals Corp.
[6]Methylated and butylated melamine-formaldehyde resin available from Cytec Industries, Inc.
[7]Methylated melamine-formaldehyde resin available from Solutia Inc.

The pre-mixtures of ingredients from Pre-Mixes 1, 2, 3 and 4 were used in Coating Compositions 5–16. The components for forming Coating Compositions 5–16 are listed below in Tables 7–9. The amounts listed are the total parts by weight in grams and the amount within parenthesis are percentages by weight based on the weight of the resin solids of the components which form the composition. Each component was mixed sequentially with agitation.

Example 28

Silylated compounds for use in the coating compositions disclosed below were prepared as follows:

Silylated Compound A

This example illustrates the preparation of a silylated compound that is a half-acid ester of methyl hexahydrophthalic anhydride and trimethylolpropane with residual carboxyl groups reacted with propylene oxide.

A reaction vessel equipped with stirrer, thermocouple, temperature control, pumps and fitted with valved ports was charged with 1202.9 grams trimethylolpropane (commercially available from Bayer USA), 14.4 grams of triphenyl phosphine (commercially available from Aldrich®), 12.1 grams of triisooctyl phosphite (commercially available from GE Specialty Chemicals), and 800.0 grams of n-butyl acetate (commercially available from Union Carbide Chemicals and Plastics Co., Inc.).

The reactor was heated to 115° C. and 4436.7 grams of methylhexahydrophthalic anhydride (commercially available from Milliken Chemical) were added over 90 minutes, and then held 4 hours at 115° C. 1533.4 grams of propylene oxide (commercially available from Fisher Scientific Company) was charged to the reactor over 1 hour. The reaction was held 4 hours until the acid value was less 5.38 mg KOH/gram. Residual propylene oxide was removed by vacuum distilling at 60 to 80 mm Hg at 96° C. max. The resultant product had a total solids content of 95.25%.

This product was silylated by the following procedure: 637.6 grams (95.25% solids) of the previously described material were charged to a reaction flask equipped with an overhead stirrer, nitrogen inlet, thermocouple, addition funnel, and condenser. The temperature was increased to 110° C. for one hour with nitrogen sparge to ensure that the system was dry. The temperature was then decreased to 85° C. under nitrogen blanket, at which time 180.9 grams hexamethyldisilazane (commercially available from Aldrich®) were added drop-wise over a 30 minute period. The reaction was allowed to continue one additional hour, at which time a nitrogen sparge was introduced. The reaction was considered complete when the size of the IR peak corresponding to the hydroxyl moiety was negligible. The solution was allowed to continue stirring under nitrogen sparge at 85° C. until the ammonia (by-product) was removed. Theoretical resin solids content was 96.3%.

Silylated Compound B

This example illustrates the preparation of a silylated compound that is a half-acid ester of methyl hexahydrophthalic anhydride and trimethylolpropane with residual carboxyl groups reacted with propylene oxide.

A reaction vessel equipped with stirrer, thermocouple, temperature control, pumps and fitted with valved ports was charged with 550.0 grams trimethylolpropane (commercially available from Bayer USA), 6.8 grams of triphenyl phosphine (commercially available from Aldrich®), 5.57 grams of triisooctyl phosphite (commercially available from GE Specialty Chemicals), and 205.7 grams of n-butyl acetate (commercially available from Union Carbide Chemicals and Plastics Co., Inc.). The reaction was heated to 115° C. 2030 grams of methylhexylhydrophthalic anhydride (commercially available from Milliken Chemical) was added over 90 minutes. The reaction was held 4 hours at 115° C. The reactor was cooled to 100° C. and 769.9 grams of propylene oxide (commercially available from Fisher Scientific Company) was added over 1 hour. The reaction was held 5 hours at 100° C. until the acid value was 3.1 mg KOH/gram. Residual propylene oxide was removed by vacuum distilling at 60 to 80 mm Hg at 70° C. The resultant product had a total solids content of 95.08%. The product was thinned to 80.0% solids with butyl acetate.

This product was silylated by the following procedure: 3449.3 grams (80.0% solids) of the previously described material were charged to a reaction

TABLE 9

| | COATING COMPOSITION | | |
|---|---|---|---|
| Ingredient | 14 | 15 | 16 |
| Pre-mix 4 | 97.6 (64.8) | 97.6 (64.8) | 97.6 (64.8) |
| Pre-mix 2 | — | 33.6 (22.6) | 16.8 (11.3) |
| Resin B | 53.8 (45.2) | 26.9 (22.6) | 40.4 (33.9) |
| Polybutyl acrylate[1] | 0.67 (0.40) | 0.67 (0.40) | 0.67 (0.40) |
| Acid catalysts[2] | 1.43 (1.00) | 1.43 (1.00) | 1.43 (1.00) |
| Reduction Information: | | | |
| Methyl n-amyl ketone | 0.62 | 2.7 | 1.48 |
| Butyl Cellosolve ® acetate[3] | 1.25 | 5.4 | 2.95 |
| Butyl Carbitol ® acetate[4] | 0.21 | 0.90 | 0.49 |
| Spray viscosity[5] (sec) | 27 | 28 | 28 |

TABLE 9-continued

| | COATING COMPOSITION | | |
|---|---|---|---|
| Ingredient | 14 | 15 | 16 |
| Paint temperature (° F.) | 74 | 74 | 74 |
| 230° F. (110° C.) % Solids[6] | 66 | 63 | 63 |

[1]A flow control agent having a Mw of 6700 and a Mn of 2600 made in xylene at 60% solids available from DuPont.
[2]Dodecyl benzene sulfonic acid solution available from Chemcentral.
[3]2-Butoxyethyl acetate solvent is commercially available from Union Carbide Corp.
[4]2-(2-Butoxyethoxy) ethyl acetate is commercially available from Union Carbide Corp.
[5]Viscosity measured in seconds with a #4 FORD efflux cup at ambient temperature.
[6]% Solids of a coating is determined by taking a specific quantity of the coating and adding it into a tarred aluminum dish and recording the coating weight. Three milliliters of xylene is added into the aluminum dish to dissolve and/or disperse the coating. The coating is then heated in an oven for sixty minutes at 230° F. (110° C.). After removal from the oven, the aluminum dish is cooled, re-weighed, and the non-volatile content (weight percent solids) is calculated using the following equation: % Solids = (F - T) ÷ (I - T) * 100. Where: F = Final weight of remaining coating and aluminum dish in grams, I = Initial weight of coating and aluminum dish in grams, T = Tare weight of the aluminum dish in grams, and 100 is the conversion factor to percentage.

Testing

Coating Compositions 1–12 were spray applied over a pigmented basecoat to form color-plus-clear composite coatings over primed electrocoated steel panels. The panels used were cold rolled steel panels (size 4 inches×12 inches (10.16 cm by 30.48 cm)) coated with ED5100 electrocoat and PCV70100M primer, both available from PPG Industries, Inc. The test panels are available as APR30471 from ACT Laboratories, Inc. of Hillsdale, Mich.

Coating Compositions 1–5 were tested over two different basecoats, namely: HWB9517, a black pigmented water-based acrylic/melamine basecoat commercially available from PPG Industries, Inc, and a black pigmented water-based acrylic/melamine basecoat (Basecoat X), the formulation for which is given below. Coating Compositions 6–12 were evaluated over Basecoat X.

Basecoat X

| Ingredient | Parts by weight (grams) | Solid weights (grams) |
|---|---|---|
| Hexyl Cellosolve ®[1] | 20.0 | — |
| 2-Butoxyethanol | 20.0 | — |
| Phosphatized Epoxy[2] | 1.00 | 0.60 |
| TINUVIN 1130[3] | 3.00 | 3.00 |
| CYMEL 1156[4] | 25.0 | 25.0 |
| VISCOLAM 330[5] | 3.33 | 1.00 |
| Deionized Water | 100.0 | — |
| Odorless Mineral Spirits[6] | 20.0 | — |
| BYK-032[7] | 3.90 | 2.00 |
| Acrylic Latex[8] | 125.3 | 51.5 |
| SETALUX 6802 AQ-24[9] | 61.2 | 15.0 |
| Amine[10] | 3.00 | — |
| Black tint paste[11] | 47.6 | 11.5 |

[1]Ethylene glycol monohexyl ether solvent commercially available from Union Carbide Corp.
[2]Phosphatized epoxy prepared from EPON 828, a polyglycidyl ether of Bisphenol A available from Shell Oil and Chemical Co.; reacted with phosphoric acid in an 83:17 weight ratio.
[3]Substituted hydroxyphenyl benzotriazole available from Ciba Specialty Chemicals Corp.
[4]Methylated melamine formaldehyde resin available from Cytec Industries, Inc.
[5]Acrylic thickener available from Lamberti in Italy.
[6]Solvent available from Shell Chemical Co.
[7]Defoamer available from Byk Chemie.
[8]The Acrylic Latex was prepared as follows:
The polyester was prepared in a four-neck round bottom flask equipped with a thermometer, mechanical stirrer, condenser, dry nitrogen sparge, and a heating mantle. The following ingredients were used:
  1103.0 g  isostearic acid
   800.0 g  pentaerythritol
   470.0 g  crotonic acid
   688.0 g  phthalic anhydride
     6.1 g  dibutyltin oxide
     6.1 g  triphenyl phosphite
  1170.0 g  butyl acrylate
     4.0 g  Ionol (butylated hydroxytoluene)
The first six ingredients were stirred in the flask at 210° C. until 245 ml of distillate was collected and the acid value dropped to 46. The material was cooled to 77° C. and the last two ingredients were stirred in. The final product was a viscous yellow liquid with a hydroxyl value of 54.0, a Gardner-Holdt viscosity of Z+, a weight average molecular weight of 45,600, and a non-volatile content of 70.2%. A pre-emulsion was prepared by stirring together the following ingredients:
   286.0 g  polyester of example III
   664.0 g  butyl acrylate
    30.0 g  ethylene glycol dimethacrylate
    20.0 g  acrylic acid
    46.4 g  dodecylbenzenesulfonic acid (70% in isopropanol)
    14.3 g  dimethylethanolamine
  1000.0 g  water
The reaction was carried out using the same procedure and materials as in Latex Example I. The reaction exothermed from 23° C. to 80° C. The final pH of the latex was 6.1, the nonvolatile content was 42.4% the particle size was 105 nm, and the Brookfield viscosity was 14 cps (spindle #1, 50 rpm).
[9]Rheology control agent available from Akzo Nobel.
[10]Dimethylethanolamine, 50% Aqueous, available from Union Carbide Corp.
[11]Black pigment available from Cabot Corp. as MONARCH BLACK 1300 dispersed in an acrylic grind vehicle (35% butyl acrylate, 30% styrene, 18% butyl methacrylate, 8.5% 2-hydroethyl acrylate, 8.5% acrylic acid) at a total pigment to binder ration (P/B) of 0.35.

Two coats of basecoat were automated spray applied to the electrocoated and primed steel panels at ambient temperature (70° F. (21° C.)). No flash was permitted between the application of the two basecoat layers. The total dry film thickness of the basecoat ranged from 0.5 to 0.7 mils (13 to 17 micrometers) was targeted. After the second basecoat application, a 1 to 10 minute air flash at ambient temperature was given before force flashing the basecoated panels. For panels basecoated with HWB9517, the force flash was ten minutes at 200° F. (93° C.). The panels basecoated with Basecoat X were forced flashed for five minutes at 200° F. (93° C.). Coating Compositions 1–12 were each automated spray applied to a basecoated panel at ambient temperature in two coats with a ninety second ambient flash between applications. Total clearcoat was applied at a 1.6 to 1.8 mils (41 to 46 micrometers) dry film thickness. All coatings were allowed to air flash at ambient temperature for ten minutes. Panels prepared from each coating were baked for thirty minutes at 285° F. (141° C.) to fully cure the coating(s). The panels were baked in a horizontal position.

To test recoat adhesion, each panel was coated with another layer of basecoat and clearcoat or clearcoat only, as specified below. Examples 1–5 were recoated with HWB9517 or Basecoat X and Coating Compositions 1–5, depending on the respective original panel. Examples 6–12 were recoated with Basecoat X and Coating Compositions 6–12, depending on the respective original panel. For example, Coating Composition 5 over HWB9517 original (prepared above) was recoated with HWB9517 and Coating Composition 5 clearcoat. Half of an original panel from Examples 1–12 was basecoated and clearcoated and the other half of the panel was clearcoated only. To recoat the panels, the bottom halves of the original panels were covered with aluminum foil and then the respective basecoats were automated spray applied as described above. The foil was removed, resulting in an original panel with the upper half coated in basecoat and the bottom half still with only the original coating layers. The panels were force flashed as described above. The respective clearcoat was then automated spray applied to the entire panel as described above. The resulting panels were half coated in basecoat/clearcoat from the original spray application and another layer of basecoat/clearcoat from the recoat spray application (B/C//B/C). The other half of the resulting panel was coated in basecoat/clearcoat from the original spray application and another layer of clearcoat from the recoat spray application (B/C//C).

Properties for the coatings are reported below in Table 10 for Examples 1–5 over HWB9517 basecoat and Table 11 for Examples 1–12 over Basecoat X.

TABLE 10

| | Initial | % 20° Gloss Retained after scratch testing[2] | | Knoop | Recoat Adhesion[5] | |
| --- | --- | --- | --- | --- | --- | --- |
| | | | Post weathering[3] | | | |
| Example # | 20° Gloss[1] | Initial | 286 Hours | 618 Hours | Hardness[4] | B/C//B/C | B/C//C |
| 1 | 85 | 79 | 82 | 84 | 10.3 | 0 | 0 |
| 2 | 85 | 18 | 25 | 58 | 4.0 | 0 | 0 |
| 3 | 84 | 1 | 5 | 8 | <2.0 | 0 | 4+ |
| 4 | 84 | 6 | 14 | 20 | <2.0 | 0 | 4 |
| 5 | 83 | 1 | 13 | 18 | <2.0 | 0 | 4 |

TABLE 11

| | Initial | % 20° Gloss Retained after scratch testing[2] | | Knoop | Recoat Adhesions[5] | |
| --- | --- | --- | --- | --- | --- | --- |
| | | | Post weathering[3] | | | |
| Example # | 20° Gloss[1] | Initial | 286 Hours | 618 Hours | Hardness[4] | B/C//B/C | B/C//C |
| 1 | 87 | 91 | 84 | 71 | 12.7 | 0 | 0 |
| 2 | 87 | 78 | 80 | 64 | 9.9 | 4+ | 0 |
| 3 | 87 | 27 | 20 | 20 | 13.8 | 5 | 4+ |
| 4 | 88 | 81 | 28 | 26 | 11.5 | 4+ | 4 |
| 5 | 88 | 71 | 53 | 44 | 9.9 | 4+ | 4 |
| 6 | 87 | 91 | — | — | 10.9 | 1 | 0 |
| 7 | 86 | 67 | — | — | 7.7 | 4+ | 0 |
| 8 | 87 | 67 | — | — | 8.1 | 4+ | 0 |
| 9 | 85 | 91 | — | — | 10.4 | 4 | 0 |
| 10 | 87 | 49 | — | — | 5.8 | 4+ | 4+ |
| 11 | 85 | 67 | — | — | 6.7 | 4 | 1+ |
| 12 | 87 | 59 | — | — | 6.6 | 4+ | 3+ |

[1]20° gloss was measured with a Statistical Novo-Gloss 20° gloss meter, available from Paul N. Gardner Company, Inc.
[2]Coated panels were subjected to scratch testing by linearly scratching the coated surface with a weighted abrasive paper for ten double rubs using an Atlas AATCC Scratch Tester, Model CM-5, available from Atlas Electrical Devices Company of Chicago, Illinois. The abrasive paper used was 3M 281Q WETORDRY ™ PRODUCTION ™ 9 micron polishing paper sheets, which are commercially available from 3M Company of St. Paul, Minnesota. Panels were then rinsed with tap water and carefully patted dry with a paper towel. The 20° gloss was measured (using the same gloss meter as that used for the initial 20° gloss) on the scratched area of each test panel. Using the lowest 20° gloss reading from the scratched area, the scratch results are reported as the percent of the initial gloss retained after scratch testing using the following calculation: 100% * scratched gloss ÷ initial gloss. Higher values for percent of gloss retained are desirable.
[3]Post-weathering scratch resistance (retained scratch resistance) was measured using the scratch test method described above after the unscratched test panels were subjected to simulated weathering by exposure to UVA-340 bulbs in a QUV Accelerated Weathering Tester available through Q Panel Lab Products. Testing was as follows: a cycle of 70° C. for 8 hours exposure to UVA followed by a condensation cycle at 50° C. for 4 hours with no UVA (total test time is reported in the table). Using the lowest 20° gloss reading from the scratched area, the scratch results are reported as the percent of the initial gloss retained after post-weathering scratch testing using the following calculation: 100% * post-weathering scratched gloss ÷ initial gloss. Higher values for percent of gloss retained are desirable.

TABLE 11-continued

| | | % 20° Gloss Retained after scratch testing[2] | | | | Recoat Adhesions[5] | |
|---|---|---|---|---|---|---|---|
| | Initial | Post weathering[3] | | Knoop | | | |
| Example # | 20° Gloss[1] | Initial | 286 Hours | 618 Hours | Hardness[4] | B/C//B/C | B/C//C |

[4]Knoop hardness is a hardness measurement derived from the size of an indentation in the coating made using the Tukon Microhardness Instrument. The Tukon Microhardness Instrument makes an indentation in a cured coating by applying a 25 gram load to the surface with a diamond tip. The size of the indentation is measured using a microscope. That indentation size is then converted to the Knoop Hardness measurement. The Tukon Microhardness Instrument used was the Tukon Microhardness Tester Model 300 manufactured by Wilson Instruments, Division of Instron Corporation.
[5]Recoat adhesion tests the adhesion of the recoat layer (either basecoat/clearcoat or clearcoat only) to the original layers (steel/electrodeposition/primer/basecoat/clearcoat) to simulate repair coatings. An eleven-blade claw with 1.5 mm spaced teeth (blade and handle/blade holder are available from Paul N. Gardner Company, Inc.) was used to scribe the cured coating.
Two sets of scribes were made by scribing the second set on top of and perpendicular to the first set. Detached flakes and ribbons of coating were wiped off the panel and strapping tape (3M #898 available from 3M Company) was smoothed firmly over the cross-hatch marking. Within 90 seconds of application, the tape was removed in one continuous motion directed toward the tester and as parallel to the panel as possible. The scribed area was inspected and rated for removal of the recoat layer to the substrate according to the following scale:
5 = The edges of the cuts are completely smooth and none of the lattice squares is detached.
4 = Small flakes of coating are detached at intersections. Less than five percent of the area is affected.
3 = Small flakes of the coating are detached along edges and at intersections of cuts. The area affected is five to fifteen percent of the lattice.
2 = The coating has flaked along the edges and on parts of the squares. The area affected is fifteen to thirty-five percent of the lattice.
1 = The coating has flaked along the edges of cuts in large ribbons and whole squares have detached. The area affected is thirty-five to sixty-five percent of the lattice.
0 = Flaking and detachment worse than rating 1. Over sixty-five percent of the lattice is affected.

Example 29

A dual cure (ultraviolet radiation and thermal cure) coating composition was prepared and evaluated as discussed below.

The coating composition was made by adding each of the ingredients under agitation in the order listed in the table below. The acrylic polyol and isocyanurate were preblended before the addition to the other ingredients.

| Ingredient | Description | Solids | Weight |
|---|---|---|---|
| SR355[1] | DiTMP Tetraacrylate | 27.3 | 27.3 |
| Clariant HIGHLINK OG 108-32 | Colloidal Silica in tripropylene glycol diacrylate | 41.9 | 41.9 |
| DAROCURE 4265[3] | Photoinitiator | 2.0 | 2.0 |
| TINUVIN 400[3] | UV Absorber | 3.0 | 3.0 |
| TINUVIN 292[3] | Hindered Amine Light Stabilizer | 0.8 | 0.8 |
| RC-68-1497[2] | Acrylic Polyol Resin | 15.6 | 23.3 |
| DESMODUR N-3300[4] | Isocyanurate of HDI | 9.4 | 9.4 |
| | Total | 100.0 | 107.7 |

[1]Ditrimethylolpropane tetraacrylate which is available from Sartomer Company, Inc.
[2]BMA (14.5), BA (14.5), HEMA (20.4), HPMA (22.6) Isobornyl MA (27.6), AA (0.4). Acrylic polyol comprising 14.5% BA, 14.5% BMA, 27.6% IBoMA, 22.6% HPMA, 20.4% HEMA, 0.4% AA, and exhibiting the following properties: solids 67% in AROMATIC 100 available from Exxon, Mw 2336, Mn 1236, OH value 116.8.
[3]Available from Ciba-Geigy Corporation.
[4]Available from Bayer Corporation.

The coating composition was applied over pretreated and basecoated panels as described below. The panels used were cold rolled steel panels (size 4 inches×12 inches (10.16 cm by 30.48 cm)) coated with ED5000 electrocoat (available from PPG Industries, Inc). The test panels are available from ACT Laboratories, Inc. of Hillsdale, Mich. The basecoat (BWB-8555 black waterborne basecoat available from PPG Industries, Inc.) was spray applied at 0.6 mils (15 micrometers) dry film thickness and fully baked for 30 minutes at 285° F. (141° C.). The coating composition of the present invention was applied using a 7 mil (179 micrometers) drawdown bar over the basecoat to approximately 1.0–1.2 mils (26–31 micrometers) dry film thickness. The clearcoat was flashed at ambient temperature (25° C.) for five minutes and then cured using ultraviolet light at 576 mJoules/cm$^2$ at a line speed of 70 feet per minute (21.3 meters per minute) and then thermally cured for 30 minutes at 285° F. (141° C.).

The coating on the panel was evaluated for scratch resistance as follows. 20° gloss was measured with a Statistical Novo-Gloss 20° gloss meter, available from Paul N. Gardner Company, Inc. Coated panels were subjected to scratch testing by linearly scratching the coated surface with a weighted abrasive paper for ten double rubs using an Atlas AATCC Scratch Tester, Model CM-5, available from Atlas Electrical Devices Company of Chicago, Ill. The abrasive paper used was 3M 281Q WETORDRY™ PRODUCTION™ 9 micron polishing paper sheets, which are commercially available from 3M Company of St. Paul, Minn. Panels were then rinsed with tap water and carefully patted dry with a paper towel. The 20° gloss was measured (using the same gloss meter as that used for the initial 20° gloss) on the scratched area of each test panel. Using the lowest 20° gloss reading from the scratched area, the scratch results are reported as the percent of the initial gloss retained after scratch testing using the following calculation: 100%* scratched gloss÷initial gloss. Higher values for percent of gloss retained are desirable.

The test results are given in Table 12 below.

TABLE 12

| Clearcoat | Initial 20° Gloss | 20° Gloss after Scratch Testing | % Gloss Retention |
|---|---|---|---|
| UV/Thermal Dual Cure | 82 | 79 | 96 |

Example 30

A polysiloxane polyol was prepared that was a product of the hydrosilylation of a reactive silicone fluid with an approximate degree of polymerization of 3 to 7, i.e., (Si—O)$_3$ to (Si—O)$_7$. The polysiloxane polyol was prepared from a proportionately scaled-up batch of the following mixture of ingredients in the ratios indicated:

| Ingredients | Equivalent Weight | Equivalents | Parts By Weight (kilograms) |
|---|---|---|---|
| Charge I: | | | |
| Trimethylolpropane monoallyl ether | 174.0 | 756.0 | 131.54 |
| Charge II: | | | |
| MASILWAX BASE[1] | 156.7[2] | 594.8 | 93.21 |
| Charge III: | | | |
| Chloroplatinic acid | | 10 ppm | |
| Toluene | | | 0.23 |
| Isopropanol | | | 0.07 |

[1]Polysiloxane-containing silicon hydride, commercially available from BASF Corporation.
[2]Equivalent weight based on mercuric bichloride determination.

To a suitable reaction vessel equipped with a means for maintaining a nitrogen blanket, Charge I and an amount of sodium bicarbonate equivalent to 20 to 25 ppm of total monomer solids was added at ambient conditions and the temperature was gradually increased to 75° C. under a nitrogen blanket. At that temperature, 5.0% of Charge II was added under agitation, followed by the addition of Charge III, equivalent to 10 ppm of active platinum based on total monomer solids. The reaction was then allowed to exotherm to 95° C. at which time the remainder of Charge II was added at a rate such that the temperature did not exceed 95° C. After completion of this addition, the reaction temperature was maintained at 95° C. and monitored by infrared spectroscopy for disappearance of the silicon hydride absorption band (Si—H, 2150 cm$^{-1}$).

Silica Dispersion AA

A colloidal silica dispersion was prepared as follows. A 4-neck reaction flask equipped for vacuum distillation was flushed with N$_2$. To the reaction flask was added 1500.9 g of the polysiloxane polyol described above, 3751.1 of ORGANOSILICASOL™ MT-ST colloidal silica which is commercially available from Nissan Chemicals and 960.4 g of methyl amyl ketone. The resulting mixture was vacuum distilled at 70 mm Hg and 31° C.

Film Forming Compositions

Formulation pre-mixtures: (each component was mixed sequentially with agitation)

Example 1 (99-346-91A)

| Ingredient | Parts by weight (grams) | Solid weights (grams) |
|---|---|---|
| Methyl n-amyl ketone | 18.0 | — |
| Butyl Cellosolve ® acetate[1] | 18.0 | — |
| Butyl Carbitol ® acetate[2] | 4.0 | — |
| TINUVIN ® 928[3] | 3.0 | 3.0 |
| TINUVIN ® 292[4] | 0.40 | 0.40 |

[1]2-Butoxyethyl acetate solvent is commercially available from Union Carbide Corp.
[2]2-(2-Butoxyethoxy) ethyl acetate is commercially available from Union Carbide Corp.
[3]2-(2H-Benzotriazol-2yl)-6-(1-methyl-1-phenylethyl)-4-(1,1,3,3-tetramethylbutyl)phenol UV absorber available from Ciba Specialty Chemicals Corp.
[4]Sterically hindered amine light stabilizer commercially available from Ciba Specialty Chemicals Corp.

The pre-mixture of ingredients from Example 1 was used in Examples 2 and 3. Compositions for Examples 2 and 3 are listed below in Table 1. The amounts listed are the total parts by weight in grams and the amount within parenthesis are percentages by weight based on weight of resin solids. Each component was mixed sequentially with agitation.

TABLE 13

| Ingredient | Example 2 (99-346-93A) | Example 3 (99-346-93B) |
|---|---|---|
| Example 1 Pre-mix | 43.4 (3.4) | 43.4 (3.4) |
| Silica Dispersion AA | 10.0 (7.0) | 10.0 (7.0) |
| RESIMENE 757[1] | 11.8 (11.4) | 11.8 (11.4) |
| Acrylic[2] | 100.8 (65.5) | 74.9 (48.7) |
| Polybutyl acrylate[3] | 0.50 (0.30) | 0.50 (0.30) |
| Blocked acid catalyst[4] | 2.50 (1.00) | 2.50 (1.00) |
| CYLINK ® 2000[5] | 37.1 (19.1) | — |
| TRIXENE DP9B/1494[6] | — | 51.3 (35.9) |
| Reduction Information: | | |
| Methyl n-amyl ketone | 2.39 | — |
| Butyl Cellosolve ® acetate[7] | 2.39 | — |
| Butyl Carbitol ® acetate[8] | 0.53 | — |
| Spray viscosity[9] (sec) | 29 | 26 |
| Paint temperature (° F.) | 73 | 74 |

[1]Methylated and butylated melamine-formaldehyde resin available from Solutia Inc.
[2]Acrylic resin (30% styrene, 19.9% hydroxyethyl methacrylate, 28.7% CarduraE (available from Shell Chemical Co.), 9.5% acrylic acid, and 12% ethylhexyl acrylate) at 65% solids in SOLVESSO 100 (available from Exxon Chemicals America).
[3]A flow control agent having a Mw of 6700 and a Mn of 2600 made in xylene at 60% solids available from DuPont.
[4]Dodecyl benzene sulfonic acid solution, blocked with diisopropanol amine to 91% total neutralization, 40% acid solids in ethanol.
[4]Dodecyl benzene sulfonic acid solution available from Chemcentral.
[5]Tris(alkylcabamoyl)triazine crosslinker available from CYTEC Industries, Inc.
[6]3,5-Dimethylpyrazole blocked isocyanurate of isophorone diisocyanate available from Baxenden Chemicals Limited.
[7]2-Butoxyethyl acetate solvent is commercially available from Union Carbide Corp.
[8]2-(2-Butoxyethoxy) ethyl acetate is commercially available from Union Carbide Corp.
[9]Viscosity measured in seconds with a #4 FORD efflux cup at ambient temperature.

Testing

The film forming compositions of Examples 2 and 3 were spray applied to a pigmented basecoat to form color-plus-clear composite coatings over primed electrocoated steel panels. The panels used were cold rolled steel panels (size 4 inches×12 inches (10.16 cm by 30.48 cm)) coated with ED5100 electrocoat and PCV70100M primer, both available from PPG Industries, Inc. The test panels are available as APR30471 from ACT Laboratories, Inc. of Hillsdale, Mich.

A black pigmented water-based acrylic/melamine basecoat, available from PPG Industries, Inc. (Basecoat Z) was used. The formulation for Basecoat Z is given below.

Basecoat Z

| Ingredient | Parts by weight (grams) | Solid weights (grams) |
|---|---|---|
| n-butoxypropanol, PNB[1] | 45.0 | — |
| CYMEL 327[2] | 38.9 | 35.0 |
| TINUVIN 1130[3] | 3.20 | 3.20 |
| Phosphotized Epoxy[4] | 0.80 | 0.50 |
| Amine[5] | 2.00 | — |
| Acrylic Latex[6] | 109.4 | 46.5 |
| Odorless Mineral Spirits[7] | 8 | — |
| Polyurethane acrylic[8] | 42.6 | 10.0 |
| Black tint paste[9] | 47.6 | 11.5 |
| Amine[5] | 1.00 | — |
| DeIonized Water | 67.7 | — |

[1]Solvent available from Lyondell Petrochemical.
[2]Methylated melamine formaldehyde resin available from Cytec Industries, Inc.
[3]Substituted hydroxyphenyl benzotriazole available from Ciba Specialty Chemicals Corp.
[4]Phosphatized epoxy prepared from Epon 828, a polyglycidyl ether of Bisphenol A available from Shell Oil and Chemical Co.; reacted with phosphoric acid in an 83:17 weight ratio.
[5]Dimethylethanolamine, 50% aqueous, available from Union Carbide Corp.
[6]The Acrylic Latex was prepared as follows:
The polyester was prepared in a four-neck round bottom flask equipped with a thermometer, mechanical stirrer, condenser, dry nitrogen sparge, and a heating mantle. The following ingredients were used:

```
1103.0 g  isostearic acid
 800.0 g  pentaerythritol
 470.0 g  crotonic acid
 688.0 g  phthalic anhydride
   6.1 g  dibutyltin oxide
   6.1 g  triphenyl phosphite
1170.0 g  butyl acrylate
   4.0 g  Ionol (butylated hydroxytoluene)
```

The first six ingredients were stirred in the flask at 210° C. until 245 ml of distillate was collected and the acid value dropped to 46. The material was cooled to 77° C. and the last two ingredients were stirred in. The final product was a viscous yellow liquid with a hydroxyl value of 54.0, a Gardner-Holdt viscosity of Z+, a weight average molecular weight of 45,600, and a non-volatile content of 70.2%. A pre-emulsion was prepared by stirring together the following ingredients:

```
 286.0 g  polyester of example III
 664.0 g  butyl acrylate
  30.0 g  ethylene glycol dimethacrylate
  20.0 g  acrylic acid
  46.4 g  dodecylbenzenesulfonic acid (70% in isopropanol)
  14.3 g  dimethylethanolamine
1000.0 g  water
```

The reaction was carried out using the same procedure and materials as in Latex Example I.
The reaction exothermed from 23° C. to 80° C. The final pH of the latex was 6.1, the nonvolatile content was 42.4%, the particle size was 105 nm, and the Brookfield viscosity was 14 cps (spindle #1, 50 rpm).
[7]Solvent available from Shell Chemical Co.

Basecoat Z -continued

| Ingredient | Parts by weight (grams) | Solid weights (grams) |
|---|---|---|

[8]Polyurethane acrylic composed of 4% dimethylol propionic acid, 16% Desmodur W (available from Bayer), 9.3% dimeryl diisocyanate, 22.8% FORMREZ 66-56 (Witco Corp), 5.7% MPEG 2000 (Union Carbide Corp.), 22.6% methyl methacrylate, 15.6% butyl acrylate, 1.6% ethyleneglycol dimethacrylate, 2.1% diethylene triamine, 0.3% ammonium persulfate.
[9]Black pigment available from Cabot Corp. as MONARCH BLACK 1300 dispersed in an acrylic grind vehicle (35% butyl acrylate, 30% styrene, 18% butyl methacrylate, 8.5% 2-hydroxyethyl acrylate, 8.5% acrylic acid) at a total pigment to binder ratio (P/B) of 0.35.

The basecoats was automated spray applied in two coats to the electrocoated and primed steel panels at ambient temperature (70° F. (21° C.)). No flash was given between the two basecoat applications. A total dry film thickness of 0.66 mils (17 micrometers) was targeted. After the second basecoat application, a 1 to 10 minute air flash at ambient temperature was given before force flashing the basecoated panels. The force flash was five minutes at 200° F. (93° C.). The clear coating compositions of Examples 2 and 3 were each automated spray applied to the basecoated panel at ambient temperature in two coats with a ninety second ambient flash between applications. Total dry film thickness for the clearcoats was 1.78 mils (45 micrometers). All coatings were allowed to air flash at ambient temperature for ten minutes. Panels prepared from each coating were baked for thirty minutes at 285° F. (141° C.) to fully cure the coating(s). The panels were baked in a horizontal position. Properties for the coatings are reported below in Table 14.

TABLE 14

| | | % 20° Gloss Retained after scratch testing[2] | | |
|---|---|---|---|---|
| | | Initial | Post weathering[3] | |
| Example # | 20° Gloss[1] | Initial | 240 Hours | 504 Hours | 1028 Hours |
| 2 | 92 | 92 | 84 | 51 | 32 |
| 3 | 90 | 79 | 85 | 49 | 29 |

[1]20° gloss was measured with a Statistical Novo-Gloss 20° gloss meter, available from Paul N. Gardner Company, Inc.
[2]Coated panels were subjected to scratch testing by linearly scratching the coated surface with a weighted abrasive paper for ten double rubs using an Atlas AATCC Scratch Tester, Model CM-5, available from Atlas Electrical Devices Company of Chicago, Illinois. The abrasive paper used was 3M 281Q WETORDRY ™ PRODUCTION ™ 9 micron polishing paper sheets, which are commercially available from 3M Company of St. Paul, Minnesota. Panels were then rinsed with tap water and carefully patted dry with a paper towel. The 20° gloss was measured (using the same gloss meter as that used for the initial 20° gloss) on the scratched area of each test panel. Using the lowest 20° gloss reading from the scratched area, the scratch results are reported as the percent of the initial gloss retained after scratch testing using the following calculation: 100% * scratched gloss ÷ initial gloss. Higher values for percent of gloss retained are desirable.
[3]Post-weathering scratch resistance (retained scratch resistance) was measured using the scratch test method described above after the unscratched test panels were subjected to simulated weathering by exposure to UVA-340 bulbs in a QUV Accelerated Weathering Tester available through Q Panel Lab Products. Testing was as follows: a cycle of 70° C. for 8 hours exposure to UVA followed by a condensation cycle at 50° C. for 4 hours with no UVA (total test time is reported in the table). Using the lowest 20° gloss reading from the scratched area, the scratch results are reported as the percent of the initial gloss retained after post-weathering scratch testing using the following calculation: 100% * post-weathering scratched gloss ÷ initial gloss. Higher values for percent of gloss retained are desirable.

Example 31

A coating composition of the present invention was prepared from a mixture of the following ingredients:

| Ingredients | Resin Solids (%) | Total Weight (Grams) |
|---|---|---|
| Butyl Acetate | — | 11.1 |
| DOWANOL PM Acetate | — | 28.6 |
| Butyl Cellusolve Acetate | — | 4.1 |
| Tinuvin 928 | 3.0 | 3.0 |
| Silica dispersion of Example 23C | 6.7 | 8.8 |
| Polysiloxane polyol of Example A | 10.3 | 10.3 |
| Cymel 202 | 15.0 | 18.8 |
| Acrylic polyol[1] | 22.5 | 31.5 |
| Setalux C-71761 VB-60[2] | 20.4 | 34.9 |
| Tinuvin 292 | 0.5 | 0.5 |
| Catalyst of Example 12 | 0.5 | 0.67 |
| DESMODUR N3300 | 23.4 | 23.4 |
| DESMODUR Z4470 | 3.5 | 5.0 |

[1] Acrylic polyol comprising 14.5% BA, 14.5% BMA, 27.6% IBoMA, 22.6% HPMA, 20.4% HEMA, 0.4% AA, Mn 1700, Mw 3227.
[2] Thermosetting hydroxylated acrylic copolymer containing sag control agent available from AKZO Nobel A coating composition of the present invention was also prepared from a mixture of the following ingredients:

| Ingredients | Resin Solids (%) | Total Weight (Grams) |
|---|---|---|
| Ethyl 3-ethoxypropionate | — | 38.7 |
| Tinuvin 928 | 3.0 | 3.0 |
| Silica dispersion of Example 23C | 6.7 | 8.8 |
| Polysiloxane polyol of Example A | 10.3 | 10.3 |
| Cymel 202 | 7.5 | 9.4 |
| Acrylic polyol[1] | 39.0 | 57.9 |
| Tinuvin 292 | 1.0 | 1.0 |
| Catalyst of Example 12 | 0.5 | 0.7 |
| DESMODUR N3300 | 16.6 | 16.6 |
| DESMODUR Z4470 | 21.9 | 31.3 |

[1] Acrylic polyol comprising 19% BA, 18.5% BMA, 40% HPA, 20% Styrene, 0.5% MMA, 2% AA Mw 7100

The compositions of the present invention can provide numerous advantages in coating applications, including, but not limited to, good initial and retained mar resistance, good appearance properties such as gloss and distinctiveness of image, and physical properties such as good flexibility and weatherability.

It will be appreciated by those skilled in the art that changes could be made to the embodiments described above without departing from the broad inventive concept thereof. It is understood, therefore, that this invention is not limited to the particular embodiments disclosed, but it is intended to cover modifications which are within the spirit and scope of the invention, as defined by the appended claims.

Therefore, we claim:

1. A cured coating formed from a composition formed from components comprising:
   (a) at least one polysiloxane comprising at least one reactive functional group, the at least one polysiloxane comprising at least one of the following structural units (I):
   Image Page 2

   $$R^1_n R^2_m SiO_{(4-n-m)/2} \quad (I)$$

wherein each $R^1$, which may be identical or different, represents H, OH, a monovalent hydrocarbon group, or a monovalent siloxane group; each $R^2$, which may be identical or different, represents a group comprising at least one functional group, wherein m and n fulfill the requirements of $0<n<4$, $0<m<4$ and $2<(m+n)<4$; and
   (b) at least one reactant comprising at least one functional group that is reactive with at least one functional group selected from the at least one reactive functional group of the at least one polysiloxane and at least one functional group of the at least one reactant; and
   (c) a plurality of particles selected from inorganic particles, composite particles, and mixtures thereof;
   wherein each component is different,
   wherein a retained scratch resistance value of the cured coating is greater than a retained scratch resistance value of a cured coating that does not contain the plurality of particles wherein each component is different, and
   wherein the cured coating has an initial scratch resistance value such that after scratch testing greater than 40 percent of the initial 20° gloss is retained.

2. A cured coating composition according to claim 1, wherein each $R^2$, which may be identical or different, represents a group comprising at least one reactive functional group selected from a hydroxyl group, a carboxyl group, an isocyanate group, a blocked polyisocyanate group, a primary amine group, a secondary amine group, an amide group, a carbamate group, a urea group, a urethane group, a vinyl group, an unsaturated ester group, a maleimide group, a fumarate group, an anhydride group, a hydroxy alkylamide group, and an epoxy group.

3. A cured coating according to claim 1, wherein the at least one polysiloxane comprises at least two reactive functional groups.

4. A cured coating according to claim 1, wherein at least one group represents a group comprising at least one reactive functional group selected from a hydroxyl group and a carbamate group.

5. A cured coating according to claim 4, wherein at least one $R^2$ group represents a group comprising at least two reactive functional groups selected from a hydroxyl group and a carbamate group.

6. A cured coating according to claim 1, wherein at least one $R^2$ group represents a group comprising an oxyalkylene group and at least two hydroxyl groups.

7. A cured coating according to claim 1, wherein the at least one polysiloxane, when added to the other components of the composition, is present in the composition in an amount ranging from 0.01 to 90 weight percent based on total weight of the resin solids of the components which form the composition.

8. A cured coating according to claim 7, wherein the at least one polysiloxane is present in an amount of at least 2 weight percent.

9. A cured coating according to claim 8, wherein the at least one polysiloxane is present in an amount of at least 5 weight percent.

10. A cured coating according to claim 9, wherein the at least one polysiloxane is present in an amount of at least 10 weight percent.

11. A cured coating according to claim 1, wherein the particles are selected from fumed silica, amorphous silica, colloidal silica, alumina, colloidal alumina, titanium oxide, cesium oxide, yttrium oxide, colloidal yttria, zirconia, colloidal zirconia and mixtures of any of the foregoing.

12. A cured coating according to claim 1, wherein the particles are surface treated.

13. A cured coating according to claim 1, wherein the particles include colloidal silica.

14. A cured coating according to claim 1, wherein the particles have an average particle size less than 100 microns prior to incorporation into the composition.

15. A cured coating according to claim 1, wherein the particles have an average particle size less than 50 microns prior to incorporation into the composition.

16. A cured coating according to claim 1, wherein the particles have an average particle size ranging from 1 to less than 1000 nanometers prior to incorporation into the composition.

17. A cured coating according to claim 16, wherein the particles have an average particle size ranging from 1 to 100 nanometers prior to incorporation into the composition.

18. A cured coating according to claim 17, wherein the particles have an average particle size ranging from 5 to 50 nanometers prior to incorporation into the composition.

19. A cured coating according to claim 1, wherein the particles, when added to the other components that form the composition, are present in the composition in an amount ranging from 0.01 to 75 weight percent based on total weight of the resin solids of the components which form the composition.

20. A cured coating according to claim 19, wherein the particles are present in an amount of at least 0.1 weight percent.

21. A cured coating according to claim 19, wherein the particles are present in an amount of at least 0.5 weight percent.

22. A cured coating according to claim 19, wherein the particles are present in an amount of less than 20 weight percent.

23. A cured coating according to claim 19, wherein the particles are present in an amount of less than 10 weight percent.

24. A cured coating according to claim 1, wherein the at least one reactant is selected from at least one curing agent.

25. A cured coating according to claim 24, wherein the at least one curing agent is selected from an aminoplast resin, a polyisocyanate, a blocked polyisocyanate, a polyepoxide, a polyacid, and a polyol.

26. A cured coating according to claim 24, wherein the at least one curing agent is selected from an aminoplast resin, and a polyisocyanate.

27. A cured coating according to claim 24, wherein the curing agent, when added to the other components that form the composition, is present in an amount ranging from 1 weight percent to 65 weight percent based on total weight of the resin solids of the components which form the composition.

28. A cured coating according to claim 27, wherein the curing agent is present in an amount of at least 5 weight percent.

29. A cured coating according to claim 28, wherein the curing agent is present in an amount of at least 10 weight percent.

30. A cured coating according to claim 1, wherein the components which form the composition comprise at least one film-forming material different from the at least one polysiloxane (a).

31. A cured coating according to claim 30, wherein the at least one film-forming material is selected from at least one additional polymer, in addition to and different from said at least one polysiloxane, comprising at least one reactive functional group.

32. A cured coating according to claim 31, wherein the at least one additional polymer has at least one reactive functional group selected from a hydroxyl group, a carboxyl group, an isocyanate group, a blocked polyisocyanate group, a primary amine group, a secondary amine group, an amide group, a carbamate group, a urea group, a urethane group, a vinyl group, an unsaturated ester group, a maleimide group, a fumarate group, an anhydride group, a hydroxy alkylamide group, and an epoxy group.

33. A cured coating according to claim 32, wherein the additional polymer has at least one reactive functional group selected from a hydroxyl group, and a carbamate group.

34. A cured coating according to claim 1, wherein the components which form the composition comprise at least one catalyst.

35. A cured coating according to claim 34, wherein the at least one catalyst is, when added to the other components that form the composition, present in an amount sufficient to accelerate the reaction between the at least one functional group of the at least one reactant and at least one functional group selected from the at least one reactive functional group of the at least one polysiloxane and at least one functional group of the at least one reactant.

36. A cured coating according to claim 34, wherein the at least one catalyst is an acid catalyst.

37. A cured coating according to claim 36, wherein the at least one catalyst is selected from an acid phosphate, a substituted sulfonic acid and an unsubstituted sulfonic acid.

38. A cured coating according to claim 34, wherein the at least one catalyst is phenyl acid phosphate.

39. A cured coating according to claim 1, wherein the components which form the composition comprise at least one surface active agent.

40. A cured coating according to claim 39, wherein the at least one surface active agent is selected from an anionic surface active agent, a nonionic surface active agent and a cationic surface active agent.

41. A cured coating according to claim 1, wherein the at least one polysiloxane has the following structure (II) or (III):

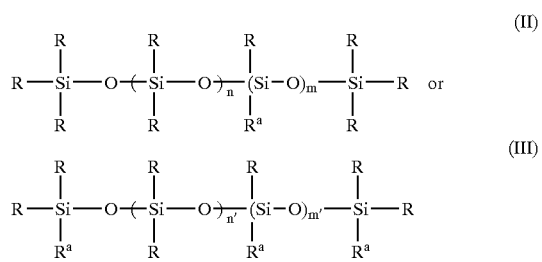

wherein:
m has a value of at least 1; m' ranges from 0 to 75; n ranges from 0 to 75; n' ranges from 0 to 75; each R, which may be identical or different, is selected from H, OH, monovalent hydrocarbon groups, monovalent siloxane groups, and mixtures of any of the foregoing; and
—$R^a$ comprises the following structure (IV):

—$R^3$—X wherein —$R^3$ is selected from an alkylene group, an oxyalkylene group, an alkylene aryl group, an alkenylene group, an oxyalkenylene group, and an alkenylene aryl group; and
X represents a group which comprises at least one reactive functional group selected from a hydroxyl group, a carboxyl group, an isocyanate group, a blocked polyisocyanate group, a primary amine group, a secondary amine group, an amide group, a carbamate group, a urea group, a urethane group, a vinyl group, an unsaturated ester group, a maleimide group, a fumarate group, an anhydride group, a hydroxy alkylamide group, and an epoxy group.

42. A cured coating according to claim 41, wherein (n+m) ranges from 2 to 9.

43. A cured coating according to claim 41, wherein (n'+m') ranges from 2 to 9.

44. A cured coating according to claim 42, wherein (n+m) ranges from 2 to 3.

45. A cured coating according to claim 43, wherein (n'+m') ranges from 2 to 3.

46. A cured coating according to claim 41, wherein X represents a group comprising at least one reactive functional group selected from a hydroxyl group and a carbamate group.

47. A cured coating according to claim 41, wherein X represents a group comprising at least two hydroxyl groups.

48. A cured coating according to claim 41, wherein X represents a group comprising at least one substituent selected from H, a monohydroxy-substituted group and a group having the following structure (V):

   (V)

wherein $R^4$ is

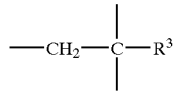

'when p is 2 and $R^3$ is $C_1$ to $C_4$ alkyl, or $R^4$ is

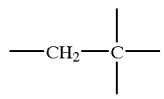

when p is 3,
wherein a portion of X is a group having the structure (V).

49. A cured coating according to claim 48, wherein m is 2 and p is 2.

50. A cured coating according to claim 1, wherein the polysiloxane (a) is the reaction product of at least the following reactants:
(i) at least one polysiloxane of the formula (VI):

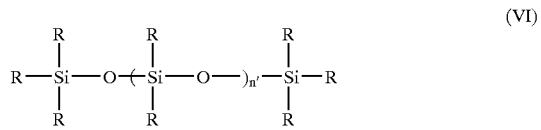   (VI)

wherein each substituent group R, which may be identical or different, represents a group selected from H, OH, a monovalent hydrocarbon group, a siloxane group, and mixtures of any of the foregoing; at least one of the groups represented by R is H, and n' ranges from 0 to 100, such that the percent of Si—H content in the at least one polysiloxane of formula (VI) ranges from 2 to 50; and (ii) at least one molecule which comprises at least one functional group selected from a hydroxyl group, a carboxyl group, an isocyanate group, a blocked polyisocyanate group, a primary amine group, a secondary amine group, an amide group, a carbamate group, a urea group, a urethane group, a vinyl group, an unsaturated ester group, a maleimide group, a fumarate group, an anhydride group, a hydroxy alkylamide group, and an epoxy group and at least one unsaturated bond capable of undergoing a hydrosilylation reaction.

51. A cured coating according to claim 50, wherein said at least one functional group is selected from hydroxyl groups.

52. A cured coating according to claim 1, wherein the components from which the composition is formed comprise at least one material which has at least one reactive functional group which is blocked with a silyl group.

53. A cured coating according to claim 52, wherein the silyl blocking group has the following structure (IX):

   (IX)

wherein each $R^1$, $R^2$ and $R^3$, which may be identical or different, is selected from hydrogen, an alkyl group comprising from 1 to 18 carbon atoms, a phenyl group, and an allyl group.

54. A cured coating according to claim 52, wherein the at least one reactive functional group is selected from a hydroxyl group, a carboxyl group, a carbamate group, and an amide group.

55. A cured coating according to claim 52 comprising at least one compound which can be reacted with the functional group to form the silyl group, wherein the at least one compound is selected from hexamethyldisilazane, trimethylchlorosilane, trimethylsilyldiethylamine, t-butyl dimethylsilyl chloride, diphenyl methylsilyl chloride, hexamethyl disilylazide, hexamethyl disiloxane, trimethylsilyl triflate, hexamethyldisilyl acetamide and mixtures of any of the foregoing.

56. A cured coating according to claim 52, wherein the at least one material comprises at least one linkage selected from an ester linkage, an urethane linkage, a urea linkage, an amide linkage, a siloxane linkage and an ether linkage.

57. A cured coating according to claim 52, wherein the at least one material comprises a reaction product having the following structure structure (X):

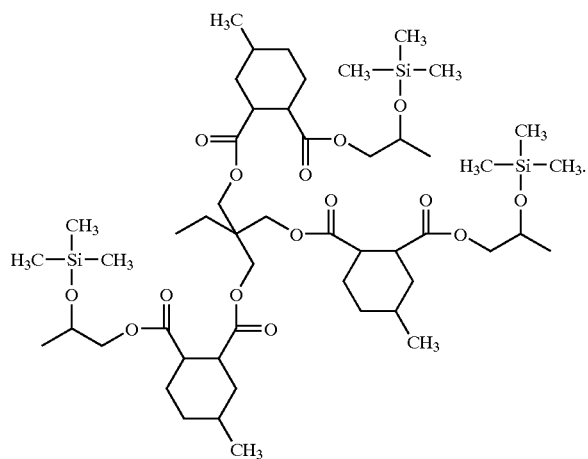

(X)

58. A cured coating according to claim 1, wherein the cured coating has an initial scratch resistance value such that after scratch testing greater than 50 percent of the initial 20° gloss is retained.

59. A cured coating according to claim 1, wherein the cured coating has a retained scratch resistance value such that after scratch testing greater than 30 percent of the initial 20° gloss is retained.

60. A cured coating according to claim 59, wherein the cured coating has a retained scratch resistance value such that after scratch testing greater than 40 percent of the initial 20° gloss is retained.

61. A cured coating according to claim 1, wherein the cured coating has a concentration of particles within a surface region thereof which is greater than a concentration of particles within a bulk region thereof.

62. A cured coating according to claim 1, wherein the coating is thermally cured.

63. A cured coating according to claim 1, wherein the coating is cured by exposure to ionizing radiation.

64. A cured coating according to claim 1, wherein the coating is cured by exposure to actinic radiation.

65. A cured coating according to claim 1, wherein the coating is cured by exposure to (1) ionizing radiation or actinic radiation and (2) thermal energy.

\* \* \* \* \*

UNITED STATES PATENT AND TRADEMARK OFFICE
CERTIFICATE OF CORRECTION

PATENT NO. : 6,803,408 B2
DATED : October 12, 2004
INVENTOR(S) : Lawrence G. Anderson et al.

It is certified that error appears in the above-identified patent and that said Letters Patent is hereby corrected as shown below:

Column 88,
Line 36, "one group" should read -- one $R^2$ group --.

Column 92,
Line 40, "$R^1$, $R^2$ and $R^3$," should read -- $R_1$, $R_2$ and $R_3$, --.

Signed and Sealed this

Fifteenth Day of March, 2005

JON W. DUDAS
*Director of the United States Patent and Trademark Office*